United States Patent [19]

Hayashi et al.

[11] Patent Number: 5,798,766

[45] Date of Patent: Aug. 25, 1998

[54] DRAWING SYSTEM

[75] Inventors: Naoki Hayashi; Kazuo Shibuta, both of Ashigarakami-gun, Japan

[73] Assignee: Fuji Xerox Co., Ltd., Tokyo, Japan

[21] Appl. No.: 730,761

[22] Filed: Oct. 15, 1996

[30] Foreign Application Priority Data

Oct. 20, 1995 [JP] Japan .................................. 7-272152
Mar. 15, 1996 [JP] Japan .................................. 8-086015

[51] Int. Cl.$^6$ .................................................. G06T 11/40
[52] U.S. Cl. .................................................. 345/431
[58] Field of Search .................................. 345/431, 150; 382/162, 165

[56] References Cited

FOREIGN PATENT DOCUMENTS

A-3-117271  5/1991  Japan .
A-4-349522  12/1992  Japan .
A-6-266328  9/1994  Japan .
A-7-72978  3/1995  Japan .

OTHER PUBLICATIONS

Hartley et al., "A desktop expert system as a human factors work aid", Proceedings of the Human Factors Society 31st Annual Meeting: Rising to New Heights with Technology, vol. 2, pp. 1087–1090, Jan. 1987.

Brewer, "Prediction of simultaneous contract between map colors with Hunt's model of color appearance", Color Research & Application, vol. 21, Issue 3, pp. 221–235, Jun. 1996.

*Primary Examiner*—Mark K. Zimmerman
*Attorney, Agent, or Firm*—Oliff & Berridge, PLC

[57] ABSTRACT

A drawing system includes a placeable point storage unit for storing identifiers for uniquely identifying a plurality of placeable points and positions of the placeable points on a two-dimensional plane in a one-to-one correspondence therebetween, an element storage unit for storing element attribute information containing information representing element colors and the identifiers of the placeable points as position attributes, a position rule storage unit for storing position rules for determining the positions of the placeable points on the two-dimensional plane, a position rule selection unit for selecting one of the position rules, a placement change unit for changing the positions of the placeable points on the two-dimensional plane stored in the placeable point storage unit based on the selected position rule, a color arrangement change unit for determining the colors of the drawing elements based on the positional relationship of the placeable points after their positions are changed by the placement change unit and storing the determined colors in the element storage unit, and an image generation unit for generating an image comprising the drawing elements placed at the placeable points based on the information stored in the element storage unit.

15 Claims, 32 Drawing Sheets

FIG. 4

| ID | CHARACTER STRING | IMAGE |
|---|---|---|
| CC1 | BUSINESS STANDARD | |
| CC2 | WARM | |
| CC3 | EFFECT | |
| .... | .... | .... |

FIG. 5

| ID | COLOR SETTING RULES | | | | | | FROM SETTING RULES | |
|---|---|---|---|---|---|---|---|---|
| | BOX 1 | BOX 2 | BOX 3 | BOX 4 | ARROW | TEXT | BOX | ARROW |
| CC1 | LIGHT BLUE | LIGHT PURPLE | LIGHT GREEN | PEARL BLUE | DARK PURPLE | DARK BLUE | ELLIPSE | ARROW-HEAD |
| CC2 | PALE PINK | PEARL BLUE | PALE PURPLE | LIGHT CRIMSON | DARK ORANGE | CRIMSON | ELLIPSE | TRIANGLE |
| CC3 | PURPLE | DARK ORANGE | CRIMSON | DARK GREEN | DARK PERSE | BLACK | RECTANGLE | ARROW-HEAD |
| .... | .... | | | | | | | |

FIG. 15

| ID  | 0          | 1            | 2           | 3             |
|-----|------------|--------------|-------------|---------------|
| CC1 | LIGHT BLUE | LIGHT PURPLE | LIGHT GREEN | PEARL BLUE    |
| CC2 | PALE PINK  | PEARL BLUE   | PALE PURPLE | LIGHT CRIMSON |
| CC3 | PURPLE     | DARK ORANGE  | CRIMSON     | DARK GREEN    |
| ....| ....       | ....         | ....        | ....          |

DRAWING SYSTEM

BACKGROUND OF THE INVENTION

1. Field of the Invention

This invention relates to a drawing system for processing digital image information for electronic drawing, such as a wordprocessor or a digital copier that can handle graphics, and also to a drawing system for the user to execute electronic drawing in an interactive mode with a wordprocessor, etc., that can handle graphics.

2. Description of the Related Art

In recent years, it has been common practice for the end user to use a graphical UI (user interface) for electronic drawing with a wordprocessor, etc. The prevalence of computer systems containing color scanners and color printers provides an environment in which not only graphics designers, but also general users can prepare color drawings. Since color drawings make a high appeal to persons as compared with monochrome drawings, needs for the user to easily prepare beautiful and easy-to-understand drawings for proposals and presentation for clients, customers, etc., are high.

To prepare beautiful and easy-to-understand drawings, it becomes important to use what color in what drawing portion, because if colors are not appropriately arranged, coloring the drawing makes it more hard to see.

In the conventional techniques used for electronic color drawing in wordprocessors, graphics software, digital copiers having a color edit function, and the like, the user repeatedly specifies drawing elements and regions directly and colors to be used for them directly, thereby arranging colors. The edit operation feature provided by the system based on the conventional techniques assumes that the user directly specifies the position, size, and color of each drawing element.

However, it is difficult for the general user rather than the graphics designer to use the conventional techniques for determining a color arrangement of drawings, because the color arrangement is determined by the relationship between the color of one portion and that of any other portion and the whole balance must be considered to determine the color of each portion. It is difficult for the general user to image the finish color arrangement before coloring. Thus, if the general user uses the conventional techniques, often he or she determines the color of each portion on the spur of the moment, resulting in a hard-to-see color arrangement finally. Particularly, it is remarkably difficult for the general user to arrange colors of diversely placed drawing elements by the conventional techniques.

To prepare beautiful and easy-to-understand drawings, as another example, the user needs to select a composition according to his or her purposes such as "to arrange drawing elements concentrically for giving an impression of widening" or "to arrange drawing elements so as to show a rising tendency from left to right for giving an impression of continuing to develop," and prepare a drawing according to the composition. Since the composition needs to be matched with the factor to be most emphasized on the drawing, it is desirable to enable the user to try placement of elements in various compositions when preparing drawings.

Particularly, since it is difficult for general users to call up a final image before preparing a drawing to select the optimum composition, it is desirable to enable the user to actually change compositions for preparing a drawing while checking. If the user can change the composition of a once prepared drawing by easy operation, reusability of drawings can be enhanced in such a manner that the user changes the composition so as to match the occasion depending on the persons to whom the drawing is to be presented.

However, preparing or changing a composition takes much time with conventional techniques related to electronic drawing methods in an interactive mode, such as conventional wordprocessor or graphics tool software.

To prepare a drawing in the conventional techniques, the user repeats the steps of preparing drawing elements such as lines, polygons, and ellipses and placing the elements on a two-dimensional plane. To align positions of drawing elements and execute drawing, for example, placement of the drawing elements is limited. This is a method for regulating positions that the drawing elements can take according to preset regulation positions called grid or guide (grid points, straight lines) and placing the drawing elements.

The grid system is to draw equally spaced grid lines intersecting at right angles on a two-dimensional plane and limit positions of drawing elements to grid points. The guide system is for the user to draw guide lines on a two-dimensional plane and to limit positions of drawing elements to the lines.

To use such a grid or guide system to prepare a composition, for example, the grid system, which simply displays the grid lines intersecting at right angles and regulates positions, does not directly represent a composition. Thus, the user needs to map a composition pictured to himself or herself to the grid points, select the grid points used with the composition of drawing from the whole grid points, and memorize them. Therefore, to change the composition, the user must again select the grid points that can be used in accordance with a new composition pictured to himself or herself and move the positions of the drawing elements made so far to the newly selected grid points on his or her own.

On the other hand, the grid system, which enables the user to arbitrarily draw guide lines, can represent a composition directly; only one composition is represented. To change the composition, however, the user must again draw lines in accordance with a new composition from the beginning and move the positions of the drawing elements made so far to the newly drawn lines.

To eliminate the need for performing such intricate work, propositions are also made. For example, according to the proposition described in Japanese Patent Laid-Open No. Hei 6-266328, in a system wherein the user enters positions and the positions are handled as input points, a plurality of predetermined correction rules are provided and position data entered by the user can be corrected to input points according to a correction rule specified by the user. Information for identifying the rule used here is added and the input points are stored, whereby if the correction rule is changed, the input points can be changed in batch according to a new specified correction rule. That is, for example, to attempt to again use the grid to change a drawing having input points prepared using the grid as composition points, the position data of the input points can be automatically changed according to the correction rule simply by changing grid specification.

Since the above-mentioned technique can be used to change the input points in batch according to the correction rule, it can be applied to a case where a plurality of drawing elements are placed on a two-dimensional plane for determining a composition. For example, composition rules are provided and a desired one is selected from among the rules, whereby various compositions can be provided easily. However, the technique, which concerns placement of points, cannot effectively be used for preparation of a sophisticated composition aimed at drawing elements having a spread and colors.

SUMMARY OF THE INVENTION

It is therefore an object of the invention to provide a drawing system that can easily prepare a drawing to which an appropriate color arrangement is applied when the user executes electronic drawing or a color drawing is electronically prepared from a monochrome drawing.

To solve the above problems, according to a first aspect of the invention, there is provided a drawing system for preparing a drawing having at least one drawing element placed on a two-dimensional plane, said system comprising:

means for storing information concerning a plurality of color arrangement rules for determining colors to be assigned to drawing elements in response to positional relationships among the drawing elements on the two-dimensional plane;

means for displaying color arrangement patterns responsive to the color arrangement rules;

means for specifying a color arrangement rule for the drawing to be prepared;

means for referencing said storage means based on the specified color arrangement rule and determining colors of drawing elements contained in the drawing to be prepared; and means for generating image information representing the prepared drawing colored in response to the colors determined for the drawing elements of the drawing.

According to a second aspect of the invention, there is provided the drawing system as mentioned in the first aspect of the invention, wherein said means for displaying color arrangement patterns responsive to the color arrangement rules displays drawing features corresponding to the color arrangement rules.

According to a third aspect of the invention, there is provided the drawing system as mentioned in the first aspect of the invention, wherein the drawing elements to which colors are assigned according to the color arrangement rule are predetermined types of elements, and wherein said storage means stores information conforming to the color arrangement rules for the predetermined types of elements and information concerning the color assigned to each type for elements of the types to which no color is assigned according to the color arrangement rule.

According to a fourth aspect of the invention, there is provided the drawing system as mentioned in the first aspect of the invention, wherein said storage means stores data defining correspondence between the color arrangement rules and forms of the elements.

According to a fifth aspect of the invention, there is provided a drawing system for preparing a drawing having at least one drawing element placed on a two-dimensional plane, said system comprising:

means for storing information concerning a plurality of color arrangement rules for determining colors to be assigned to drawing elements in response to positional relationships among the drawing elements on the two-dimensional plane;

means for specifying a color arrangement rule for the drawing to be prepared;

means for optically reading a monochrome or single-color original image used as an original of the drawing to be prepared and having a specific element marked with a color mark and generating original image information;

means for referencing said storage means based on the specified color arrangement rule and determining a color of the element of the original image marked with a color mark based on the original image information; and means for generating image information representing the prepared drawing colored in response to the colors determined for the drawing elements of the drawing and the original image information.

According to a sixth aspect of the invention, there is provided a drawing system for preparing a drawing having at least one drawing element placed on a two-dimensional plane, said system comprising:

placeable point storage means for storing two-dimensional coordinates as identifiers for uniquely identifying a plurality of placeable points on the two-dimensional place where drawing elements can be placed;

element placement means for relating the drawing elements contained in the drawing to be prepared to the placeable points;

means for determining colors of the drawing elements related to the placeable points by said element placement means based on the two-dimensional coordinates indicating the identifiers of the placeable points; and means for generating image information representing the prepared drawing colored in response to the colors determined by said means for determining colors of the drawing elements.

According to a seventh aspect of the ivention, there is provided the drawing system as mentioned in the sixth aspect of the invention, wherein said means for determining colors of the drawing elements selects one color out of a predetermined color set based on the two-dimensional coordinates representing the identifier of a placeable point and determining a color of the drawing element placed at the placeable point.

According to an eighth aspect of the invention, there is provided the drawing system as mentioned in the sixth aspect of the invention, wherein said means for determining colors of the drawing elements selects one of the placeable points as a reference point, finds a two-dimensional coordinate difference between the reference point and a different placeable point at which a drawing element is placed, and determines a color of the drawing element placed at the different placeable point based on the found difference.

According to a ninth aspect of the invention, there is provided a drawing method for preparing a drawing having at least one drawing element placed on a two-dimensional plane, said method comprising the steps of:

previously storing information concerning a plurality of color arrangement rules for determining colors to be assigned to drawing elements in response to positional relationships among the drawing elements on the two-dimensional plane;

displaying color arrangement patterns responsive to the color arrangement rules;

specifying a color arrangement rule for the drawing to be prepared;

referencing the previously stored information concerning the color arrangement rules based on the specified color arrangement rule and determining colors of drawing elements contained in the drawing to be prepared; and generating image information representing the prepared drawing colored in response to the colors determined for the drawing elements contained in the prepared drawing.

According to a tenth aspect of the invention, there is provided a drawing method for preparing a drawing having at least one drawing element placed on a two-dimensional plane, said method comprising the steps of:

previously storing information concerning a plurality of color arrangement rules for determining colors to be assigned to drawing elements in response to positional relationships among the drawing elements;

specifying a color arrangement rule for the drawing to be prepared;

optically reading a monochrome or single-color original image used as an original of the drawing to be prepared and containing at least a drawing element marked with a color mark and generating original image information;

referencing the previously stored information concerning the color arrangement rules based on the specified color arrangement rule and determining a color of the drawing element marked with a color mark contained in the original image based on the original image information; and generating image information representing the prepared drawing colored in response to the colors determined for the drawing elements contained in the prepared drawing and the original image information.

According to an eleventh aspect of the invention, there is provided a drawing system for preparing a drawing having at least one drawing element placed on a two-dimensional plane, said system comprising:

placeable point storage means for storing identifiers for uniquely identifying a plurality of placeable points for placing the drawing elements and positions of the placeable points on the two-dimensional plane in a one-to-one correspondence therebetween;

element storage means for storing the identifiers of the placeable points at which the drawing elements are placed and colors of the drawing elements;

means for storing at least one position rule for determining the positions of the placeable points on the two-dimensional plane;

means for selecting one of the position rules;

placeable point change means for determining positions of the placeable points on the two-dimensional plane stored in said placeable point storage means based on the position rule selected through said position rule selection means;

color arrangement change means for determining colors of the drawing elements placed at the placeable points based on the positions of the placeable points on the two-dimensional plane determined by said placeable point change means and storing the determined colors in said element storage means; and means for generating an image comprising the drawing elements having the element colors placed on the two-dimensional plane based on the identifiers of the placeable points and the element colors stored in said element storage means and the identifiers of the placeable points and the positions of the placeable points on the two-dimensional plane, the identifiers and the positions being related to each other by said placeable point storage means.

According to a twelfth aspect of the invention, there is provided the drawing system as mentioned in the eleventh aspect of the invention, wherein said color arrangement change means uses one of the placeable points as a reference, finds positional relationship between the placeable point as the reference and a different placeable point based on their positions on the two-dimensional plane, and determines the color of the drawing element placed at the different placeable point based on the positional relationship.

According to a thirteenth aspect of the invention, there is provided the drawing system as mentioned in the twelfth aspect of the invention, wherein the positional relationship between the placeable point as the reference and a different placeable point is a direction.

According to a fourteenth aspect of the invention, there is provided a drawing system for preparing a drawing having at least one drawing element placed on a two-dimensional plane, said system comprising:

placeable point storage means for storing two-dimensional coordinates as identifiers for uniquely identifying a plurality of placeable points for placing the drawing elements and positions of the placeable points on the two-dimensional plane in a one-to-one correspondence therebetween;

element storage means for storing the two-dimensional coordinates indicating the identifiers of the placeable points at which the drawing elements are placed and colors of the drawing elements;

means for storing at least one position rule for determining the positions of the placeable points on the two-dimensional plane;

means for selecting one of the position rules;

placeable point change means for determining positions of the placeable points on the two-dimensional plane stored in said placeable point storage means based on the position rule selected through said position rule selection means;

means for storing a plurality of color arrangement rules which are color arrangement rules for determining colors of the drawing elements placed at the placeable points based on the two-dimensional coordinates indicating the identifiers of the placeable points or color arrangement rules for determining colors of the drawing elements placed at the placeable points based on the positions of the placeable points on the two-dimensional plane determined by said placeable point change means;

means for selecting at least one of the color arrangement rules stored in said color arrangement rule storage means;

color arrangement change means for determining colors of the drawing elements placed at the placeable points based on the color arrangement rule selected through said color arrangement rule selection means and storing the determined colors in said element storage means; and means for generating an image comprising the drawing elements having the element colors placed on the two-dimensional plane based on the identifiers of the placeable points and the element colors stored in said element storage means and the identifiers of the placeable points and the positions of the placeable points on the two-dimensional plane, the identifiers and the positions being related to each other by said placeable point storage means.

According to a fifteenth aspect of the invention, there is provided a drawing method for preparing a drawing having at least one drawing element placed on a two-dimensional plane, said method comprising the steps of:

previously storing at least one position rule for determining positions of placeable points on the two-dimensional plane for placing the drawing elements in the drawing to be prepared;

selecting a desired position rule from the at least one position rule previously stored;

determining positions of the placeable points on the two-dimensional plane based on the selected position rule;

relating one drawing element contained in the drawing to be prepared to one of the placeable points;

determining colors of the drawing elements related to the placeable points based on the positions of the placeable points on the two-dimensional plane; and generating an image comprising the drawing elements having the determined colors placed on the two-dimensional plane based on the positions of the placeable points on the two-dimensional plane, the drawing elements related to the placeable points, and the determined colors for the drawing elements.

According to this configuration, the user can determine a color arrangement rule while actually seeing color arrangement patterns; a drawing more matching the user's purposes can be prepared. In this case, if the drawing targets, etc., and color arrangement patterns are displayed in the correspondence therebetween, the user can select a color arrangement furthermore easily.

Also, according to this configuration, a color image to which an appropriate color arrangement is applied can be easily provided simply by marking a monochrome image with color marks for processing, for example.

The above and other objects and features of the present invention will be more apparent from the following description taken in conjunction with the accompanying drawings.

BRIEF DESCRIPTION OF THE DRAWINGS

In the accompanying drawings:

FIG. 4 is an illustration to explain data in a color arrangement option storage section 107 in the first embodiment of the invention;

FIG. 5 is an illustration to explain data in an option-to-setting rule correspondence storage section 108 in the first embodiment of the invention;

FIG. 15 is an illustration to explain data in an option-to-setting rule correspondence storage section 208 in the second embodiment of the invention;

DETAILED DESCRIPTION OF THE PREFERRED EMBODIMENTS

Figure 1:
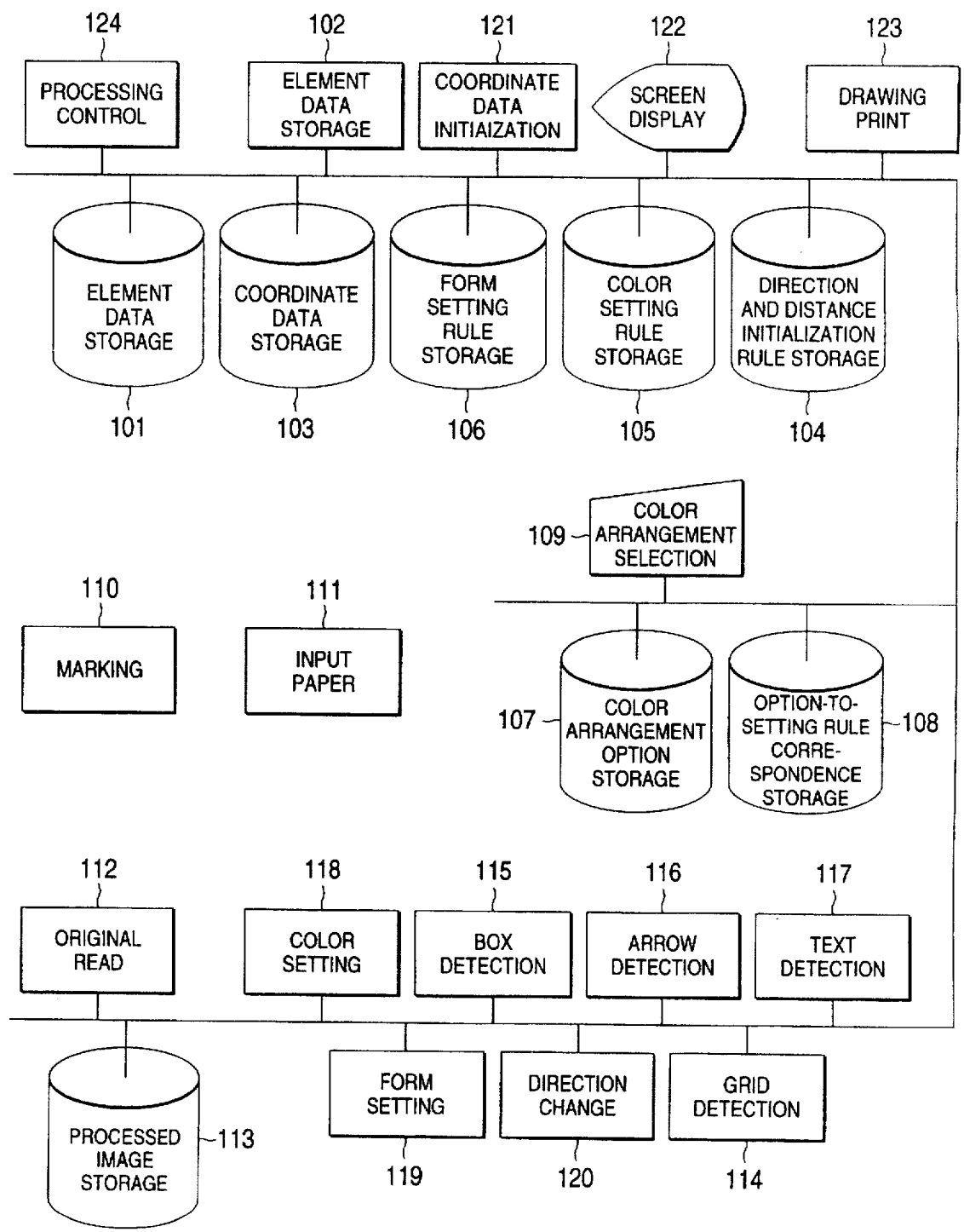
FIG. 1 is a block diagram to show a first embodiment of the invention the whole.

Now, a description will be given in more detail of the preferred embodiments of the present invention with reference to the accompanying drawings.

EMBODIMENT 1

A first embodiment of a drawing system of the invention will be discussed. Roughs are sketched on an input sheet of paper and are optically read and a color arrangement is also specified, whereby an attractive or impressive drawing well balanced in color arrangement is prepared. Here, a general flow of the drawing operation using the drawing system before the configuration and the operation of the drawing system are discussed.

In the embodiment, the user draws a picture on paper on which a grid is printed (input paper 111) with a color marker pen. The input paper on which the picture is drawn is optically read. At the same time, when the user selects a color arrangement of the picture from options on a touch panel, a color original document with colors arranged based on the selection is output.

In the embodiment, the three types of drawing elements are available: Box, arrow, and text. The box is drawn with a closed curve on input paper by the user, such as a circle or a square. The arrow is drawn in the form of→. The text is a character string written onto the drawing.

In the embodiment, the user is given color marker pens of different colors for drawing according to the drawing element types of box, arrow, and text. The system uses the color differences to detect the drawing element type.

The color of the grid printed on input paper also differs from the colors of the color marker pens. The user draws a picture with any color marker pen with the grid as the reference. The system uses the color difference between the drawing elements and the grid to recognize the elements and the grid separately and detect the positional relationships among the elements with the grid as the reference.

Next, the configuration of the drawing system of the embodiment will be discussed. The drawing system can be realized as software for a dedicated wordprocessor or digital copier or a general-purpose personal computer, workstation, or host computer.

FIG. 1 shows the drawing system on the whole. In the figure, the drawing system has an original read section 112 and a color arrangement selection section 109 for accepting commands and specification entered by the user. The original read section 112 reads an original prepared by the user performing marking operation on input paper 111. The user commands and specification are executed in an execution section comprising an element data change section 102, a coordinate data change section 121, a drawing print section 123, a grid detection section 114, a box detection section 115, an arrow detection section 116, a text detection section 117, a color setting section 118, a form setting section 119, a direction change section 120, etc. A processing control section 124 controls the entire drawing system.

In execution of the sections, a storage section stores various pieces of data. It comprises an element data storage section 101, a coordinate data storage section 103, a direction and distance initialization rule storage section 104, a color setting rule storage section 105, a form setting rule storage section 106, a color arrangement option storage section 107, an option-to-setting rule correspondence storage section 108, and a processed image storage section 113. The drawing being prepared is displayed on a screen display section 122 each time, and the finally prepared drawing is printed by a drawing print section 123.

The sections will be discussed in detail.

[Element data storage section 101]

This element data storage section 101 has a function of storing information concerning the form, color, and placement for each drawing element. In the embodiment, attribute data concerning the drawing elements is stored in the table format. The table lists the correspondences between the attributes and attribute values. One table is prepared for each element and is assigned an ID to uniquely identify the table in the system. The attributes will be discussed below:

The attributes include position, color, form, text, and display order. The attribute position indicates the position on a two-dimensional plane of the element and takes a coordinate ID of coordinates where the element can be placed (described later) as an attribute value. The attribute color indicates the color of the element and takes a value representing the color of the element on L*a*b* of a scale defined by International Association of Illumination as an attribute value. The attribute form indicates the form of the element and takes a value describing the form of the element in PostScript (trademark of Adobe Systems, Inc.) of a page description language as an attribute value. The attribute text indicates the contents of the text if the element type is a text, and takes a value color bit map data as an attribute value. The attribute display order indicates the display order of the element. Since drawings are overwritten one on another in the embodiment, if elements are overlapped, the drawing in the later display order is seen on this side of the user. The attribute display order takes a unique positive value.

[Element data change section 102]

This element data change section 102 has a function of changing information stored in the element data storage section in response to an instruction from other functional sections. Preparation of a drawing element, namely, preparation of a new table is executed according to an instruction sent from other functional sections. Upon reception of the instruction, first a new table is prepared in the element data storage section 101. The values of the attributes at the point in time are as follows:

Attributes color, form, and text are nil.

Attribute display order takes one added to the maximum value of the attribute values that the tables existing the element data storage section 101 has at the point in time.

As a result of execution of the preparation instruction, the ID of the new prepared table is returned.

Direct assignment instructions are provided for setting the attribute values of the attributes color, form, and text. Each of the assignment instructions takes the table ID, the assigned attribute, and the assigned value as arguments. Upon reception of the instruction, the element data change section 102 searches the tables stored in the element data storage section 101 for a table having the ID passed as the argument, and replaces the attribute value of the table with the passed value.

For the attribute color, relative change instructions of lightness, saturation, and hue are provided as attribute value change instructions. Each of the change instructions takes the table ID and the change amount from the current value as arguments. As in the above-described attribute value setting, the table ID is used to find the table to which a new value is to be assigned. The change amount is a real value; only the hue is changed in radian units. To change the lightness, the change amount is added to the current L* value. To change the saturation and hue, the saturation and hue are calculated from the current a* and b* values and the change amounts are added to them, then calculation of distributing the addition results to the a* and b* values is executed. For the hue change amounts, it is assumed that the "plus change" direction is clockwise in an a-b coordinate system (a is the horizontal axis and b is the vertical axis).

For the attribute form, size and direction are provided as attribute value change instructions. Each of the change instructions takes the table ID and a real value as arguments. As in the above-described attribute value setting, the table ID is used to find the table to which a new value is to be assigned. To change the size, the given real value is handled as a magnification to the length in percent units and the current attribute value is changed so as to set the size responsive to the value. To change the direction, the given real value is handled as a rotation amount in degree units and the current attribute value is changed so that the direction is changed in response to the value. The direction change is a relative change, and it is assumed that the "plus change" direction is clockwise with respect to the top of an original.

If the element type is specified in place of the table ID as a specification method in the change instructions, change based on another argument value is applied to all elements of the type specified.

[Coordinate data storage section 103]

This coordinate data storage section 103 has a function of storing information concerning coordinates on a two-dimensional plane on which drawing elements can be placed. In the embodiment, the number of coordinate sets that can be placed matches the number of grid points of the grid printed on input paper. Data of one coordinate set consists of an coordinate ID and values indicating the coordinate position on the two dimensions. The coordinate ID is used to uniquely identify the coordinates. In the embodiment, it is represented by a two-dimensional positive value pair, such as {1, 1}.

Figure 2:
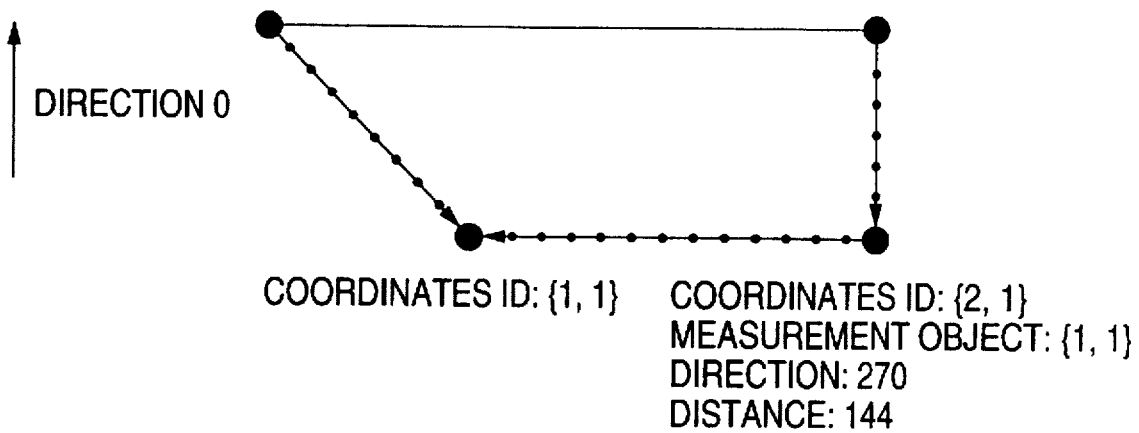
FIG. 2 is a diagram to explain coordinate data description in the first embodiment of the invention.

The values indicating the position are indicated by the direction and distance with respect to a different coordinate point as a measurement object. The coordinate point which becomes the measurement object is one point, which is indicated by the coordinate ID. The direction indicates the direction of the measurement object from the coordinate point and is indicated by the clockwise angle with the direction which becomes the top at the print time as 0 degrees. The distance is indicated by a non-negative integer value in point units of print units. FIG. 2 shows a conceptual diagram of the values indicating the position. For example, the upper-left coordinate point {1, 2} in FIG. 2 is indicated by the direction of 135 degrees and the distance of 102 points with the coordinate point {1, 1} as the measurement object (reference).

[Direction and distance initialization rule storage section 104]

Figure 3:
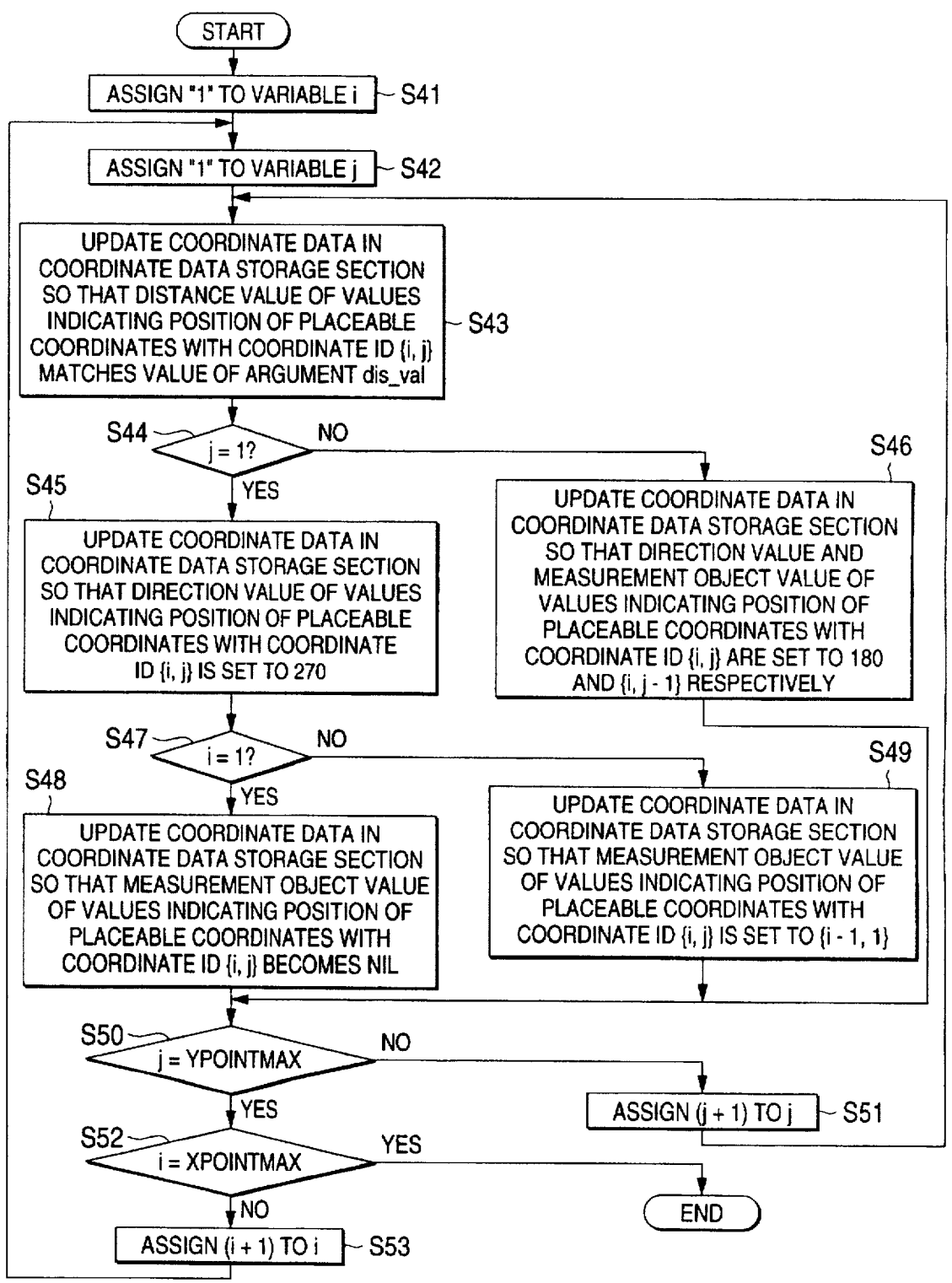
FIG. 3 is a flowchart to explain the operation of rule 1 stored in a direction and distance initialization rule storage section 104 in the first embodiment of the invention.

This direction and distance initialization rule storage section 104 stores a coordinate data initialization rule. In the embodiment, the initialization rule is described as a sequential procedure by a program having a syntax like a C language. It provides equally spaced coordinate placement and a grid-like composition on the whole. In the initialization rule (rule_1 (dis_val)), the distance between contiguous grid points is set to the dis_val value in all coordinates. The initialization rule is described in a manner like the C language as follows: FIG. 3 shows the operation executed according to the initialization rule.

Composition formation processing according to rule 1 will be discussed with reference to the flowchart in FIG. 3. First, 1 is assigned to variable i at step 41. Next, 1 is assigned to variable j at step 42. At step 43, the coordinate data in the coordinate data storage section is updated so that the distance value of values indicating the position of placeable coordinates with coordinate ID {i, j} matches the value of argument dis_val.

Next, control goes to step 44 and whether or not the variable j is 1 is determined. If the variable j is determined to be 1, then control goes to step 45 at which the coordinate data in the coordinate data storage section is updated so that the direction value of values indicating the position of placeable coordinates with coordinate ID {i, j} is set to 270. Then, control goes to step 47. On the other hand, if it is not determined at step 44 that the variable j is 1, control goes to step 46 and the coordinate data in the coordinate data storage section is updated so that the direction value and measurement object value of values indicating the position of placeable coordinates with coordinate ID {i, j} are set to 180 and {i, (j-1)} respectively. Then, control goes to step 50.

Whether or not the variable i is 1 is determined at step 47. If the variable i is determined to be 1, then control goes to step 48 and the coordinate data in the coordinate data storage section is updated so that the measurement object value of values indicating the position of placeable coordinates with coordinate ID {i, j} becomes nil. Then, control goes to step 50. On the other hand, if it is not determined at step 47 that the variable i is 1, control goes to step 49 and the coordinate data in the coordinate data storage section is updated so that the measurement object value of values indicating the position of placeable coordinates with coordinate ID {i, j} is set to {(i-1), 1}. Next, control goes to step 50.

At step 50, whether or not the value of the variable j equals YPOINTMAX is determined. If the value of the variable j does not equal YPOINTMAX as a result of the determination, control goes to step 51 at which the variable j is incremented, and control returns to step 43. The process starting at step 43 is continued. On the other hand, if it is determined at step 50 that the value of the variable j equals YPOINTMAX, then control goes to step 52 and whether or not the value of the variable i equals XPOINTMAX is determined. If the value of the variable i does not equal XPOINTMAX as a result of the determination, control goes to step 53 at which the variable i is incremented, and control returns to step 42. The process starting at step 42 is continued. On the other hand, if it can be determined at step 52 that the value of the variable i equals XPOINTMAX, then the process is terminated. According to rule 1 of the position rules, equally spaced coordinate points are thus placed for forming a composition like a grid on the whole.

TABLE 1 rule_1(dis_val)
{
    for(i=1; XPOINTMAX;i++){
        for(j=1; YPOINTMAX;++){
            p=point_data({i,j});
            p—>position—>distance=dis_val;

TABLE 1-continued

```
    if(j==1){
        p—>position—>angle =270;
        if(i==1)
            p—>position—>reference=0;
        else
            p—>position—>reference={i-1,1};
        }
    else{
        p—>position—>angle=180;
        p—>positoin—>reference={i,j-1};
        }
    }
  }
}
``` where the function point_data ({i, j}), which is system-defined, returns a pointer for coordinate ID to access the {i,j} coordinate data, whereby the attribute values of coordinate data can be referenced or assigned like p→position→angle. XPOINTMAX and YPOINTMAX are macros indicating the maximum numbers of X and Y coordinates that can be placed. The function reset_reference ({i, j}) is a system-defined function for setting the coordinates used as the reference point for setting the direction and distance to coordinate ID {i, j} and expanding measurement object concatenation like a tree from the coordinates. The distance and direction are set properly so that the coordinate placement remains unchanged after the function is applied as the measurement object is changed. With coordinate ID {l, m}, the measurement object is set as follows:

When i<i and m=j, measurement object is coordinate ID {l+1, m} when i>i and m=j, measurement object is coordinate ID {l-1, m} when m>j, measurement object is coordinate ID {l, m-1} when m<j, measurement object is coordinate ID {l, m+1}

The system-defined functions and macros are defined in the coordinate data change section 121 described later.

[Color setting rule storage section 105]

This color setting rule storage section 105 has a function of storing rules related to element color arrangements. In the embodiment, the rules are stored according to a table which lists the correspondences between the L*a*b values set in the element attribute color and words representing the color, such as red and blue.

[Form setting rule storage section 106]

This form setting rule storage section 106 has a function of storing rules related to the element form. It has a table which lists the correspondences between PostScript programs set in the element attribute form and words representing the form, such as column and arrowhead. A criterion is provided for the size of an image described in each PostScript program. Here, the image size is defined as the size falling within a square of 144 points×144 points (namely, two inches square). The actual element size of each drawing is determined by enlarging or reducing the square according to the grid spacing of input paper and the selected rule.

The image used as an arrow element described in each PostScript program is defined as an upward arrow. The arrow direction of each arrow element is determined by rotating the image according to the selected rule.

[Color arrangement option storage section 107]

This color arrangement option storage section 107 has a function of storing color arrangement options. In the embodiment, one color arrangement is represented by a set of an ID, a character string, and an image (bit map data). The ID is used for each functional section to uniquely identify each color arrangement and consists of a character string CC indicating a color arrangement, followed by a unique positive value, such as CC3. The character string and the image are a word or words and a coloring pattern for enabling the user to distinguish the color arrangement from others; they show the features of the drawing to be prepared.

In the embodiment, the color arrangement options are stored as data in the table format. FIG. 4 shows an example of the data.

[Option-to-setting rule correspondence storage section 108]

This option-to-setting rule correspondence storage section 108 has a function of storing the correspondences between the color arrangements stored in the color arrangement option storage section 107 and the words stored in the color setting rule storage section 105 and the form setting rule storage section 106.

In the embodiment, the correspondences are stored by using data in the table format relating the color arrangement IDs and words to each other. In the embodiment, the words are related to each element type so that different coloring and form can be taken for each element type for one color arrangement. For the BOX element, four colors are related so that different coloring is enabled for each element. FIG. 5 shows an example of the data based on the example in FIG. 4.

[Color arrangement selection section 109]

This color arrangement selection section 109 has a function of selecting one from among options stored in the color arrangement option storage section 107 in response to a user command and storing the result. It also has a function of responding to inquiries from other functional sections with the result.

Figure 6:
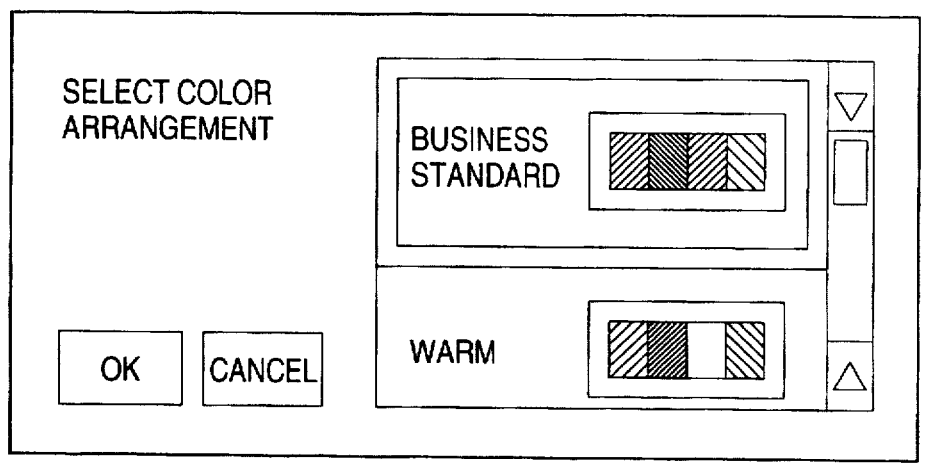
FIG. 6 is an illustration to show a color arrangement selection screen provided by a color arrangement selection section 109 in the first embodiment of the invention.

In the embodiment, the color arrangements stored in the color arrangement option storage section 107 can be displayed on the screen display section 122 in the format as shown in FIG. 6. The options are displayed in a window that can be scrolled.

If the user selects one from among the color arrangements displayed on the screen, that is, selects a pair of the character string and image indicating any desired color arrangement (the selected one is surrounded by a solid line) and then clicks on OK, the color arrangement selection section 109 checks the ID of the selected color arrangement.

[Marking operation 110]

This is drawing operation on input paper 111 to be read through the original read section 112. In the embodiment, color marker pens different in color are used. The color marker pen colors, which will be hereinafter called marker colors, are assigned so as to be in a one-to-one correspondence with the drawing elements types of box, arrow and text. In the embodiment, colors other than white are used as the marker colors.

[Input paper 111]

This input paper 111 has a function of media for preparing drawings to be read through the original read section 112. A grid used to detect the positional relationships among the drawing elements is printed on the input paper 111. The grid comprises straight lines equally spaced from each other and intersecting at right angles. The grid color differs from the marker colors. In the embodiment, the paper color is white and the grid color is a color other than white.

[Original read section 112]

This original read section 112 optically scans a monochrome original to be processed, decomposes it into R (red), G (green), and B (blue) of three primary colors of light, generates digital color image data with 256 levels of gray, and stores the data in the processed image storage section 113.

Figure 7:
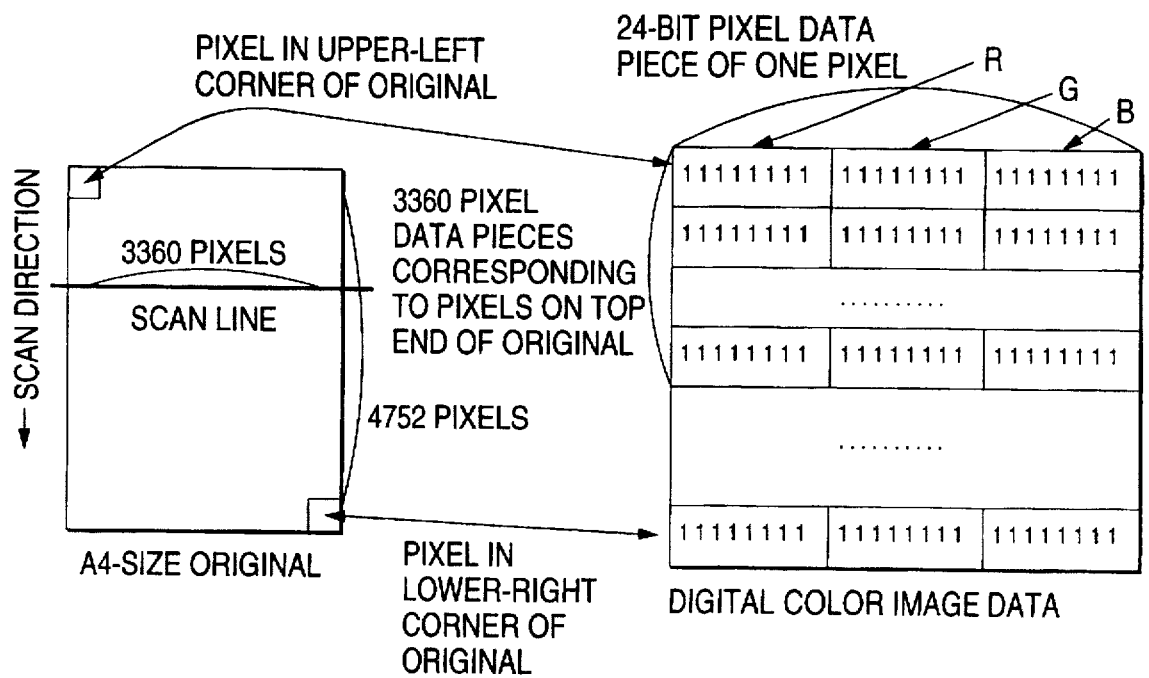
FIG. 7 is an illustration to explain the operation of an original read section 112 in the first embodiment of the invention.

One pixel of the generated digital color image data corresponds to 0.0625 mm square on the original (16×16 pixels per mm²; resolution of about 400 dpi). One pixel data piece is represented by 24 bits (a contiguous sequence of three bytes of data). The first eight bits of the 24 bits indicate 256-level gray scale data of R, the middle eight bits indicate 256-level gray scale data of G, and the last eight bits of the 24 bits indicate 256-level gray scale data of B. When all bits are set on, white is indicated; when all bits are set off, black is indicated. (See FIG. 7.)

Digital color image data provided by one scan corresponds to one sheet of A4-size paper and is represented as (3360×4752) contiguous pixel data pieces. The pixel data order is uniquely determined from the pixel data positions on the original. It is matched with optical scan of moving a scan line provided by CCDs along the short side direction of the original in the long side direction thereof. Assuming that an A4-size original is placed in portrait orientation, the first to 3360th pixel data pieces correspond to the pixels on the top end of the original arranged in order from left to right and 4752 sets of pixel data pieces each set consisting of 3360 data pieces are arranged in order from top to bottom of the original.

[Processed image storage section 113]

This processed image storage section 113 stores the digital color image data to be processed, which will be hereinafter called image to be processed or processed image. The data size of an image to be processed is about 46 Mbytes.

[Grid detection section 114]

This grid detection section 114 has a function of detecting a grid from the image to be processed and instructing the coordinate data change section 121 to initialize coordinate data based on the detected grid. It also has a function of returning information concerning the grid contained in specific pixel data in the image to be processed in response to an instruction from other functional sections. The grid detection section 114 previously measures the color of the grid printed on input paper 111 and stores the conversion result of the color to the pixel data format. It also stores the values in the allowable range for the color. The information is used to detect the grid.

One grid line is parallel with or orthogonal to the scan line when an original is input. Therefore, the grid can be extracted if the pixel data matching the grid color (containing the allowable values) is checked for address regularity in the data structure of the image to be processed, shown in FIG. 7.

The grid detection section 114 can detect the numbers of horizontal and vertical grid points of an original and grid point spacing in point units. It can also detect the number of grid points contained in one pixel data group and vertical or horizontal grid lines contained therein.

[Box detection section 115]

This box detection section 115 has a function of detecting an element whose type is box from the image to be processed and newly storing information concerning the detected element in the element data storage section 101. It detects the element in response to an instruction from the processing control section 124; it detects one undetected box element from the image to be processed upon reception of one instruction. If an element is detected, any value other than nil is returned; if no element is detected, nil is returned, as shown in an algorithm described later.

The box detection section 115 previously measures the box marker color and stores the conversion result of the color into the pixel data format. It also stores the values in the allowable range for the color. The information is used to detect box elements.

The box detection section 115 performs processing according to the following algorithm:

Step 1: The pixel data of the image to be processed is checked in order starting at the first pixel data piece of the image to be processed (namely, the pixel in the upper-left corner of the original) to see if color matches the box marker color (containing the allowable range). If a match is found, the address of the pixel data piece is stored as "contour pixel data address." If no match is found, nil is returned and the process is terminated.

Step 2: An element generation instruction is sent to the element data change section 102. A value returned therefrom is stored as "new element ID."

Step 3: The image to be processed is searched for all pixel data of the box marker color concatenated on the original to the pixel data found at step 1 forming a closed curve, and the addresses of the found data are added to the "contour pixel data address" for storage.

Step 4: The image to be processed is searched for all pixel data existing inside the closed curve indicated by the "contour pixel data addresses" on the original, and the addresses of the found data and the "contour pixel data addresses" are stored as "box area pixel data addresses."

Step 5: The "box area pixel data addresses" are passed to the grid detection section 114, which then is instructed to check the order of vertical grid lines entering the area indicated by the addresses on the original. The result is stored as the "vertical line range."

Step 6: The "box area pixel data addresses" are passed to the grid detection section 114, which then is instructed to check the order of horizontal grid lines entering the area indicated by the addresses on the original. The result is stored as the "horizontal line range."

Step 7: The grid point which is the nearest to the center point of the rectangle on the original indicated by the "vertical line range" and "horizontal line range" is found. Assume that the grid point is the intersection of the Xth vertical line from the left and the Yth horizontal line from the bottom. At this time, the box detection section 115 instructs the element data change section to set the values of the attribute position of the element indicated by the "new element ID" to {X, Y}.

Step 8: The colors of the pixel data at the "contour pixel data addresses" are all set to white.

Step 9: Resultantly, a set of the "new element ID," "vertical line range," and "horizontal line range" is returned and the process is terminated.

[Arrow detection section 116]

This arrow detection section 116 has a function of detecting an element whose type is arrow from the image to be processed and newly storing information concerning the detected element in the element data storage section 101.

The arrow detection section 116 detects the element in response to an instruction from the processing control section 124; it detects one undetected arrow element from the image to be processed upon reception of one instruction. If an element is detected, any value other than nil is returned; if no element is detected, nil is returned, as shown in an algorithm described later. The arrow detection section 116 previously measures the arrow marker color and stores the conversion result of the color into the pixel data format. It also stores the values in the allowable range for the color. The information is used to detect arrow elements.

The arrow detection section 116 performs processing according to the following algorithm:

Step 1: The pixel data of the image to be processed is checked in order starting at the first pixel data piece of the image to be processed (namely, the pixel in the upper-left corner of the original) to see if color matches the arrow marker color (containing the allowable range). If a match is found, the address of the pixel data piece is stored as "contour pixel data address." If no match is found, nil is returned and the process is terminated.

Step 2: A drawing element generation instruction is sent to the element data change section 102. A value returned therefrom is stored as "new element ID."

Step 3: The image to be processed is searched for all pixel data of the arrow marker color concatenated on the original to the pixel data found at step 1 forming a line, and the addresses of the found data are added to the "contour pixel data address" for storage.

Step 4: The image to be processed is searched for all pixel data corresponding to the minimum rectangle containing the line indicated by the "contour pixel data addresses" on the original, and they are stored as "arrow area pixel data addresses."

Step 5: The "arrow area pixel data addresses" are passed to the grid detection section 114, which then is instructed to check the order of vertical grid lines entering the area indicated by the addresses on the original. The result is stored as the "vertical line range."

Step 6: The "arrow area pixel data addresses" are passed to the grid detection section 114, which then is instructed to check the order of horizontal grid lines entering the area indicated by the addresses on the original. The result is stored as the "horizontal line range."

Step 7: The grid point which is the nearest to the center point of the rectangle on the original indicated by the "vertical line range" and "horizontal line range" is found. Assume that the grid point is the intersection of the Xth vertical line from the left and the Yth horizontal line from the bottom. At this time, the arrow detection section 116 instructs the element data change section 102 to set the values of the attribute position of the element indicated by the "new element ID" to {X, Y}.

Step 8: The direction in which the arrow is oriented is examined from the "contour pixel data addresses." To do this, first the arrowhead, namely, pixel data with the line branching to three lines on the original is found out. Next, the longest one of the three branch lines is found out. The arrow mark direction is found from the address pattern of the pixel data forming the line, and the arrow direction is found based on which end point of the line the arrowhead is at. The result is stored as the "arrow direction." The criteria for the arrow directions are the same as those for the coordinate data directions.

Step 9: The colors of the pixel data at the "contour pixel data addresses" are all set to white.

Step 10: Resultantly, a set of the "new element ID," "vertical line range," "horizontal line range," and "arrow direction" is returned and the process is terminated.

[Text detection section 117]

This text detection section 117 has a function of detecting an element whose type is text from the image to be processed and storing information concerning the detected element in the element data storage section 101. It detects the element in response to an instruction from the processing control section 124; it detects one undetected text element from the image to be processed upon reception of one instruction. If an element is detected, any value other than nil is returned; if no element is detected, nil is returned, as shown in an algorithm described later.

The text detection section 117 previously measures the text marker color and stores the conversion result of the color into the pixel data format. It also stores the values in the allowable range for the color. The information is used to detect text elements.

The text detection section 117 performs processing according to the following algorithm:

Step 1: The pixel data of the image to be processed is checked in order starting at the first pixel data piece of the image to be processed (namely, the pixel in the upper-left corner of the original) to see if color matches the text marker color (containing the allowable range). If a match is found, the address of the pixel data piece is stored as "contour pixel data address." If no match is found, nil is returned and the process is terminated.

Step 2: A drawing element generation instruction is sent to the element data change section 102. A value returned therefrom is stored as "new element ID."

Step 3: The image to be processed is searched for all pixel data concatenated on the original to the pixel data found at step 1 forming a line, and the addresses of the found data are added to the "contour pixel data address" for storage.

Step 4: The image to be processed is checked to see if pixel data having the text marker color exists within 5 mm on the original from the image data at the "contour pixel data addresses." If the pixel data exists, control goes to step 5; otherwise, control is passed to step 6.

Step 5: The image to be processed is searched for all pixel data concatenated on the original to the pixel data found at step 4 forming a line, and the addresses of the found data are added to the "contour pixel data addresses" for storage. Then, control is returned to step 4.

Step 6: The image to be processed is searched for all pixel data corresponding to the minimum rectangle containing the "contour pixel data addresses" on the original, and they are stored as "text area pixel data addresses."

Step 7: The "text area pixel data addresses" are passed to the grid detection section 114, which then is instructed to check the order of vertical grid lines entering the area indicated by the addresses on the original. The result is stored as the "vertical line range."

Step 8: The "text area pixel data addresses" are passed to the grid detection section 114, which then is instructed to check the order of horizontal grid lines entering the area indicated by the addresses on the original. The result is stored as the "horizontal line range."

Step 9: The grid point which is the nearest to the center point of the rectangle on the original indicated by the "vertical line range" and "horizontal line range" is found. Assume that the grid point is the intersection of the Xth vertical line from the left and the Yth horizontal line from the bottom. At this time, the text detection section 117 instructs the element data change section 102 to set the values of the attribute position of the element indicated by the "new element ID" to {X, Y}.

Step 10: Image data such that only the image in the portion indicated by the "text area pixel data addresses" is copied from the image to be processed is generated. Pixel colors are changed so that the pixels in the portion corresponding to the text are set to black and that other pixels are set to white with the image data. The text detection section 117 instructs the element data change section 102 to set the image data after the change to the text attribute of the element indicated by the "new element ID."

Step 11: The colors of the pixel data at the "contour pixel data addresses" are all set to white.

Step 12: Resultantly, the "new element ID" is returned and the process is terminated.

[Color setting section 118]

This color setting section 118 has a function of setting the element color in response to the element placement and type and the selected color arrangement according to an instruction from other functional sections. Setting instruction arguments are table ID in the element data storage section and element type.

In the embodiment, for the element type box, what color is to be assigned is determined from the coordinates set in the attribute position of the table indicated by the passed ID. The color setting section 118 performs processing according to the following algorithm in which box element color is assigned based on the Y coordinate value of the coordinates set in the attribute position, namely, the same color is assigned to the box elements positioned on the same horizontal grid line on the original:

Step 1: The table ID and element type passed as the arguments are stored as "new element ID" and "new element type."

Step 2: The ID of the color arrangement selected by the user is inquired of the color arrangement selection section 109. The answer to the inquiry is stored as "color arrangement ID."

Step 3: Whether or not the "new element type" is box is checked. If it is box, control goes to step 4; otherwise, control goes to step 6.

Step 4: The coordinates set in the attribute position of the table indicated by the "new element type" are checked and the Y coordinate is stored as "Y coordinate."

Step 5: Assume that the remainder when "Y coordinate" is divided by four is M and that if M=0, N=4; otherwise, N=M. At this time, the color related to the Nth box element in the color setting rule related to the "color arrangement ID" in the information in the option-to-setting rule correspondence storage section 108 (in FIG. 5, color under the "Box 1" if N=1) is stored as "color application rule." Then, control goes to step 7.

Step 6: "New element type" element is found out in the color setting rule related to the "color arrangement ID" in the information in the option-to-setting rule correspondence storage section 108 and is stored as "color application rule."

Step 7: The L*a*b* value related to the "color application rule" in the information in the color setting rule storage section 105 is found out, and a change instruction is sent to the element data change section 102 for instructing the section 102 to set the value to the attribute color of the element with the "new element ID."

[Form setting section 119]

This form setting section 119 has a function of setting the element form in response to the element type and the selected color arrangement according to an instruction from other functional sections. Setting instruction arguments are table ID in the element data storage section 101, the element type, the number of horizontal grid points, and the number of vertical grid points. The number of horizontal grid points indicates how many vertical grid lines the element for which value is to be set contains on the original. That is, it is a value that can be obtained from the "vertical line range" returned by the box detection section 115 or the arrow detection section 116 as the detection result. The number of vertical grid points is indicates how many horizontal grid lines the element for which value is to be set contains on the original. That is, it is a value that can be obtained from the "horizontal line range" returned by the box detection section 115 or the arrow detection section 116 as the detection result.

The form setting section 119 performs processing according to the following algorithm:

Step 1: The table ID, the element type, the number of horizontal grid points, and the number of vertical grid points passed as the arguments are stored as "new element ID," "new element type," "X count," and "Y count."

Step 2: The ID of the color arrangement selected by the user is inquired of the color arrangement selection section 109. The answer to the inquiry is stored as "color arrangement ID."

Step 3: "New element type" element is found out in the form setting rule related to the "color arrangement ID" in the information in the option-to-setting rule correspondence storage section 108 and is stored as "form application rule."

Step 4: The PostScript program related to the "form application rule" in the information in the form setting rule storage section 106 is found out, and a change instruction is sent to the element data change section 102 for instructing the section 102 to set the value to the attribute form of the element with the "new element ID."

Step 5: If the "X count" is not 1, a change instruction is sent to the element data change section 102 for instructing the section 102 to enlarge the horizontal length of the image indicated by the element with the "new element ID" by a magnification of the "X count" multiplied by 100 (in percent units).

Step 6: If the "Y count" is not 1, a change instruction is sent to the element data change section 102 for instructing the section 102 to enlarge the vertical length of the image indicated by the element with the "new element ID" by a magnification of the "Y count" multiplied by 100 (in percent units).

[Direction change section 120]

This direction change section 120 has a function of changing the arrow direction in response to the arrow direction on the original and the selected color arrangement for arrow element according to an instruction from other functional sections.

The arrow element is set upward on an output image by the form setting section 119 from definition of the form setting rule. The direction change section 120 changes the arrow direction properly after the arrow direction is set by the form setting section 119. Setting instruction arguments are ID of table in the element data storage section and the arrow direction on the original. For the arrow direction on the original, the arrow detection section 116 returns "arrow direction" as the detection result. This indicates the angle which the arrow direction forms clockwise with the upward direction on the original as 0 degrees. The direction change section 120 uses the element data change section 102 to rotate the element indicated by the table ID passed as the argument at the angle of the arrow direction on the original.

[Coordinate data initialization section 121]

This coordinate data initialization section 121 has a function of initializing the coordinate data in the coordinate data storage section 103 in response to an instruction sent from the grid detection section 114. It also has a function of changing the coordinate data in the coordinate data storage section 103 using the rule stored in the direction and distance initialization rule storage section 104 in response to an instruction sent from the color arrangement selection section 109. The coordinate data initialization section 121 stores macros and system-defined functions such as rest_reference ( ) described above and uses them to interpret the rule.

An initialization instruction takes the numbers of horizontal and vertical grid points of an original and grid point spacing in point units as arguments. When the initialization instruction is given, the coordinate data initialization section 121 first stores the number of horizontal grid points of the original as XPOINTMAX and the number of vertical grid points of the original as YPOINTMAX. Next, it causes the coordinate data storage section 103 to generate (XPOINTMAX×YPOINTMAX) coordinate data pieces that can be placed. Then, the coordinate data initialization section 121 assigns unique coordinate IDs {1, 1} to {XPOINTMAX, YPOINTMAX} to the coordinate data pieces. Last, it executes refst_reference ({1, 1}) to initialize the direction and distance of the coordinate data, then executes rule_1 ( ) with the passed grid point spacing as the argument.

Figure 8:
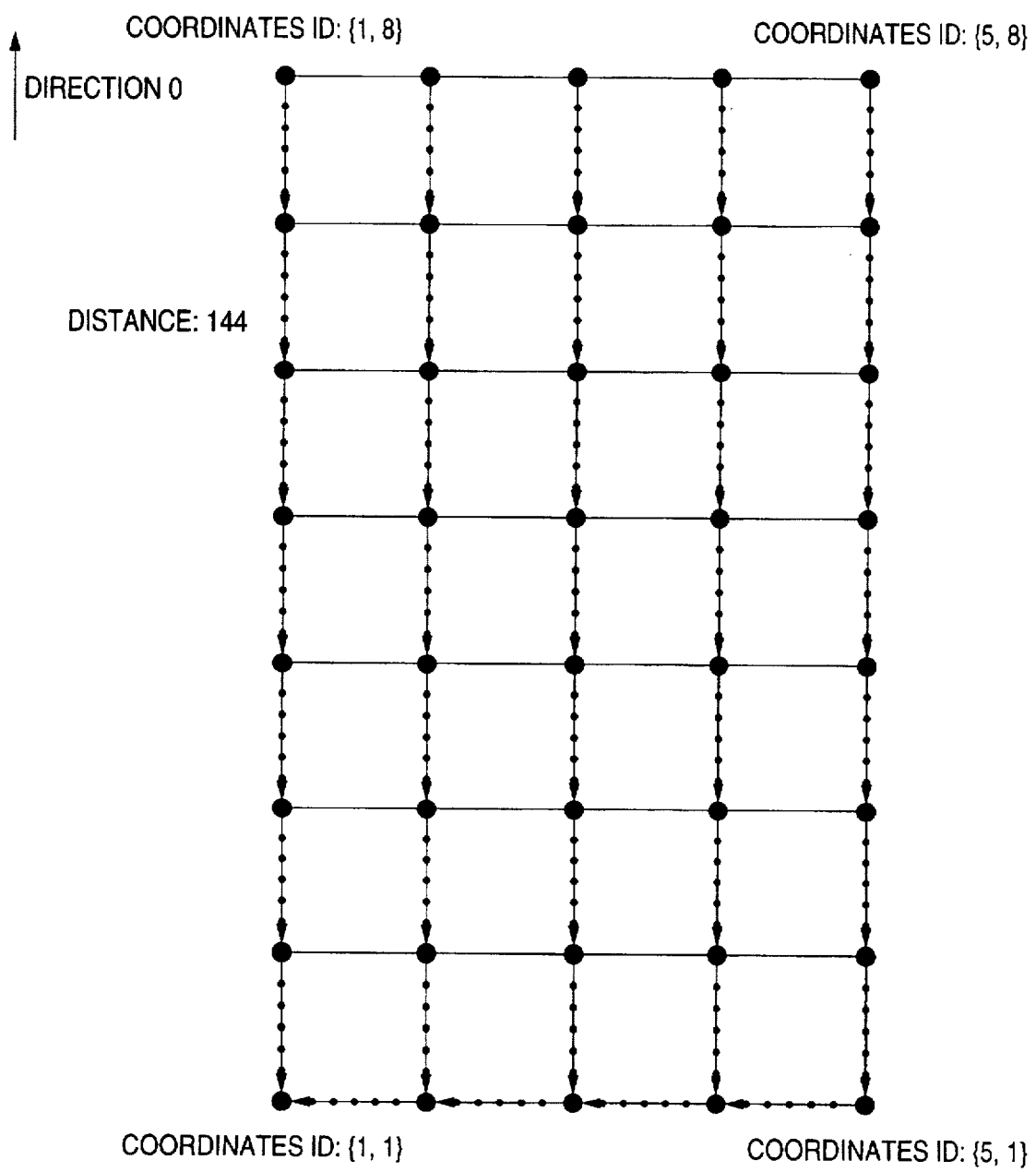
FIG. 8 is an illustration to show grid coordinates initialized by a coordinate data initialization section 121 in the first embodiment of the invention.

For example, if an initialization instruction is given with the number of horizontal grid points of the original as five, the number of vertical grid points of the original as eight, and the grid point spacing as 144, the coordinate data initialization section 121 sets the coordinate layout as shown in FIG. 8.

[Screen display section 122]

This screen display section 122 has a function of displaying option and value entry prompting messages, etc., on the screen in response to commands and selection described above.

[Drawing print section 123]

This drawing print section 123 has a function of interpreting element data stored in the element data storage section 101, converting the data into a CMYK raster image, and printing the CMYK image on paper or an OHP sheet. To draw drawing elements, they are overwritten on each other in the ascending order of the values of the attribute display order. Also, drawing is executed so that direction 0 is always oriented upward on paper or an OHP sheet. If one element has a value of the attribute text, first drawing is executed according to the attributes color and form, then the text is overwritten based on the value of the attribute text.

[Processing control section 124]

This processing control section 124 has a function of controlling the entire flow of processing. It also has a function of receiving start and end instructions of the entire system from the user.

Figure 9:
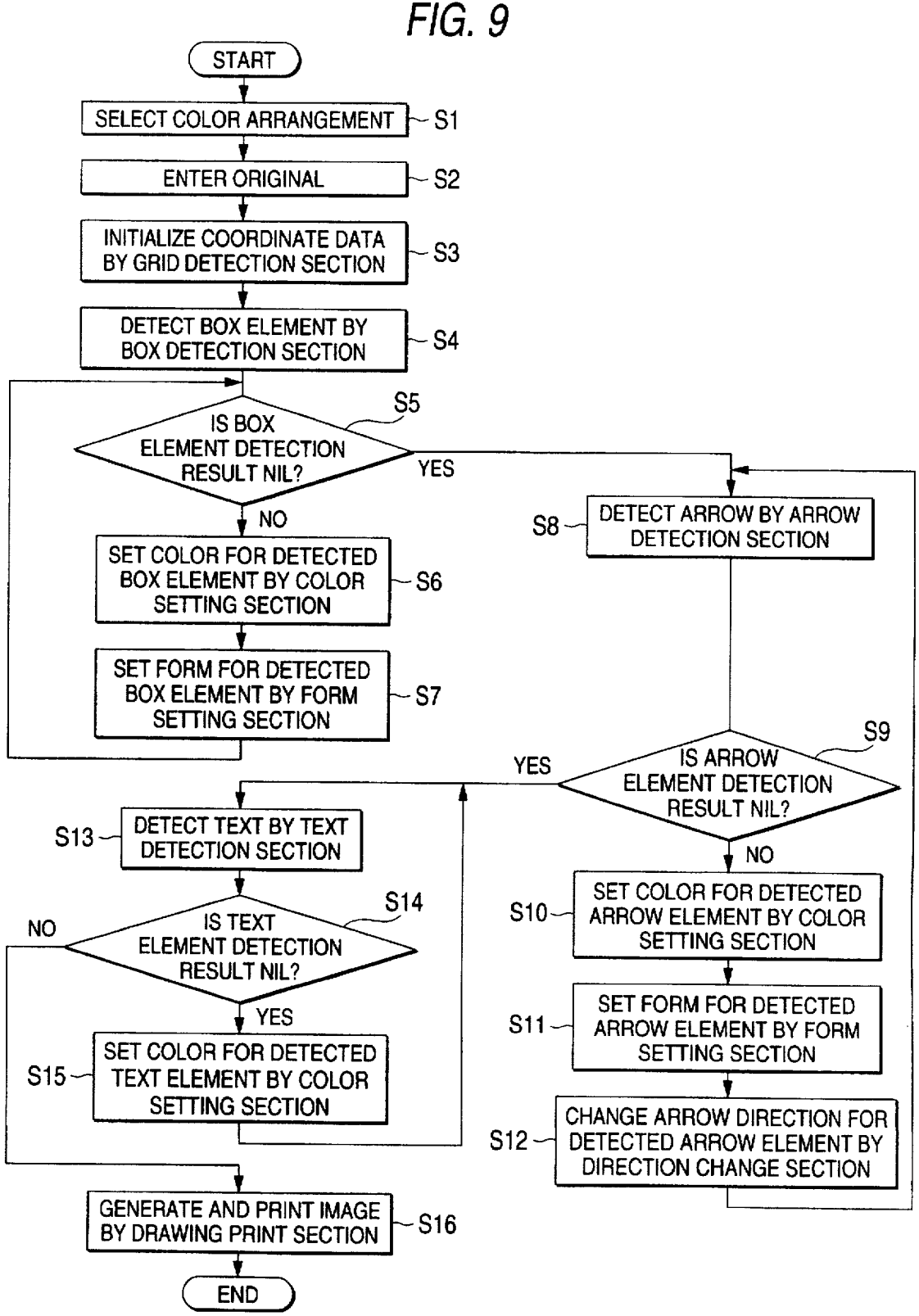
FIG. 9 is a flowchart to explain the operation of the first embodiment of the invention.

FIG. 9 shows a processing flow in the embodiment. This processing flow is controlled and executed by the processing control section 124. In FIG. 9, first when the user selects a color arrangement and enters an original at step S1 and S2, the grid detection section 114 detects a grid and initializes coordinate data at step S4. Next, each time a box is detected by the box detection section 115, the color and form are set at steps S4, S5, S6, and S7. Next, each time an arrow is detected by the arrow detection section 116, the color, form, and direction of the arrow are set at steps S8, S9, S10, S11, and S12. Next, each time a text is detected by the text detection section 117, the color of the text is set at steps S13, S14, and S15. Last, the drawing print section 123 generates an image and prints it at step S16.

Figure 10:
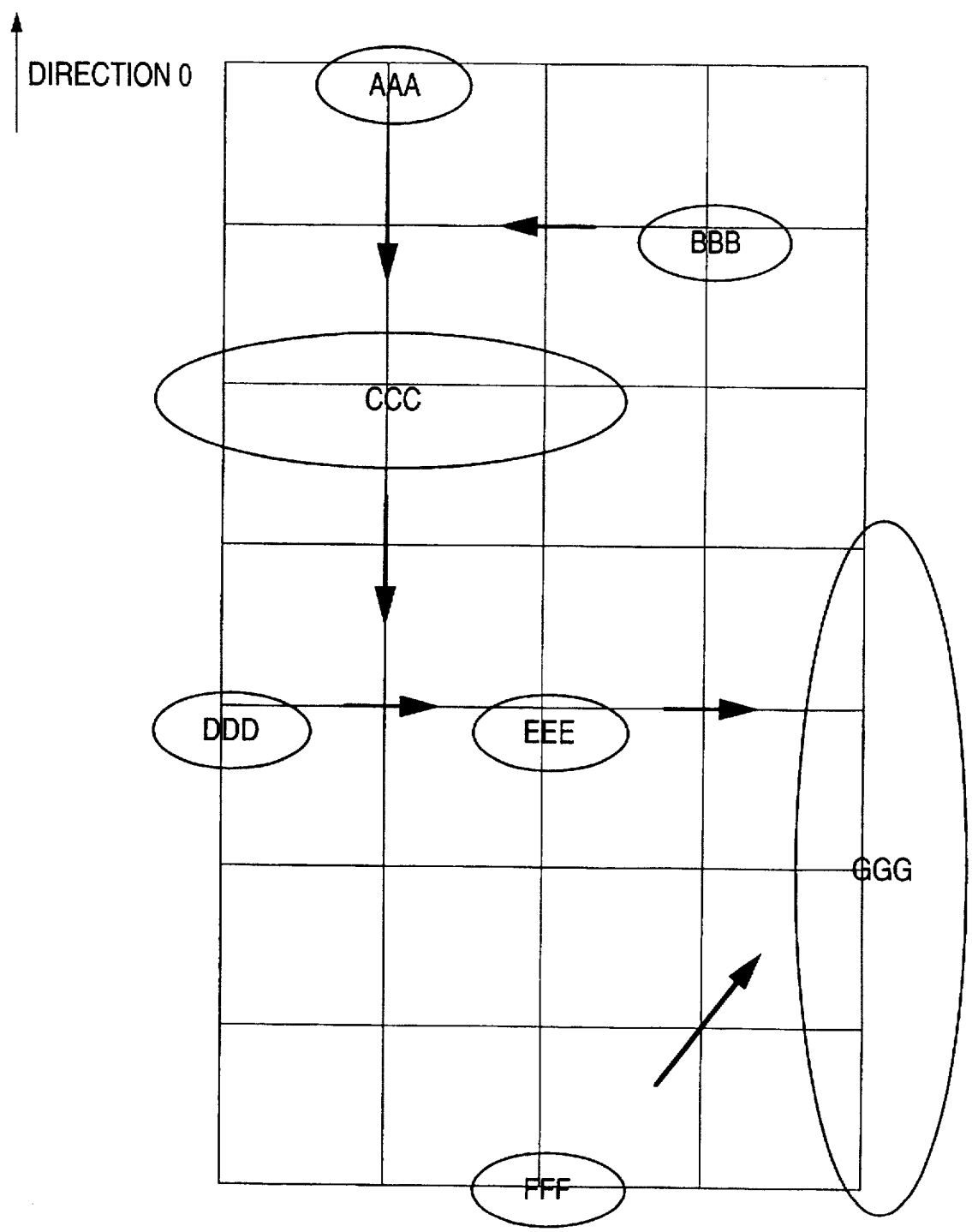
FIG. 10 is an illustration to show a rough original picture drawn on input paper used with the first embodiment of the invention.
Figure 11:
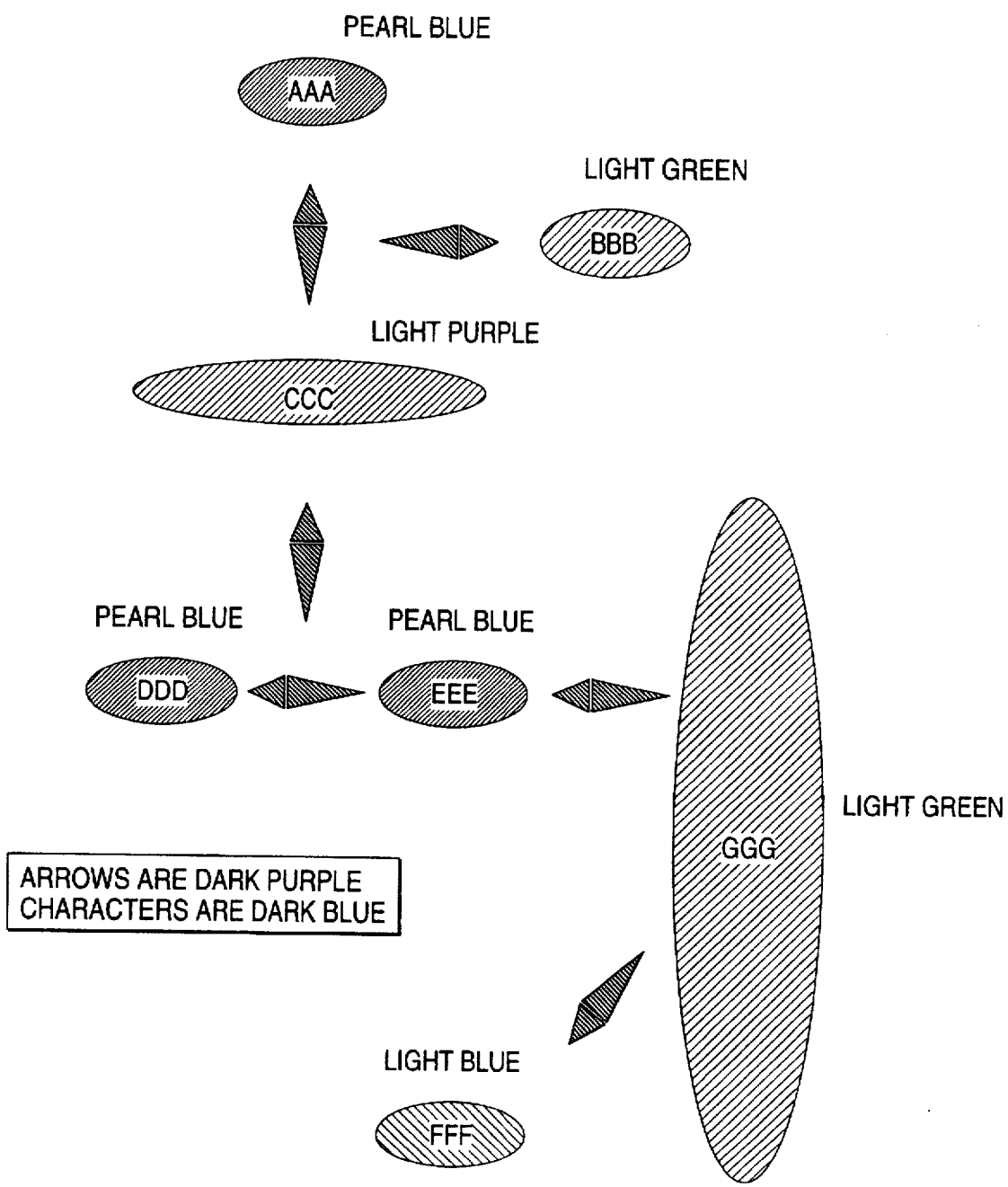
FIG. 11 is an illustration to show design of drawing prepared with color arrangement of "business standard" on input paper in FIG. 10.

In the embodiment, for example, if the user selects "business standard" and enters a sketch as shown in FIG. 10, an image as shown in FIG. 11 is generated.

We have discussed the first embodiment of the invention. The following modified forms of the first embodiment are possible:

Although the color arrangement of only the box element is changed in response to the placement thereof in the first embodiment, the color arrangement of other types of elements can also be changed in response to the placement thereof like the box element. Options can be provided for the user to select the type of element whose color arrangement can be changed in response to the placement.

In the first embodiment, the color arrangement is changed by using only the Y value of coordinates in the attribute position of element data. However, it can also be changed by using only the X value or both the X and Y values of coordinates.

In the first embodiment, color assignment to elements on grid lines is fixed. However, dynamic color assignment is also enabled in such a manner that colors are not assigned to grid lines on which no elements are placed, and are assigned only to grid lines on which elements are placed.

Although color assignment is changed in order for each grid line in the first embodiment, color can be assigned in units of some grid lines.

Although rule setting is fixed in the first embodiment, the user can replace the rules, whereby drawing compositions can be provided in response to the job and favorite of the user and a fashionable style.

EMBODIMENT 2

Next, a second embodiment of the invention will be discussed.

The second embodiment is used in an environment in which the user uses a wordprocessor, a digital copier, and drawing software to execute interactive drawing on a screen. In the embodiment, the user prepares and places drawing elements in an interactive mode. Then, if the user specifies a color arrangement, colors of the elements are automatically set from placement of the drawing elements.

Figure 12:
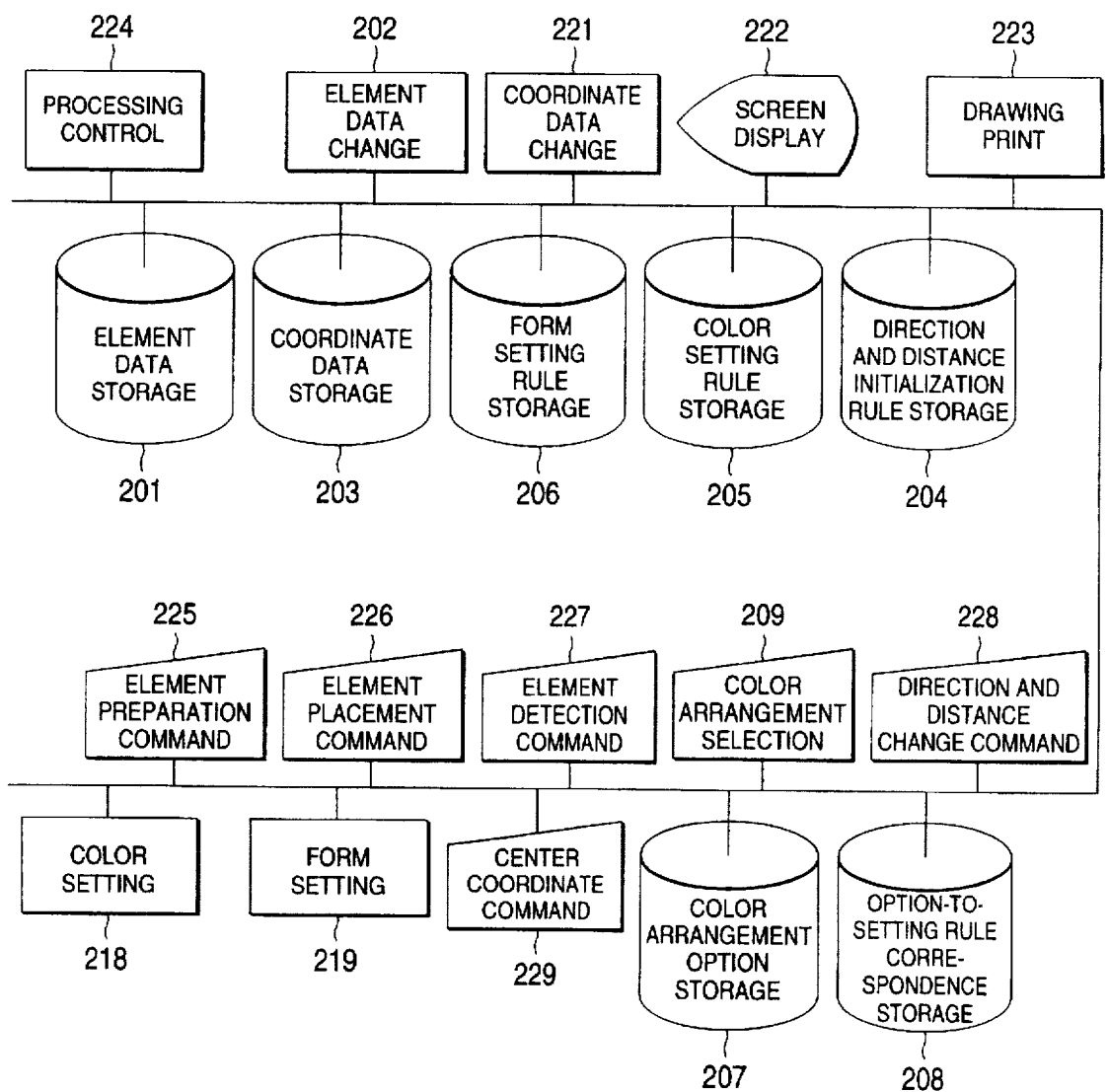
FIG. 12 is a block diagram to show a second embodiment of the invention on the whole.

FIG. 12 shows the configuration of a drawing system of the second embodiment on the whole. Parts identical with those previously described with reference to FIG. 1 are denoted by the same reference numerals in FIG. 12 and will not be discussed again.

In FIG. 12, the drawing system has a color arrangement selection section 209, an element preparation command section 225, an element placement command section 226, an element deletion command section 227, a direction and distance change command section 228, and a center coordinate command section 229 for accepting commands and specification entered by the user. The user commands and specification are executed in an execution section comprising an element data change section 202, a coordinate data change section 221, a drawing print section 223, a color setting section 218, a form setting section 219, etc. A processing control section 224 controls the entire drawing system.

In execution of the sections, a storage section stores various pieces of data. It comprises an element data storage section 201, a coordinate data storage section 203, a direction and distance initialization rule storage section 204, a color setting rule storage section 205, a form setting rule storage section 206, a color arrangement option storage section 207, and an option-to-setting rule correspondence storage section 208. The drawing being prepared is displayed on a screen display section 222 each time, and the finally prepared drawing is printed by a drawing print section 223.

The sections will be discussed in detail.

[Element data storage section 201]

This element data storage section 201 is identical with the element data storage section 101 in the first embodiment and therefore will not be discussed again.

[Element data change section 202]

This element data change section 202 has a function of changing information stored in the element data storage section 201 in response to an instruction from other functional sections. It also has a function of performing change processing upon reception of a change instruction and then sending a screen rewrite instruction to the screen display section 222.

Preparation of a drawing element, namely, preparation of a new table is executed according to an instruction sent from the element preparation command section 225. Upon reception of the instruction, first a new table is prepared in the element data storage section 201, next values are assigned to the attribute values in the table. For attributes form and text, the values are passed as arguments of the instruction and thus are assigned to the table as the attribute values. For attribute position, coordinate ID {1, 1} is used as the default attribute value.

For attribute display order, the maximum value at the point in time as the attribute values in the table stored in the functional section is checked and a positive value resulting from adding one to the maximum value is used as the attribute value of the attribute display order of new element.

A drawing element is placed according to an instruction sent from the element placement command section 226. First, the element whose placement is to be changed is specified. It has the maximum value of the attribute display order among the elements having the coordinate ID of the source passed as an argument of the instruction as the value of the attribute position. If the element can be specified, the value of the attribute position of the element is replaced with the coordinate ID of the destination passed as an argument. If a PostScript program is passed as an argument, it is assigned to the table as the value of the attribute text. For the attribute display order, the maximum value at the point in time as the attribute values in the table stored in the functional section is checked and a positive value resulting from adding one to the maximum value is used as the attribute value of the attribute display order of the new element.

A drawing element, namely, a table is deleted according to an instruction sent from the element deletion command section 227. It has the maximum value of the attribute display order among the elements (tables) having the coordinate ID passed as an argument of the instruction as the value of the attribute position.

[Color setting rule storage section 205]

This color setting rule storage section 205 is identical with the color setting rule storage section 105 in the first embodiment and therefore will not be discussed again.

[Form setting rule storage section 206]

This form setting rule storage section 206 is identical with the form setting storage section 106 in the first embodiment and therefore will not be discussed again.

[Element preparation command section 225]

This element preparation command section 225 has a function of receiving a user command, using the form setting rule storage section 206 to prepare a new drawing element, and storing it in the element data storage section 201 through the element data change section 202. It also has a function of accepting text input.

As a command, the user selects a word indicating the form out of the table stored in the form setting rule storage section 206 for the element attribute form. At this time, if the user enters a text, the text can be made a text represented by the new prepared drawing element, namely, a text displayed inside the element.

After the user selects the word, the element preparation command section 225 sends an instruction for preparing a new table to the element data change section 202. The following are passed to the element data change section 202 as arguments of the instruction:

PostScript program related to the word representing the form selected by the user. (Value of attribute form)

PostScript program for drawing the entered text with font, the number of lines, and line spacing set so that the entered text enters the inside of the area occupied on display by the above-mentioned PostScript program as much as possible (Value of attribute text).

[Element placement command section 226]

This element placement command section 226 has a function of receiving a user command and moving a drawing element placed on coordinates to different coordinates. It also has a function of accepting text input.

As a command, first the user selects the coordinates of the source. The element displayed on the foreground among the drawing elements placed on the coordinates is moved. At this time, if the user enters a text, the entered text can be set as the value of the attribute text of the drawing element to be moved. Then, the user selects the coordinates of the destination of the drawing element.

After the user selects the coordinates, the element placement command section 226 sends an attribute value change instruction to the element data change section 202. The following are passed to the element data change section 202 as arguments of the instruction:

ID of first selected coordinates (indicating the source)

ID of later selected coordinates (indicating the destination)

PostScript program for drawing the entered text with font, the number of lines, and line spacing set so that the entered text enters the inside of the area occupied on display by the above-mentioned PostScript program as much as possible (Value of attribute text).

[Element deletion command section 227]

This element deletion command section 227 has a function of receiving a user command and deleting a drawing element placed on coordinates. As a command, user selects the coordinates of the drawing element to be deleted. The element displayed on the foreground among the drawing elements placed on the coordinates is deleted. After the user gives the command, a deletion instruction having the ID of the selected coordinates as an argument is sent to the element data change section 202.

[Coordinate data storage section 203]

This coordinate data storage section 203 has a function of storing information concerning coordinates on a two-dimensional plane on which drawing elements can be placed. In the embodiment, the number of coordinate sets that can be placed is fixed to 16 in total. Definition of coordinate data is the same as that in the first embodiment and therefore the coordinate data storage section 203 will not be discussed again.

[Direction and distance initialization rule storage section 204]

This direction and distance initialization rule storage section 204 is identical with the direction and distance initialization rule storage section 104 in the first embodiment and therefore will not be discussed again.

[Direction and distance change command section 228]

This direction and distance change command section 228 has a function enabling the user to give a command for changing the direction and distance of any desired coordinate data. As the command, first the user selects the coordinates to be changed. Next, he or she selects the position at which the coordinates are to be placed on the screen. After the user selects the position, the direction and distance change command section 228 sends an attribute value change instruction to the coordinate data change section.

The following are passed to the coordinate data change section as arguments of the instruction:

ID of selected coordinates.

Distance between the former position of the selected coordinates on the screen and the new specified position.

Direction of the former position of the selected coordinates on the screen viewed from the new specified position.

[Coordinate data change section 221]

This coordinate data change section 221 has a function of initializing coordinate data like the coordinate data initialization section 121 in the first embodiment. It also changes the coordinate data in the coordinate data storage section 203 according to an instruction sent from the direction and distance change command section 228. After changing the coordinate data, the coordinate data change section 221 sends a screen rewrite instruction to the screen display section 222.

If a direction and distance change command is given, the coordinate data change section 221 changes the attribute values of the coordinates in response to arguments of the instruction. At the same time, it changes the attribute values so that the positions on the screen remain unchanged with respect to all coordinates with the coordinates as the measurement object. A new distance and direction of coordinates can be calculated by assuming that a vector representing them is Vnew and using vector v obtained from the attribute values of the current direction and distance of the coordinates and vector Vdelta obtained from the distance and direction of change instruction arguments as follows:

For coordinates specified in change instruction argument: Vnew=V+Vdelta

Figure 13:
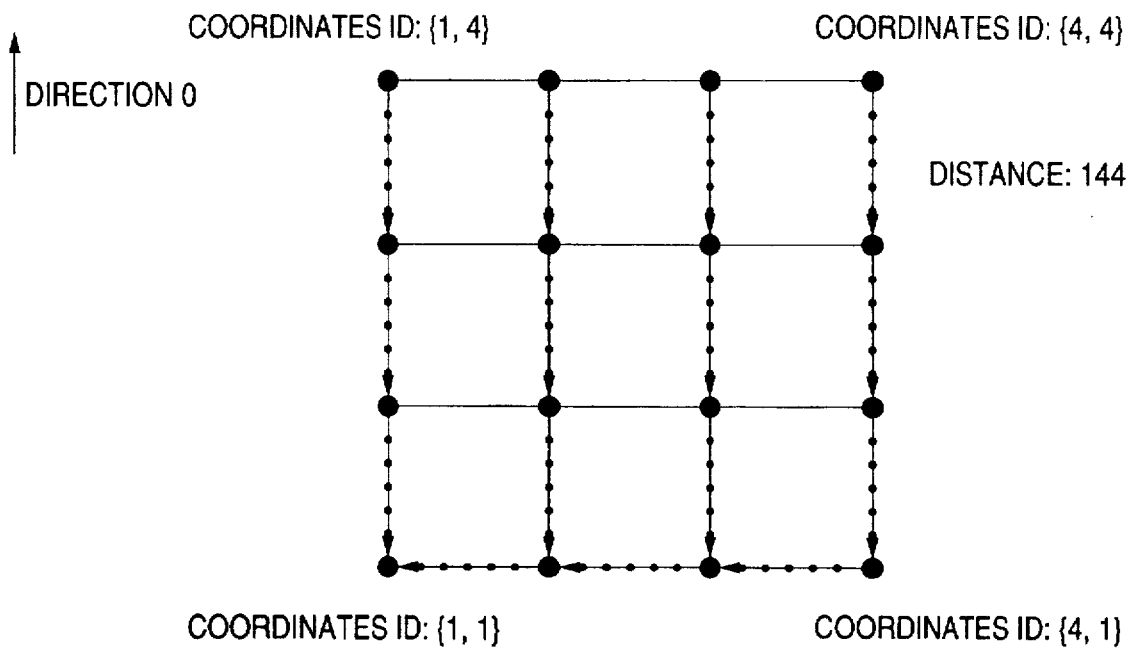
FIG. 13 is an illustration to explain a coordinate state by a coordinate data change section 221 in the second embodiment of the invention.
Figure 14:
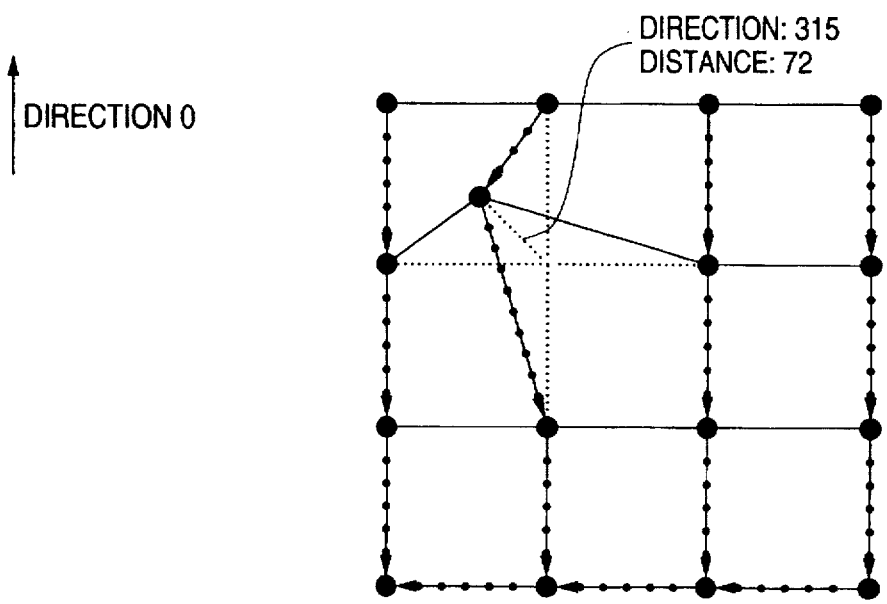
FIG. 14 is an illustration to explain another coordinate state by the coordinate data change section 221 in the second embodiment of the invention.

For coordinates used as measurement object: Vnew=V−Vdelta For example, after coordinate placement is initialized as shown in FIG. 13, if a direction and distance change instruction with arguments of coordinate ID {2, 3}, distance 72, and direction 315 is passed to the coordinate data change section 221, coordinate placement is set as shown in FIG. 14.

[Center coordinate specification section 229]

This center coordinate specification section 229 has a function enabling the user to specify the coordinates of the center point of a color arrangement. It also has a function of storing specified coordinates and returning the coordinates in response to an inquiry from other functional sections.

The center coordinate specification section 229 stores coordinates {1, 1} as the initial coordinates of the center point of a color arrangement. The user selects coordinates on the screen to specify them.

[Color arrangement option storage section 207]

This color arrangement option storage section 207 is identical with the color arrangement option storage section 107 in the first embodiment and therefore will not be discussed again.

[Option-to-setting rule correspondence storage section 208]

This option-to-setting rule correspondence storage section 208 has a function of storing the correspondences between the color arrangements stored in the color arrangement option storage section 207 and the words stored in the color setting rule storage section 205. In the embodiment, the correspondences are stored by using data in the table format relating the color arrangement IDs and words to each other. In the embodiment, a plurality of colors are assigned to one color arrangement so that the element color is changed in response to the distance from the center coordinates. FIG. 15 shows an example of the data.

[Color arrangement selection section 209]

This color arrangement selection section 209 has a function of selecting one from among options stored in the color arrangement option storage section in response to a user command and sending a color setting instruction with the result as an argument to the color setting section. The color arrangement selection section 209 displays options on the screen in a similar manner to that in the first embodiment.

[Color setting section 218]

This color setting section 218 has a function of setting colors of elements in the element data storage section 201 in response to element placement and a selected color arrangement according to an instruction from the color arrangement selection section 209. In the embodiment, colors of elements are set based on the coordinates set in the attribute position of the element. The color of one element is determined in response to how distant the position of the element is from the coordinates stored by the center coordinate specification section.

The color setting section 218 performs processing according to the following algorithm:

Step 1: The ID of the color arrangement passed as an argument is stored as "color arrangement ID."

Step 2: The value of the attribute color is set to nil for all tables in the element data storage section 201.

Step 3: A check is made to see if a table with the value of the attribute color set to nil exists in the element data storage section 201. If it does not exist, the processing of the color setting section 218 is terminated.

Step 4: The ID of the table found at step 3 is stored as "processed table ID."

Step 5: The coordinates set in the attribute position of the table indicated by the "processed table ID" are checked and stored as "processed coordinates."

Step 6: The center coordinates are inquired of the center coordinate specification section 229 and the inquiry result is stored as "center coordinates."

Step 7: When it is assumed that the x and y coordinates of the "processed coordinates" are x and y and that those of the "center coordinates" are X and Y, the following value N is calculated:

$N=|X-x|+|Y-y|$ (where $|a|$ denotes the absolute value of a.)

Step 8: Assume that the remainder resulting from dividing N at step 7 by four is M. At this time, the column of the value of M on the row of the "color arrangement ID" in the information in the option-to-setting rule correspondence storage section 208 is stored as "color application rule."

Step 9: The L*a*b* value related to the "color application rule" in the information in the color setting rule storage section 205 is found out and a change instruction is sent to the element data change section 202 so that the value is set in the attribute color of the element with "new element ID." Control goes to step 3.

[Form setting section 219]

This form setting section 219 is identical with the form setting section 119 in the first embodiment and therefore will not be discussed again.

[Screen display section 222]

This screen display section 222 has a function of interpreting element data stored in the element data storage section 201 in response to a screen rewrite instruction, converting the element data into an RGB raster image, and displaying the raster image on display. It also has a function of displaying a cursor ganged with a pointing device on the screen for enabling the user to directly select a coordinate point and a drawing element on the screen.

Drawing elements are drawn in an overwrite manner in the ascending order of the values of the attribute display order of the drawing elements. Also, they are drawn so that direction 0 is always oriented upward on the screen. If one element has a value of the attribute text, first drawing is executed in accordance with the attributes color and form, then the text is overwritten based on the value of the attribute text.

[Drawing print section 223]

This drawing print section 223 has a function of interpreting element data stored in the element data storage section 201, converting the data into a CMYK raster image, and printing the CMYK image on paper or an OHP sheet.

To draw drawing elements, they are overwritten on each other in the ascending order of the values of the attribute display order. Also, drawing is executed so that direction 0 is always oriented upward on paper or an OHP sheet. If one element has a value of the attribute text, first drawing is executed according to the attributes color and form, then the text is overwritten based on the value of the attribute text.

[Processing control section 224]

This processing control section 224 has a function of controlling the entire flow of processing. It also has a function of receiving start and end instructions of the entire system from the user.

Command input acceptance time is assigned in sequence to the functional sections enabling the user to enter commands. If the functional section to which the time is assigned accepts input from the user, time assignment to other functional sections is interrupted until processing started in response to the request made by the user is terminated.

Figure 16:
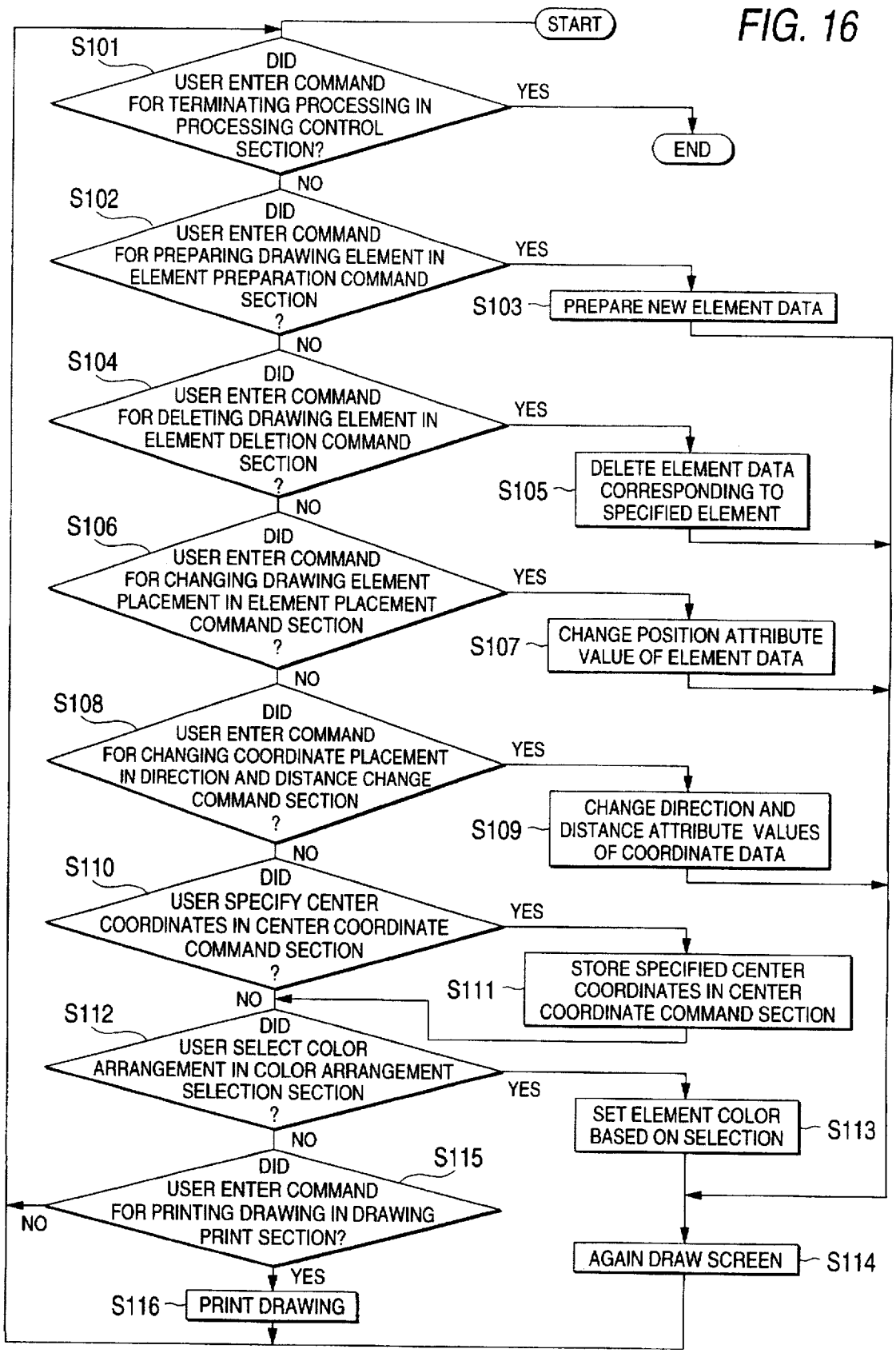
FIG. 16 is a flowchart to explain the operation of the second embodiment of the invention.

FIG. 16 shows a processing flow in the embodiment. This processing flow is controlled and executed by the processing control section 224. In FIG. 16, the termination of processing is monitored at step S101 and what user commands are is determined at steps S102, S104, S106, S108, S110, S112, and S115. Based on the determination, the processing is terminated or the operation of the corresponding functional section is performed at steps S103, S105, S107, S109, S111, S113, S114, and S116. The functional sections were previously described.

Figure 17:
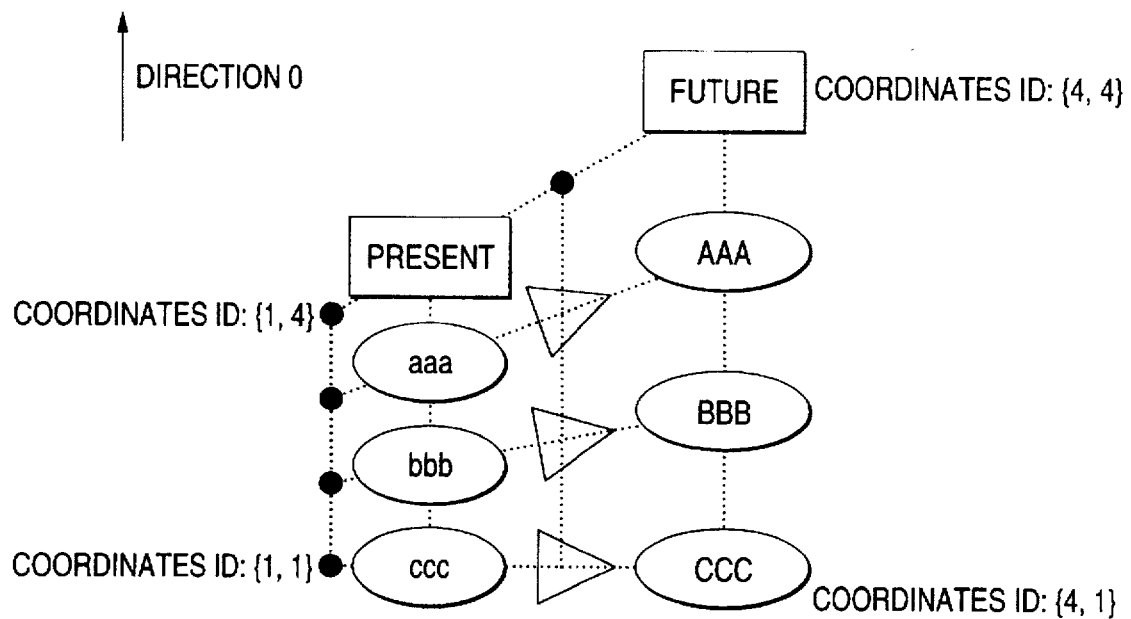
FIG. 17 is an illustration to show design before a color arrangement in the second embodiment of the invention.
Figure 18:
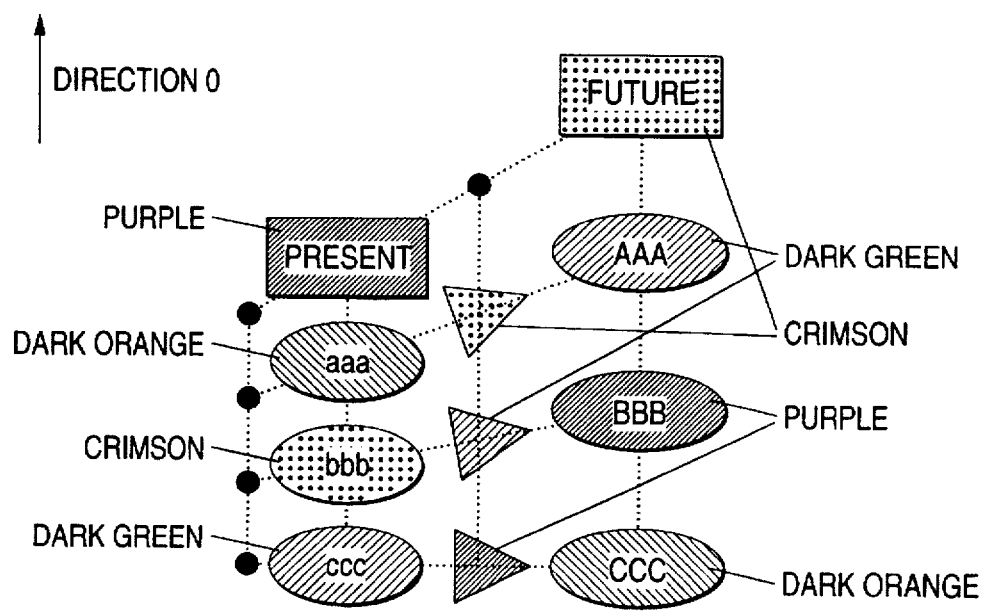
FIG. 18 is an illustration to show a state of applying a color Arrangement to the design in FIG. 17.

In the embodiment, for example, when drawing elements are placed as shown in FIG. 17, if the user sets the center coordinates to {2, 4} and selects "effect" as a color arrangement, the color arrangement as shown in FIG. 18 can be provided.

EMBODIMENT 3

Next, a third embodiment of the invention will be discussed. In the embodiment, a monochrome original is colored according to a predetermined color arrangement. After the user marks the inside of the closed area to be colored in a monochrome original with a color marker pen, the original is read and a color original with the color arrangement applied to the marked closed area in response to the position is output.

Figure 19:
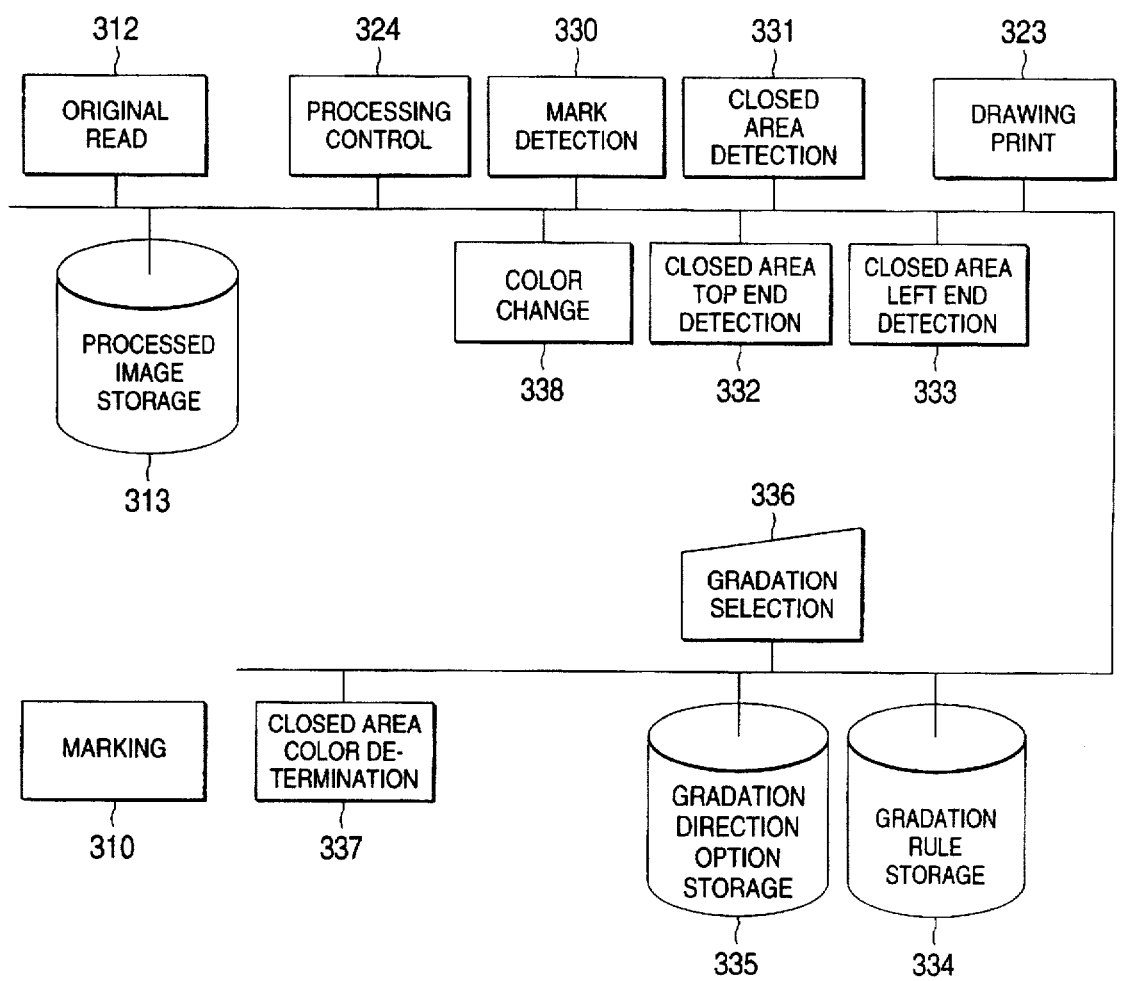
FIG. 19 is a block diagram to show a third embodiment of the invention on the whole.

FIG. 19 shows the configuration of a drawing system of the embodiment on the whole. The drawing system can be realized as software for a dedicated wordprocessor or digital copier or a general-purpose personal computer, workstation, or host computer. Parts identical with those previously described with reference to FIG. 1 or 12 are denoted by the same reference numerals in FIG. 19 and will not be discussed again.

In FIG. 19, the drawing system has a gradation selection section 336 for accepting commands and specification entered by the user. An original read section 312 reads an original prepared by the user performing marking operation on a monochrome original. The user commands and specification are executed in an execution section comprising a drawing print section 323, a mark detection section 330, a closed area detection section 331, a closed area top end detection section 333, a closed area left end detection section 334, a closed area color determination section 337, a color change section 338, etc. A processing control section 324 controls the entire drawing system.

In execution of the sections, a storage section stores various pieces of data. It comprises a processed image storage section 313, a gradation rule storage section 334, and a gradation direction option storage section 335. The prepared drawing is printed by a drawing print section 123.

The sections will be discussed in detail.

[Marking operation 310]

This marking operation 310 has a function for the user to mark on a monochrome original to be read through the original read section 312. It is provided by a single-color marker pen. The user uses the pen to mark any desired place inside the closed area to be colored.

[Original read section 312]

This origin al read section 312 is identical with the original read section 112 in the first embodiment and therefore will not be discussed again.

[Processed image storage section 313]

This processed image storage section 313 is identical with the processed image storage section 113 in the first embodiment and therefore will not be discussed again.

[Mark detection section 330]

This mark detection section 330 ha s a function of detecting one pixel data set corresponding to one mark from the image to be processed and storing the pixel data set it measures the color of the color marker used in the marking operation 310 and stores data representing the color in the pixel data format and allowable values for the color at the same time.

The pixel data set corresponding to one mark is a pixel data group contiguous on an original and having the marker color (containing the allowable range) stored in the mark detection section 330. The detected pixel data set is stored as a set with pixel data addresses as elements, which will be hereinafter called a mark pixel set. The mechanism for storing the set controls element addition so that set elements do not overlap, namely, the addresses of the elements differ from each other. The mark detection section 330 performs processing according to the following algorithm which is recursive:

Step 1: If the stored mark pixel set contains elements, all the elements are deleted.

Step 2: One matching the marker color stored in the mark detection section 330 out of pixel data in the image to be processed, and the address of the pixel data is stored as the current address.

Step 3: The marker color indicated by the pixel data pointed to by the current address and its allowable colors are stored as target colors.

Step 4: The current address is added to the mark element set.

Step 5: Pixel data pieces positioned on the top and bottom and left and right of the original are found out with respect to the pixel data pointed to by the current address If the found pixel data pieces have a value matching the target color and an address not contained in the mark pixel set, the addresses of the pixel data pieces are stored.

Step 6: Steps 4 to 6 are executed with the addresses of the pixel data pieces stored at step 5 in order as the current address.

[Closed area detection section 331]

This closed area detection section 331 has a function of detecting a pixel group corresponding to the innermost closed area containing a mark detected by the mark detection section 310 on an original and storing the addresses of the detected pixel group.

The pixels corresponding to the contours of the closed area are black because a monochrome original is input. Therefore, to search for the closed area, a search may be made for a black pixel group making up a closed curve on the original toward the outside of the original starting at the address stored in the mark detection section. The pixel group inside the found pixel group on the original (not containing the found pixel group) is the closed area.

The data stored in the closed area detection section 331 indicates the address range of pixel data; specifically, it becomes a set with pairs indicating the starting and end points of the addresses as elements. One pair is aligned on the same line scan line (3360 pixels aligned in the short-side direction of the original).

[Closed area top end detection section 332]

This closed area top end detection section 332 has a function of checking where the top end of a detected closed area exists counted from the top in terms of scan lines and storing the result. It searches the data detected by the closed area detection section 331 for the pixel existing on the top on the original from the address, and checks what'th scan line the pixel exists on from the address of the pixel. The closed area top end detection section 332 stores the scan line order.

[Closed area left end detection section 333]

This closed area left end detection section 333 has a function of checking where the left end of a detected closed area exists counted from the left in terms of pixel group pairs indicating one scan line and storing the result. It searches the data detected by the closed area detection section 331 for the pixel existing at the leftmost position on the original from the address, and checks what'th pixel group pair indicating one scan line the pixel exists on from the address of the pixel. The closed area left end detection section 333 stores the pixel group pair order.

[Gradation rule storage section 334]

This gradation rule storage section 334 has a function of storing a plurality of rules for making continuous color change as a color arrangement of an element. It stores the rule ID and the colors at the starting and end points of color change for each rule. These colors are represented in the same format as pixel data. By the rules stored in the gradation rule storage section 334, coloring according to the rule does not result in the same color as the marker color, so that detection of the closed area detection section 331 is executed normally.

[Gradation direction option storage section 335]

This gradation direction option storage section 335 has a function of storing color change direction options. The embodiment provides two options "left to right" and "top to bottom."

[Gradation selection section 336]

This gradation selection section 336 has a function of storing the user's selection result of the rule stored in the gradation rule storage section 334 and the option stored in the gradation direction option storage section 335. It also has a function of returning the stored selection result of a pair of the rule ID and direction value in response to an inquiry from other functional sections.

[Closed area color determination section 337]

This closed area color determination section 337 has a function of determining the color of the closed area detected by the closed area detection section 331 based on the selection result received from the gradation selection section 336 and changing the color of the closed area by using the color change section 338. The closed area color determination section 337 performs processing according to the following algorithm:

Step 1: The selected gradation rule and gradation direction are inquired of the gradation selection section 336 and the returned result is stored as "rule ID" and "specified direction."

Step 2: If the specified direction is "left to right," a detection instruction is sent to the closed area left end detection section 333; if the specified direction is "top to bottom," a detection instruction is sent to the closed area top end detection section 332. The returned result is stored as "line number."

Step 3: If the specified direction is "left to right," 3360 is stored as "the number of lines;" if the specified direction is "top to bottom," 4752 is stored as "the number of lines."

Step 4: The "line number" divided by "the number of lines" (real value) is stored as "change rate."

Step 5: The gradation rule storage section 334 is searched for "starting point color" related to the "rule ID." Decimal values are calculated from the found 24-bit data of 8-bit data of R, G, and B, and are stored as "R initial value," "G initial value," and "B initial value."

Step 6: The gradation rule storage section 334 is searched for "end point color" related to the "rule ID." Decimal values are calculated from the found 24-bit data of 8-bit data of R, G, and B, and are stored as "R termination value," "G termination value," and "B termination value."

Step 7: (The initial value subtracted from the R termination value) multiplied by the change rate is stored as "R change value;" (the initial value subtracted from the G termination value) multiplied by the change rate is stored as "G change value;" and (the initial value subtracted from the B termination value) multiplied by the change rate is stored as "B change value."

Step 8: The R, G, and B change values are added to the R, G, and B initial values respectively. The addition results are rounded off to the nearest integers. The integers are converted into 8-bit binary values to form 24-bit RGB data.

Step 9: A color change instruction with the finally provided 24-bit data at step 8 as an argument is sent to the color change section 338. After the color change section 338 completes color change, the processing of the closed area color determination section 337 is terminated.

[Color change section 338]

This color change section 338 has a function of changing the closed area detected by and stored in the closed area detection section 331 to the color passed as an argument in response to an instruction from the closed area color determination section 337. If for the pixel data at the addresses stored in the closed area detection section 331, the pixel color is white or the marker color, the 24-bit value is changed so as to match the color passed as the argument, whereby the portions uncolored in the area and the marked portion are colored and the color of the black portions of the input original such as characters remains unchanged.

[Drawing print section 323]

This drawing print section 323 has a function of outputting a plurality of copies in response to an instruction from the processing control section in addition to the same function as the drawing print section 123 in the first embodiment.

[Processing control section 324]

This processing control section 324 has a function of controlling and executing the entire flow of processing. It also has a function enabling the user to specify copy starting and the number of copies.

Figure 20:
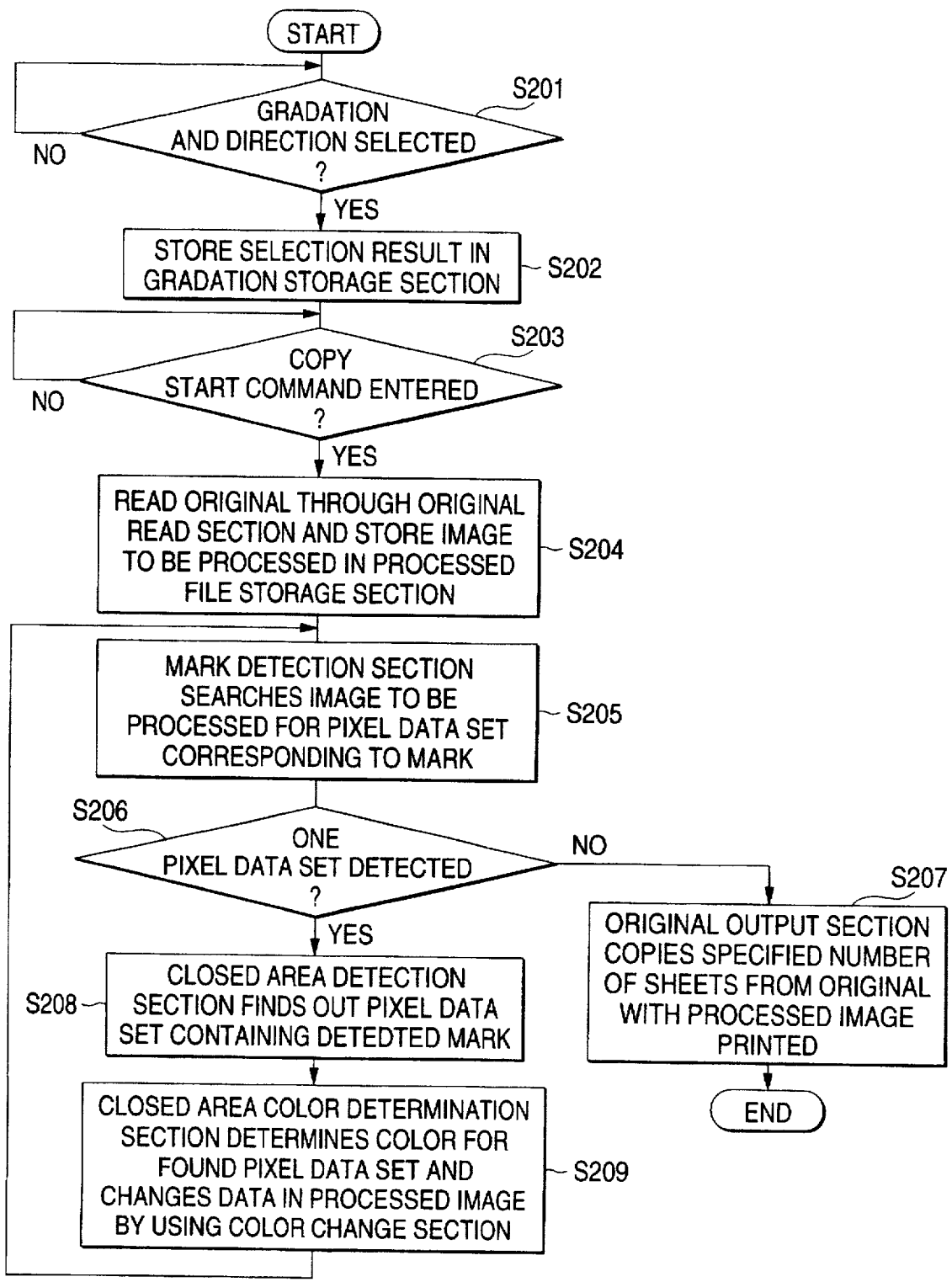
FIG. 20 is a flowchart to explain the operation of the second embodiment of the invention.

FIG. 20 shows a processing flow in the third embodiment. In the figure, when the user selects a gradation rule and direction and enters a copy command at steps S201-S203, an original is read and a mark is detected at steps S204-S206. When a mark is detected, the closed area detection section 331 detects a closed area containing the mark and the closed area color determination section 337 determines the color of the closed area at steps S208 and S209. If no mark is detected or all closed area colors are determined, as many sheets as the specified number are copied at step S207.

EMBODIMENT 4

Figure 21:
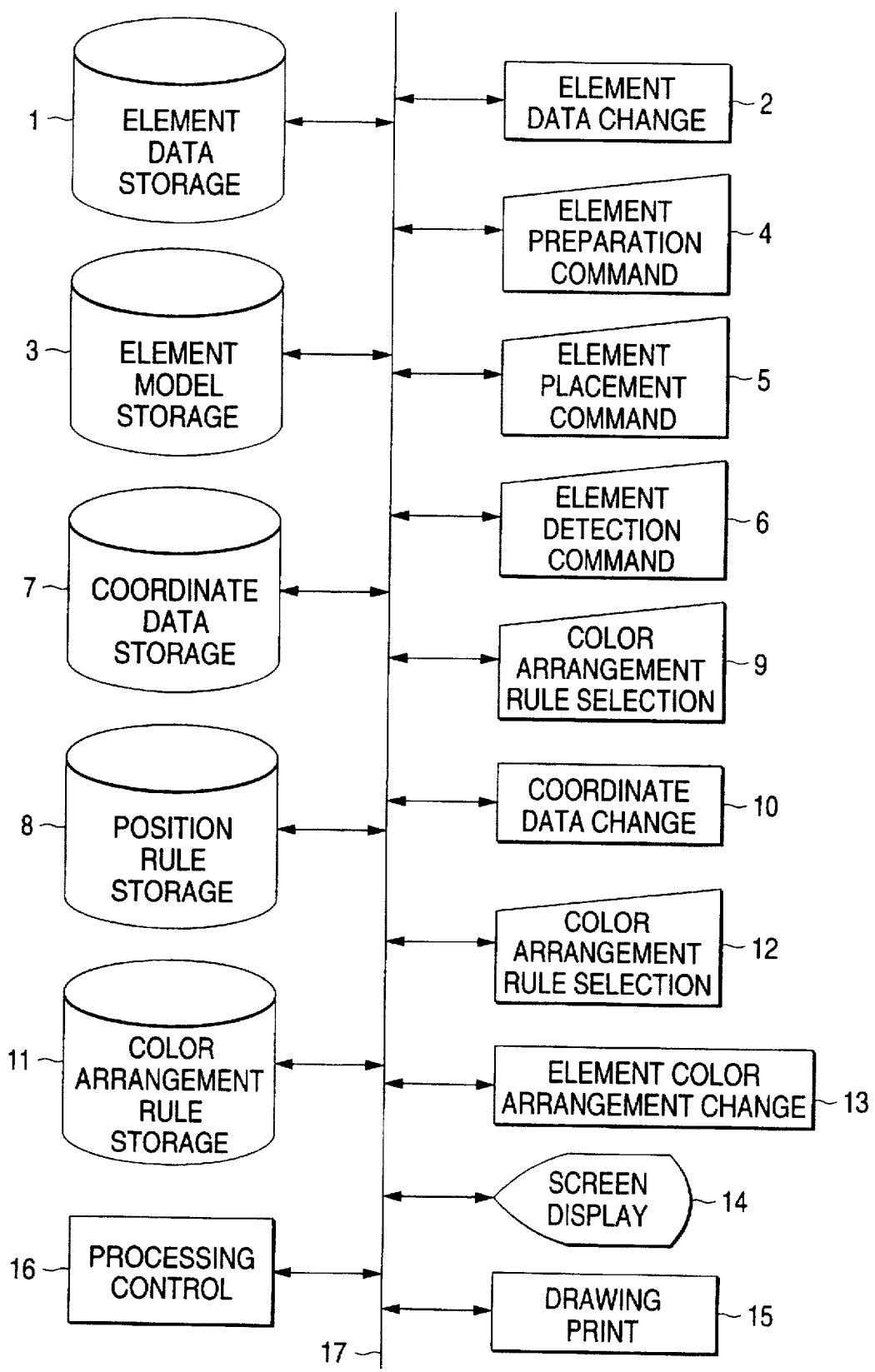
FIG. 21 is a block diagram to show the overall configuration of a drawing system of the fourth embodiment of the invention.

A fourth embodiment of the invention will be discussed with reference to the accompanying drawings. FIG. 21 is a block diagram to show the overall configuration of a drawing system of the fourth embodiment of the invention. In the figure, numeral 1 is an element data storage section, numeral 2 is an element data change section, numeral 3 is an element model storage section, numeral 4 is an element preparation command section, numeral 5 is an element placement command section, numeral 6 is an element deletion command section, numeral 7 is a coordinate data storage section, numeral 8 is a position rule storage section, numeral 9 is a position rule selection section, numeral 10 is a coordinate data change section, numeral 11 is a color arrangement rule storage section, numeral 12 is a color arrangement rule selection section, numeral 13 is an element color arrangement change section, numeral 14 is a screen display section, numeral 15 is a drawing print section, numeral 16 is a processing control section, and numeral 17 is a bus for connecting the functional processing sections.

As shown in FIG. 21, the drawing system of the embodiment comprises the element data storage section 1, the element data change section 2, the element model storage section 3, the element preparation command section 4, the element placement command section 5, the element deletion command section 6, the coordinate data storage section 7, the position rule storage section 8, the color arrangement rule selection section 9, the coordinate data change section 10, the color arrangement rule storage section 11, the color arrangement rule selection section 12, the element color arrangement change section 13, the screen display section 14, the drawing print section 15, and the processing control section 16 which are connected by the bus 17 for performing drawing processing.

The processing control section 16 accepts commands from the user and starts and terminates the entire system. It also controls the functional processing sections 1-15 throughout the processing flow of the system. In this case, the processing control section 16 assigns the command input acceptance time in sequence to the functional processing sections for accepting user commands and performing processing in response thereto (element preparation command section 4, element placement command section 5, element deletion command section 6, color arrangement rule selection section 9, and color arrangement rule selection section 12). When a command is entered from the user for the functional section to which the time is assigned, the processing control section interrupts time assignment to other functional processing sections until the processing started in response to the request is terminated.

Figure 22:
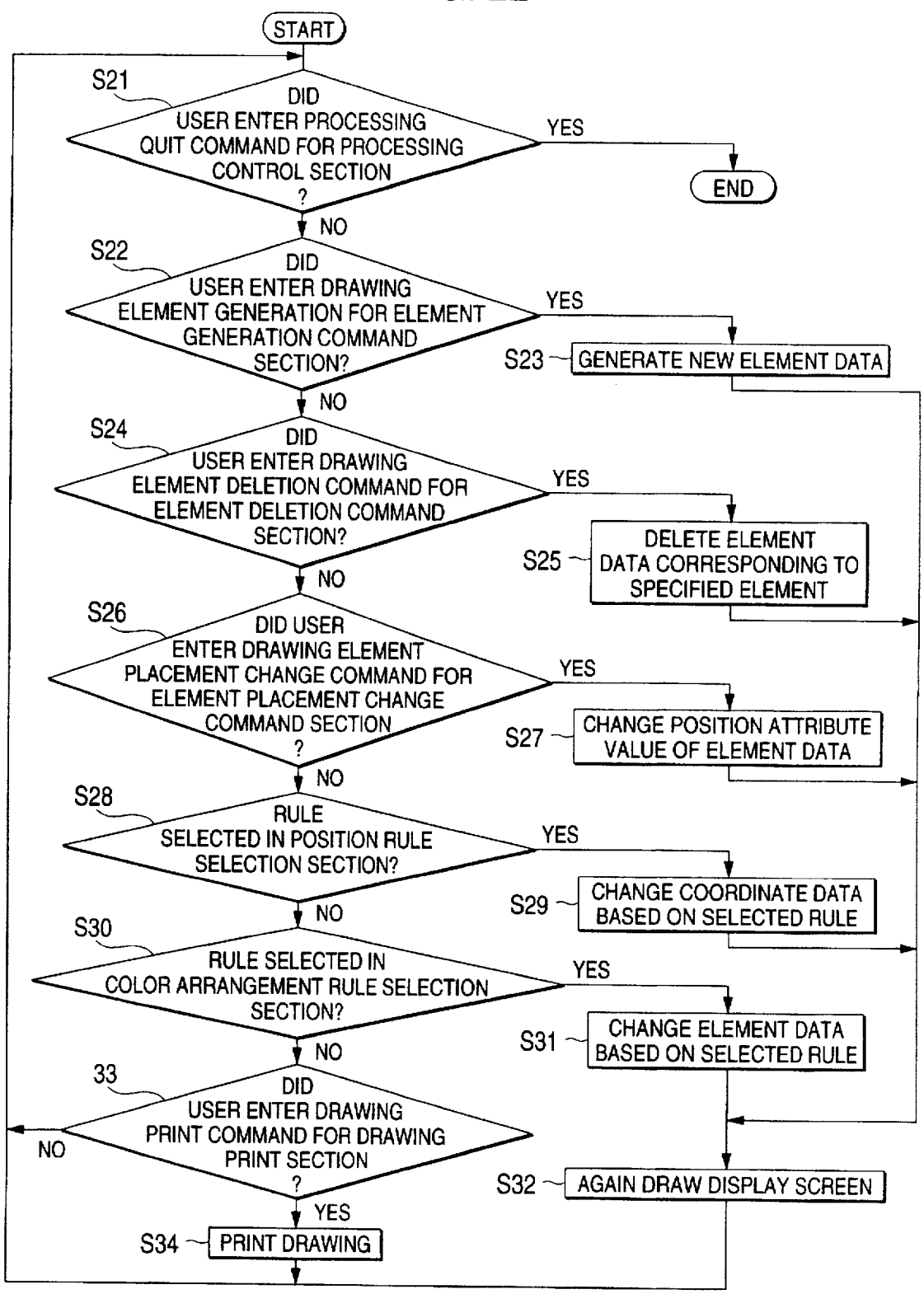
FIG. 22 is a flowchart to show a processing flow of a processing control section for controlling the entire processing of the drawing system of the fourth embodiment.

FIG. 22 is a flowchart to show a processing flow of the processing control section 16 for controlling the entire processing of the drawing system of the embodiment. The control flow of the entire processing of the drawing system will be discussed with reference to FIG. 22. When starting the processing, the drawing system first determines whether or not the user enters a processing quit command for the processing control section 16 at step 21. If the user enters a processing quit command, the processing is terminated. If no processing quit command is entered, then control goes to step 22 and whether or not the user enters a drawing element generation command for the element preparation command section 4 is determined. If the user enters a drawing element generation command, control goes to step 23 and new element data is prepared, then control goes to step 32 at which the display screen is again drawn to reflect the processing result on the display screen. Next, control returns to step 21 and the process is repeated starting at step 21.

If it is determined at step 22 that the user does not enter a drawing element preparation command, control goes to step 24 and whether or not the user enters a drawing element deletion command for the element deletion command section 6 is determined. If the user enters a drawing element deletion command, then control goes to step 25 for deleting the element data corresponding to the specified element. Next, control goes to step 32 at which the display screen is again drawn to reflect the processing result on the display screen. Control returns to step 21 and the process is repeated starting at step 21. If it is determined at step 24 that the user does not enter a drawing element deletion command, then control goes to step 26.

At step 26, whether or not the user enters a drawing element placement change command for the element placement command section 5 is determined. If the user enters a placement change command, control goes to step 27 and the position attribute value of element data is changed. Next, control goes to step 32 at which the display screen is again drawn to reflect the processing result on the display screen. Control returns to step 21 and the process is repeated starting at step 21. If it is determined at step 26 that the user does not enter a placement change command, then control goes to step 28 at which whether or not a rule is selected in the position rule selection section 9 is determined. If a rule is selected, control goes to step 29 for changing element data based on the selected rule. Next, control goes to step 32 at which the display screen is again drawn to reflect the processing result on the display screen. Control returns to step 21 and the process is repeated starting at step 21.

If it is not determined at step 28 that a rule is selected, control goes to step 30 at which whether or not a rule is selected in the color arrangement rule selection section 12 is determined. If a rule is selected, control goes to step 31 for changing the color arrangement of element data based on the selected rule. Next, control goes to step 32 at which the display screen is again drawn to reflect the processing result on the display screen. Control returns to step 21 and the process is repeated starting at step 21. On the other hand, if it is not determined at step 30 that a rule is selected, control goes to step 33 and whether or not the user enters a drawing print command for the drawing print section 15 is determined. If the user enters a drawing print command, a given drawing is printed at step 34. Then, control returns to step 21. If the user does not enter a drawing print command, control returns to step 21 as it is, and the process is repeated.

Thus, user commands are accepted and the functional processing sections 1-15 perform processing in response to the user commands under the control of the processing control section 16 for controlling the entire processing flow. In this case, the functional processing sections accept user commands and perform processing in response thereto under the control of the processing control section 16 repeatedly.

Next, processing of the functional processing sections 1–15 will be discussed specifically.

[Element data storage section 1]

This element data storage section 1 has the same configuration as the element data storage section in the first embodiment.

[Element data change section 2]

This element data change section 2 changes information on drawing element data (attribute information) stored in the element data storage section 1 in response to a data change request instruction from other functional processing sections. After receiving the change instruction and changing element data in response thereto, the element data change section 2 sends a screen rewrite instruction to the screen display section 14.

A drawing element, namely, a new correspondence table between attributes corresponding to the drawing element and attribute values is prepared according to an instruction sent from the element preparation command section 4. Upon reception of the instruction, first a new table is prepared in the element data storage section 1 and attribute values of attributes in the table are assigned. For example, the attribute values of color, form, and text attributes are passed as arguments of the instruction and thus assigned to the table. As the attribute value of the position attribute, the coordinate ID of coordinate point {1, 1} is assigned as the default. For the display order attribute, the tables (drawing element data) stored in the element data change section 2 (element data storage section 1) are searched for the maximum value of the display order attribute values at the point in time, and one is added to the found value to provide a positive value as the attribute value of the display order attribute of the new element.

The drawing element placement change process (step 27) is executed according to an instruction sent from the element placement command section 5. First, the element whose placement is to be changed is specified. It is the element having the largest value of the display order attribute among the elements having the coordinate ID of the move source (coordinate point) passed as an argument of the instruction as the position attribute value. If the element can be specified, then the position attribute value of the element is replaced with the coordinate ID of the destination passed as an argument of the instruction. If a PostScript program is passed as argument, it is assigned to the table of the drawing element data as the text attribute value. For the display order attribute, the tables stored in the element data change section 2 are searched for the maximum value of the display order attribute values at the point in time, and one is added to the found value to provide a positive value as the attribute value of the display order attribute of the new element.

The drawing element deletion process (step 25) is executed as deletion of the table corresponding to the specified drawing element according to an instruction sent from the element deletion command section 4. The deleted drawing element data is the element data corresponding to the element having the largest value of the display order attribute among the elements having the coordinate ID passed as an argument of the instruction as the position attribute value.

[Element model storage section 3]

This element model storage section 3 stores values concerning color and form attributes of elements used as models of drawing element data. For example, it has a correspondence table between L*a*b* values and words representing the colors, such as red and blue, as color attribute values and a correspondence table between PostScript programs for drawing forms and words representing the forms, such as quadrangle and ellipse, as form attribute values.

[Element preparation command section 4]

This element preparation command section 4 receives a command from the user and issues instructions to the element data change section 2 for preparing new drawing element data by using drawing element data models stored in the element model storage section 3 and storing the prepared drawing element in the element data storage section 1 through the element data change section 2. In this case, the element preparation command section 4 accepts text input.

To enter a command for the element preparation command section 4, the user selects words representing a desired color and form out of the drawing element data model table stored in the element model storage section 3 for the color and form attributes of the drawing element. At this time, if the user enters a text, the text can be made a text of a new prepared drawing element, namely, a text displayed inside the drawing element.

After the user selects the words representing the desired color and form, the element preparation command section 4 sends an instruction for preparing a new table to the element data change section 2 with the following data values as arguments of the instruction:

1: L*a*b* value in the table related to the word representing the color selected by the user (color attribute value);

2: PostScript program in the table related to the word representing the form selected by the user (form attribute value); and 3: PostScript program for drawing the entered text with font, the number of lines, and line spacing set so that the entered text enters the inside of the drawing area of the PostScript program of the form attribute of the element as much as possible (attribute text value).

[Element placement command section 5]

This element placement command section 5 has the same configuration as the element placement command section in the second embodiment.

[Element deletion command section 6]

This element deletion command section 6 has the same configuration as the element deletion command section in the second embodiment.

[Coordinate data storage section 7]

This coordinate data storage section 7 has the same configuration as the coordinate data storage section in the first embodiment.

[Position rule storage section 8]

This position rule storage section 8 stores rules 2 to 4 in addition to rule 1 stored in the direction and distance initialization rule storage section in the first embodiment.

Rule 2 of the position rules is a rule for geometrically widening coordinate placement to form a composition widening toward the end on the whole. The contents of rule 2 are shown below. The processing procedure of rule 2 (rule__2 (dis__val, ratio)) sets grid point spacing so that spacing widens in the ratio of argument ratio with the initial value of the spacing as the value of argument dis__val.

rule__2 (dis__val, ratio)
{
    current __distance = dis__val;

```
        for (i=1; XPOINTMAX; i++){
            for (j=1; YPOINTMAX; j++){
                p=point_data({i,j});
                p—>position—>distance=current_distance;
                if (j==1) {
                    p—>position—>angle=270;
                    if (i==1)
                        p—>position—>reference=0;
                    else
                        p—>positon—>reference={i - 1, 1};
                }
                else {
                    p—>position—>angle =180;
                    p—>position—>reference={i, j - 1};
                }
            }
        }
        current_distance *= ratio;
    }
}
```

Figure 23:
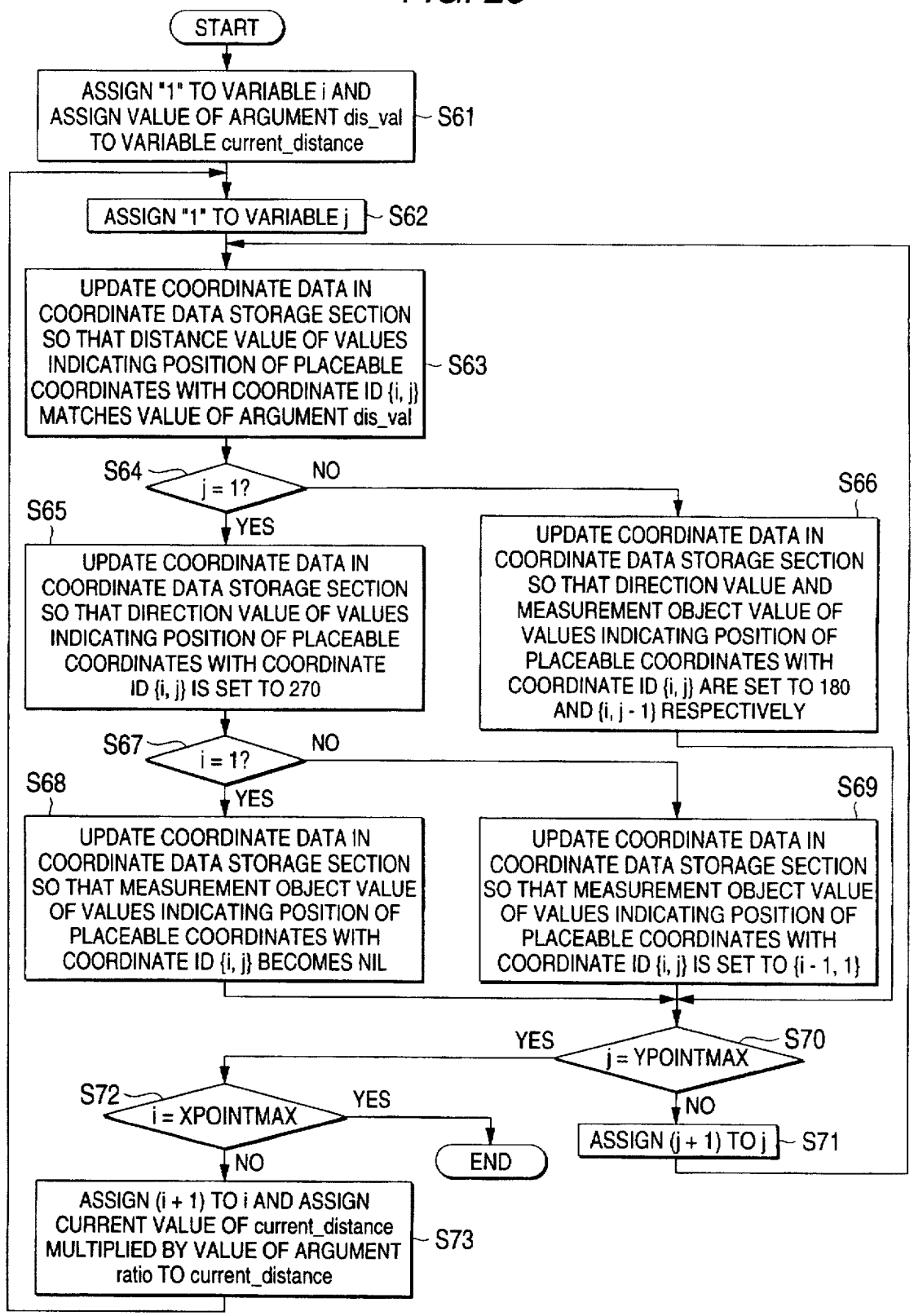
FIG. 23 is a flowchart to show a processing procedure according to rule 2 of position rules.

FIG. 23 is a flowchart to show the processing procedure of rule 2 of the position rules. Composition formation processing according to rule 2 for position regulation will be discussed with reference to the flowchart in FIG. 23. First, 1 is assigned to variable i and the value of argument dis_val is assigned to variable current_distance at step 61. Next, 1 is assigned to variable j at step 62. At step 63, the coordinate data in the coordinate data storage section is updated so that the distance value of values (attribute values) indicating the position of placeable coordinates with coordinate ID {i, j} matches the value of the variable current_distance.

Next, control goes to step 64 and whether or not the variable j is 1 is determined. If the variable j is determined to be 1, then control goes to step 65 at which the coordinate data in the coordinate data storage section is updated so that the direction value of values indicating the position of placeable coordinates with coordinate ID {i, j} is set to 270. Then, control goes to step 67. On the other hand, if it is not determined at step 64 that the variable j is 1, control goes to step 66 and the coordinate data in the coordinate data storage section is updated so that the direction value and measurement object value of values indicating the position of placeable coordinates with coordinate ID {i, j} are set to 180 and {i, (j-1)} respectively. Then, control goes to step 70.

Whether or not the variable i is 1 is determined at step 67. If the variable i is determined to be 1, then control goes to step 68 and the coordinate data in the coordinate data storage section is updated so that the measurement object value of values indicating the position of placeable coordinates with coordinate ID {i, j} becomes nil. Then, control goes to step 70. On the other hand, if it is not determined at step 67 that the variable i is 1, control goes to step 69 and the coordinate data in the coordinate data storage section is updated so that the measurement object value of values indicating the position of placeable coordinates with coordinate ID {i, j} is set to {(i-1)}. Next, control goes to step 70.

At step 70, whether or not the value of the variable j equals YPOINTMAX is determined. If the value of the variable j does not equal YPOINTMAX as a result of the determination, control goes to step 71 at which the variable j is incremented, and control returns to step 63. The process starting at step 63 is continued. On the other hand, if it is determined at step 70 that the value of the variable j equals YPOINTMAX, then control goes to step 72 and whether or not the value of the variable i equals XPOINTMAX is determined. If the value of the variable i does not equal XPOINTMAX as a result of the determination, control goes to step 73 at which the variable i is incremented and the result of multiplying the current value by the value of argument ratio is assigned to the variable current_distance, then control returns to step 62. The process starting at step 62 is continued. On the other hand, if it can be determined at step 72 that the value of the variable i equals XPOINTMAX, then the process is terminated. According to rule 2 of the position rules, coordinate placement can be thus geometrically widened to form a composition widening toward the end on the whole.

Rule 3 of the position rules is a rule for arranging coordinate placement concentrically with an arbitrary point as the center. The contents of rule 3 are shown below. The processing procedure of rule 3 (rule_3 (center_point, dis_val)) places grid points in concentric circles having the value of the argument dis_val as the radius difference with the coordinate point indicated by the argument center_point as the center point.

```
rule_3 (center_point, dis_val)
{
    reset_reference(center_point);
    for (i=1; XPOINTMAX; i++) {
        for (j=1; YPOINTMAX; J++) {
            p=point_data(i,j);
            if (center_point[1]==j)
                p—>position—>distance=0;
            else
                p—>position—>distance=dis_val;
        }
    }
    if (center_point[1] > 1 && center_point[1] < YPOINTMAX)
        right_divide = (XPOINTMAX - center_point[0]) * 2 + 1;
        left_divide = center_point[0] * 2 - 1;
    else {
        if (center_point[0] >= (XPOINTMAX / 2))
            right_divide = (XPOINTMAX - center_point[0]) * 2 - 1;
            left-divide = center_point[0] - 1;
        else
            right-divide = XPOINTMAX - center_point[0];
            left-divide = center_point[0]
    }
    if (right_divide > 1) {
        divide_angle = 180 / right_divide;
        current_angle = divide_angle;
        for (i=center_point[0] + 1; XPOINTMAX; i++){
            for (j=center_point[1] + 1; YPOINTMAX; j++){
                p=point_data({i,j});
                p—>positoin—>angle += current_angle
            }
            for (j=1; center_point[1] - 1; j++) {
                p=point_data({i,j});
                p—>position—>angle -= current-angle;
            }
            current_angle += divide_angle;
        }
    }
    if (left_divide > 1) {
        divide_angle = 180 / left_divide;
        current_angle = divide_angle;
        for (i=center_point[0] - 1; 1; 1—) {
            for (j=center_point[0] + 1; YPOINTMAX; j++) {
                p=point_data({i,j});
                p—>position—>angle -= current_angle;
            }
            for (j=1; center_point[1] - 1; j++) {
                p=point_data({i,j});
                p—>position—>angle += current-angle;
            }
            current_angle += divide_angle;
        }
    }
    p=point_data(center_point);
    p—>position—>reference=0;
}
```

Figure 24:
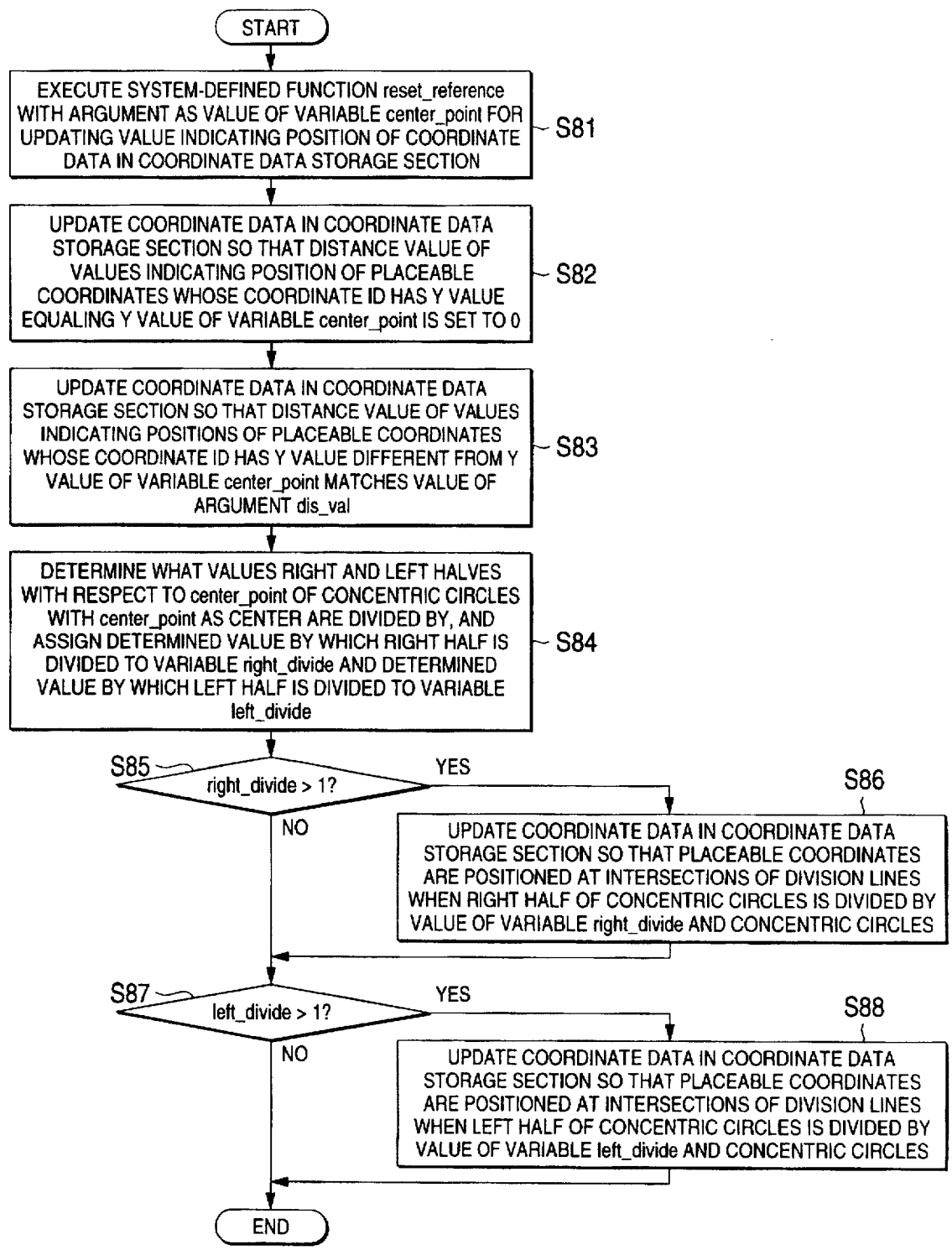
FIG. 24 is a first flowchart to show a processing procedure according to rule 3 of position rules.

FIGS. 24 to 27 are flowcharts to show the processing procedure of rule 3 of the position rules. Composition formation processing according to rule 3 will be discussed with reference to the flowcharts in FIGS. 24-27. Referring first to FIG. 24, when processing is started, system-defined function reset_reference is executed with the argument as the value of variable center_point for updating the value indicating the position of coordinate data in the coordinate data storage section at step 81. Next, at step 82, the coordinate data in the coordinate data storage section is updated so that the distance value of values indicating the position of placeable coordinates whose coordinate ID has the Y value equaling the Y value of the variable center_point is set to 0.

Next, at step 83, the coordinate data in the coordinate data storage section is updated so that the distance value of values indicating the positions of placeable coordinates whose coordinate ID has the Y value different from the Y value of the variable center_point matches the value of the argument dis_val.

At step 84, what values right and left halves with respect to the coordinate point center_point of concentric circles with the coordinate point center_point as the center are divided by are determined, and the determined value by which the right half is divided is assigned to variable right_divide and the determined value by which the left half is divided is assigned to variable left_divide.

Figure 25:
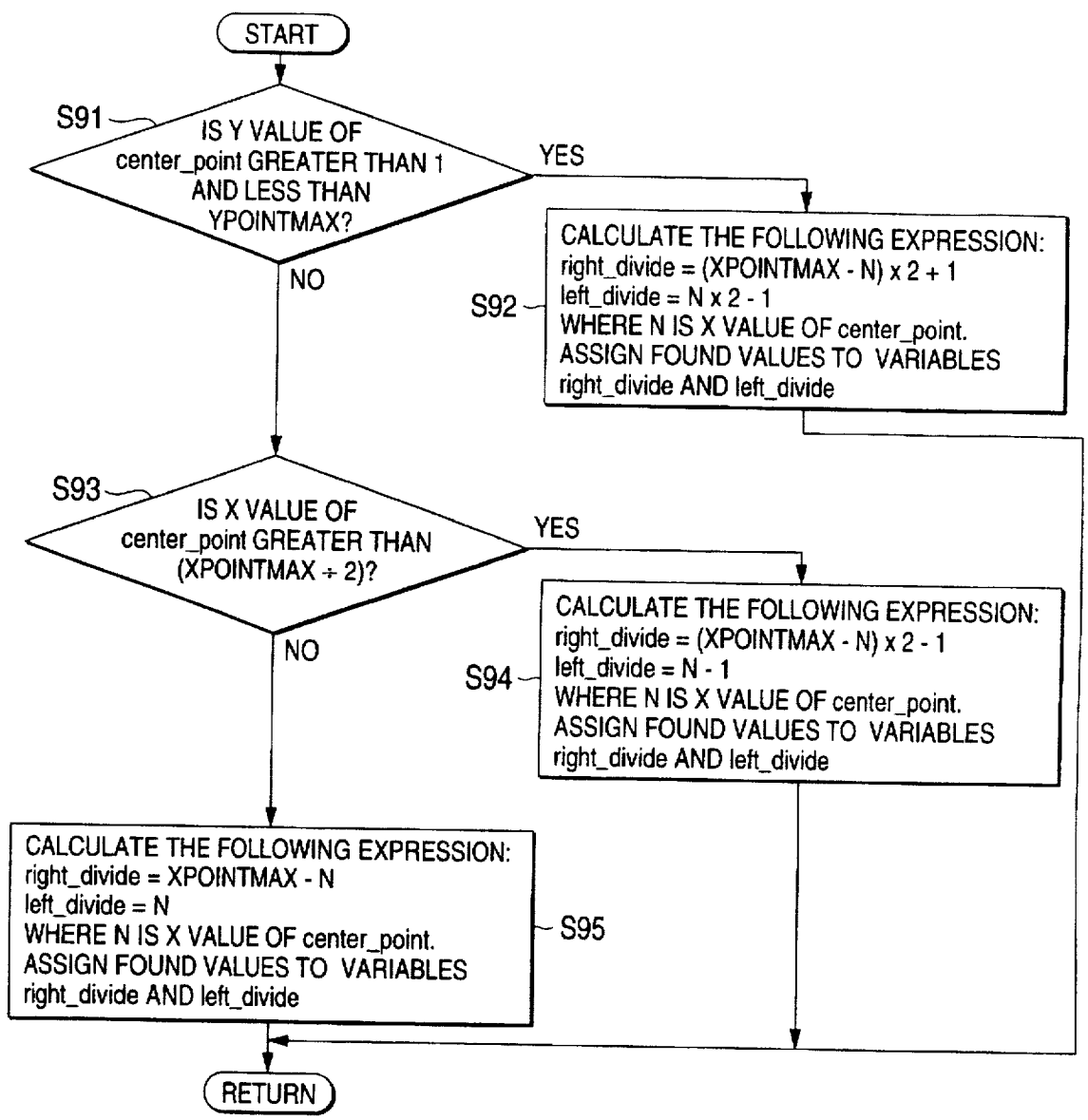
FIG. 25 is a second flowchart to show a processing procedure according to rule 3 of position rules.

That is, as shown in the flowchart of a subroutine shown in FIG. 25, first at step 91, whether or not the Y value of center_point satisfies a first condition that it is greater than 1 and less than YPOINTMAX is determined. If the Y value of center_point satisfies the first condition, control goes to step 92 at which the following expression is calculated:

right_divide=("XPOINTMAX"−*N*)×2+1 left_divide=*N*×2−1 where N is the X value of center_point. The found right_divide and left_divide values are assigned to the variables right_divide and left_divide. Then, control returns.

If it is determined at step 91 that the Y value of center_point does not satisfy the first condition, control goes to step 93 at which the X value of center_point satisfies a second condition that it is greater than ("YPOINTMAT"+2) is determined. If the X value of center_point satisfies the second condition, control goes to step 94 at which the following expression is calculated:

right_divide ("XPOINTMAX"−*N*)×2−1 left_divide=*N*−1 where N is the X value of center_point. The found right_divide and left_divide values are assigned to the variables right_divide and left_divide. Then, control returns.

On the other hand, if it is determined at step 93 that the X value of center_point does not satisfy the second condition, control goes to step 95 at which the following expression is calculated:

right_divide="XPOINTMAX"−*N* left_divide=*N* where N is the X value of center_point. The found right_divide and left_divide values are assigned to the variables right_divide and left_divide. Then, control returns.

Next, at step 85 (FIG. 24), whether or not the variable right_divide is greater than 1 is determined. If the variable right_divide is equal to or less than 1, control goes to step 87 as it is; if the variable right_divide is greater than 1, step 86 is executed.

At step 86, the coordinate data in the coordinate data storage section is updated so that placeable coordinates are positioned at the intersections of division lines when the right half of the concentric circles is divided by the value of the variable right_divide and the concentric circles. This process will be discussed later with reference to the flowchart shown in FIG. 26. Control goes to step 87.

Next, at step 87, whether or not the variable left_divide is greater than 1 is determined. If the variable left_divide is equal to or less than 1, the process is terminated as it is; if the variable left_divide is greater than 1, step 88 is executed.

At step 88, the coordinate data in the coordinate data storage section is updated so that placeable coordinates are positioned at the intersections of division lines when the left half of the concentric circles is divided by the value of the variable left_divide and the concentric circles. This process will be discussed later with reference to the flowchart shown in FIG. 27. The process is terminated. According to rule 3 of the position rules, placement of coordinate points (placeable coordinates) is thus arranged concentrically with the coordinate point_center point as the center.

Figure 26:
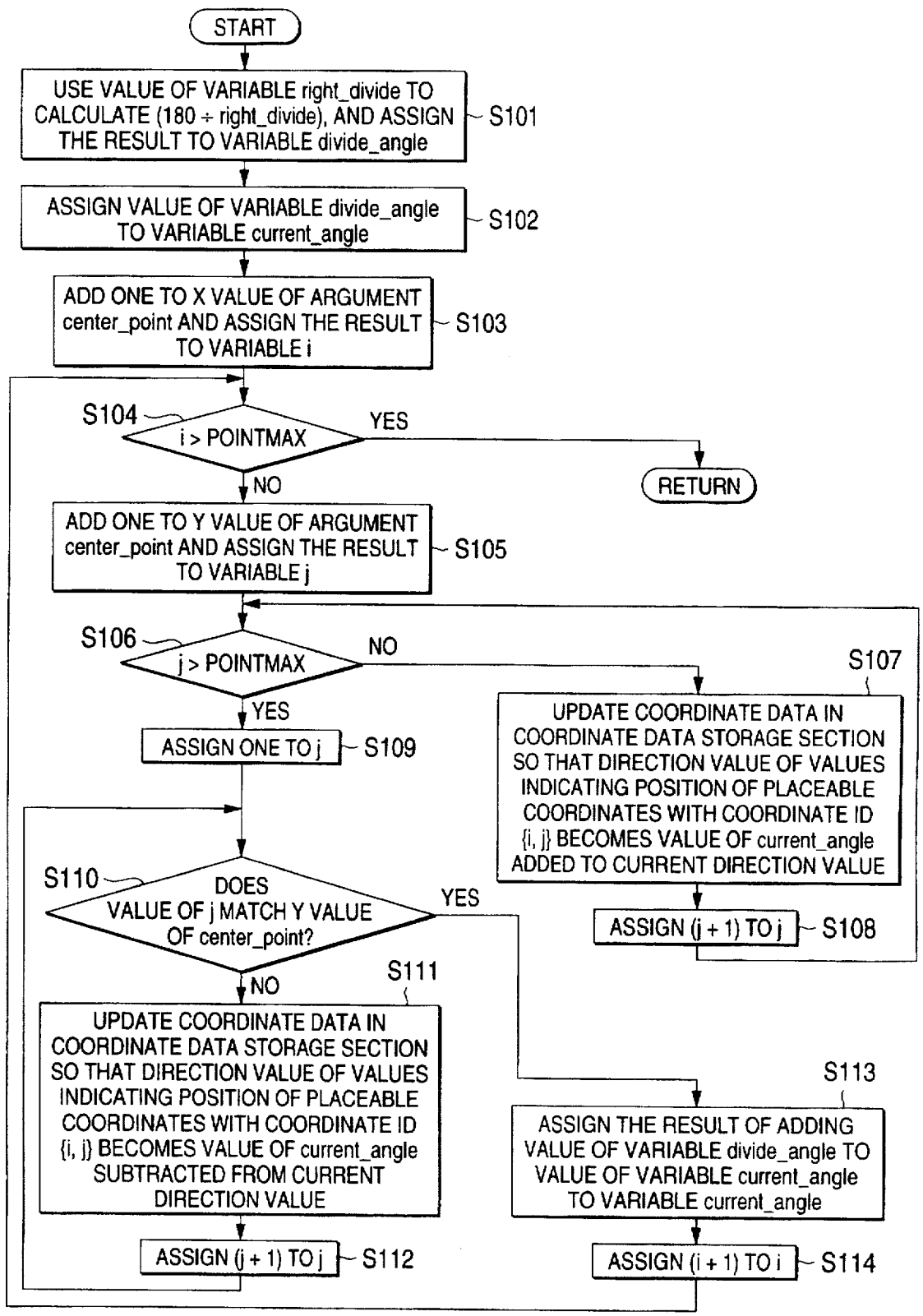
FIG. 26 is a third flowchart to show a processing procedure according to rule 3 of position rules.

Next, the process of positioning placeable coordinates at the intersections of division lines when the right half of the concentric circles is divided by the value of the variable right_divide and the concentric circles will be discussed with reference to FIG. 26. When the process is started, first at step 101, the value of the variable right_divide provided previously at step 84 is used to calculate (180+right_divide), and the result is assigned to variable divide_angle. Next, at step 102, the value of the variable divide_angle is assigned to variable current_angle. Next, at step 103, one is added to the X value of the coordinate point center_point of the argument and the result is assigned to variable i. Whether or not the variable i is greater than "XPOINTMAX" is determined at step 104. If the variable i is greater than "XPOINTMAX," the control returns as it is.

On the other hand, if it is determined at step 104 that the variable i is not greater than "XPOINTMAX," control goes to step 105 at which one is added to the Y value of the coordinate point center_point of the argument and the result is assigned to variable j. Whether or not the variable j is greater than "YPOINTMAX" is determined at step 106. If the variable j is equal to or less than "YPOINTMAX," the control goes to step 107 at which the coordinate data in the coordinate data storage section is updated so that the direction value of values indicating the position of placeable coordinates with coordinate ID {i, j} becomes the value of current_angle added to the current direction value. At step 108, the variable j is incremented and control returns to step 106. The process starting at step 106 is repeated.

On the other hand, it is determined at step 106 that the variable j is greater than "YPOINTMAX," control goes to step 109 and one is assigned to the variable j for resetting. Next, at step 110, whether or not the value of the variable j matches the Y value of the coordinate point current_point of the argument is determined. If they do not match, control goes to step 111 at which the coordinate data in the coordinate data storage section is updated so that the direction value of values indicating the position of placeable coordinates with coordinate ID {i, j} becomes the value of current_angle subtracted from the current direction value. At step 112, the variable j is incremented and control returns to step 110. The process starting at step 110 is repeated.

On the other hand, if it is determined at step 110 that the value of the variable j matches the Y value of the coordinate point current_point of the argument, control goes to step 113 at which the result of adding the value of the variable divide_angle to the value of the variable current_angle is assigned to the variable current_angle. At step 114, the variable i is incremented and control returns to step 104. The process starting at step 104 is repeated. If it can be determined at step 104 that the variable i is greater than "XPOINTMAX," control returns.

Figure 27:
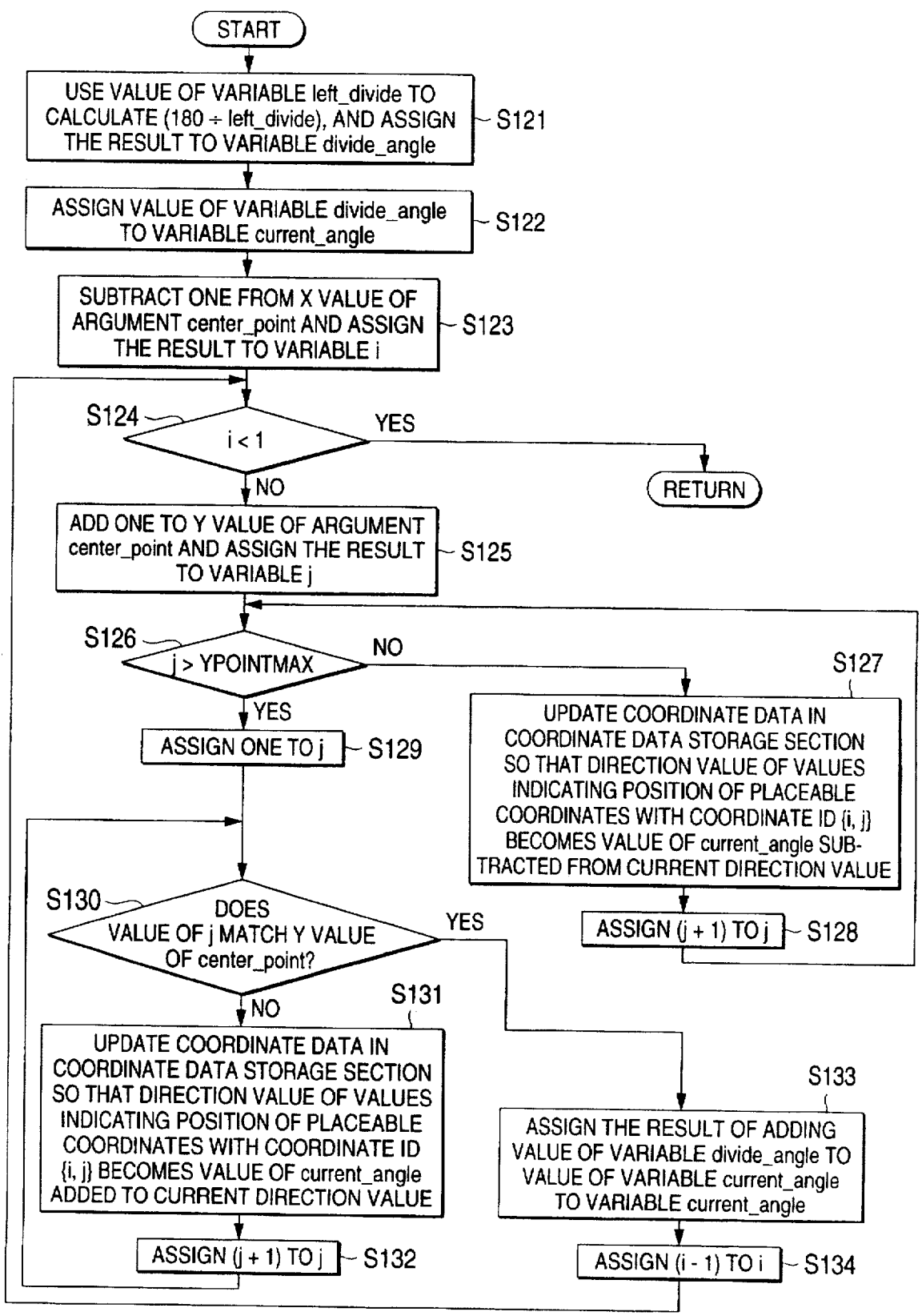
FIG. 27 is a fourth flowchart to show a processing procedure according to rule 3 of position rules.

Next, the process of positioning placeable coordinates at the intersections of division lines when the left half of the concentric circles is divided by the value of the variable left_divide and the concentric circles will be discussed with reference to FIG. 27. When the process is started, first at step 121, the value of the variable left_divide provided previously at step 84 is used to calculate (180 left_divide), and the result is assigned to variable divide_angle.

Next, at step 122, the value of the variable divide_angle is assigned to variable current_angle. Next, at step 123, one is subtracted from the X value of the coordinate point center_point of the argument and the result is assigned to variable i. Whether or not the variable i is less than 1 is determined at step 124. If the variable i is less than 1, the control returns as it is.

On the other hand, if it is determined at step 124 that the variable i is not less than 1, control goes to step 125 at which one is added to the Y value of the coordinate point center_point of the argument and the result is assigned to variable j. Whether or not the variable j is greater than "YPOINTMAX" is determined at step 126. If the variable j is equal to or less than "YPOINTMAX," the control goes to step 127 at which the coordinate data in the coordinate data storage section is updated so that the direction value of values indicating the position of placeable coordinates with coordinate ID {i, j} becomes the value of current_angle subtracted from the current direction value. At step 128, the variable j is incremented and control returns to step 126. The process starting at step 126 is repeated.

On the other hand, it is determined at step 126 that the variable j is greater than "YPOINTMAX," control goes to step 129 and one is assigned to the variable j for resetting. Next, at step 120, whether or not the value of the variable j matches the Y value of the coordinate point current_point of the argument is determined. If they do not match, control goes to step 131 at which the coordinate data in the coordinate data storage section is updated so that the direction value of values indicating the position of placeable coordinates with coordinate ID {i, j} becomes the value of current_angle added to the current direction value. At step 132, the variable j is incremented and control returns to step 130. The process starting at step 130 is repeated.

On the other hand, if it is determined at step 130 that the value of the variable j matches the Y value of the coordinate point current_point of the argument, control goes to step 133 at which the result of adding the value of the variable divide_angle to the value of the variable current_angle is assigned to the variable current_angle. At step 134, the variable i is decremented and control returns to step 144. The process starting at step 124 is repeated. If it can be determined at step 124 that the variable i is less than 1, control returns.

Next, rule 4 of the position rules will be discussed. It is a rule for rotating the entire composition by an arbitrary angle with an arbitrary point as the center. The contents of rule 4 are shown below. The processing procedure of rule 4 (rule_4 (center_point, plus_angle)) rotates all coordinate points clockwise by the value of the argument plus_angle with the coordinate point of the argument center_point as the rotation center point.

```
rule_4(center_point, plus_angle)
{
    reset_reference(center_point);
    for (i=1; XPOINTMAX; i++) {
        for (j=1; YPOINTMAX; j++) {
            p=point_data(i,j);
            p—>position—>angle += plus_angle;
        }
    }
}
```

Figure 28:
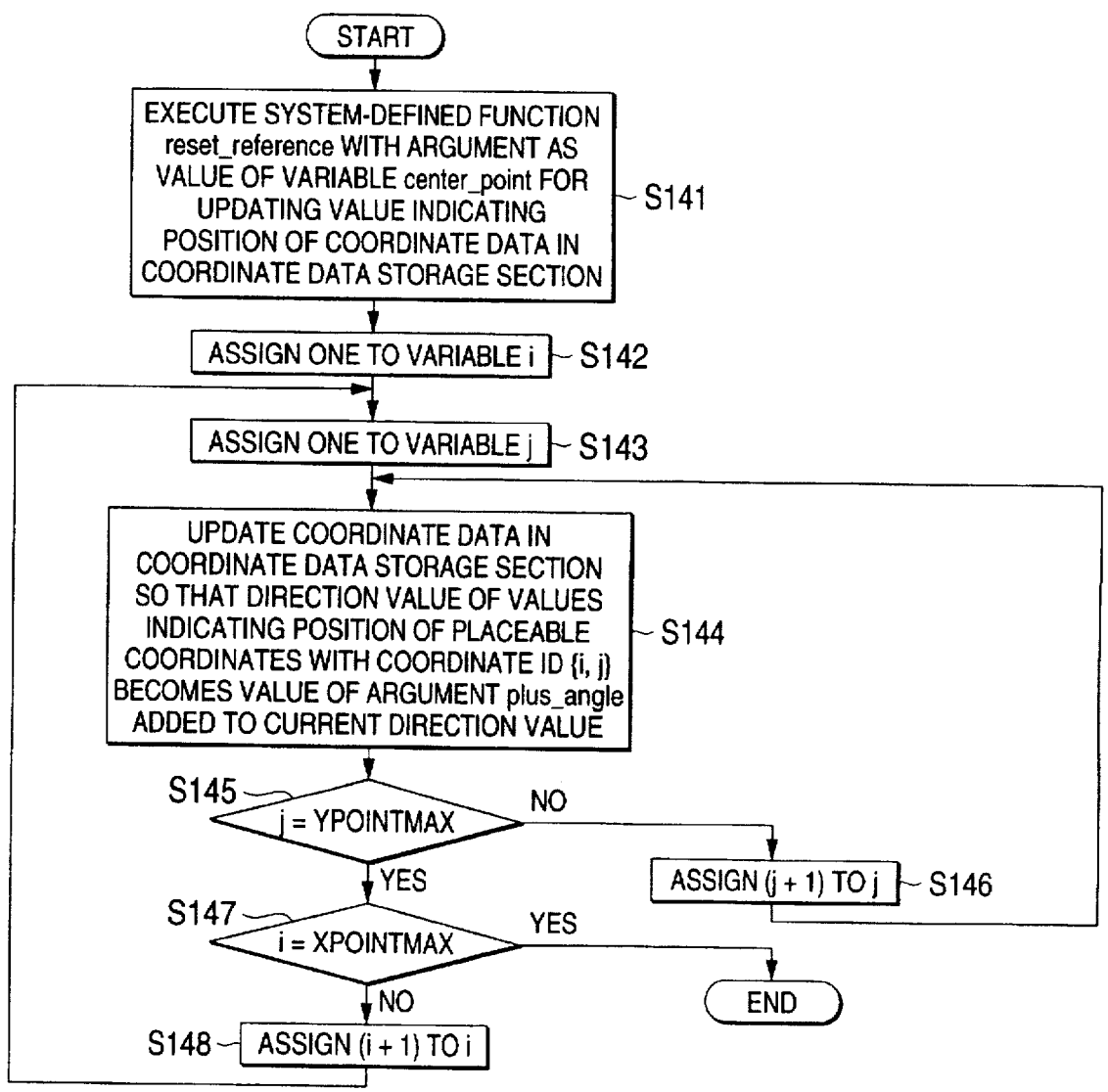
FIG. 28 is a flowchart to show a processing procedure according to rule 4 of position rules.

FIG. 28 is a flowchart to show the processing procedure of rule 4. Composition formation processing according to rule 4 will be discussed with reference to the flowchart in FIG. 28. When processing is started, first at step 141, system-defined function reset_reference is executed with the argument as the value of variable center_point for updating the value indicating the position of coordinate data in the coordinate data storage section. Next, at step 142, one is assigned to variable i and at step 143, one is assigned to variable j.

Next, at step 144, the coordinate data in the coordinate data storage section is updated so that the direction value of values indicating the position of placeable coordinates with coordinate ID {i, j} becomes the value of the argument plus_angle added to the current direction value. Next, at step 145, whether or not the variable j equals "YPOINTMAX" is determined. If the variable j does not equal "YPOINTMAX," then control goes to step 146 and the variable j is incremented. Control returns to step 144. The process starting at step 144 is repeated.

On the other hand, if it is determined at step 145 that the variable j equals "YPOINTMAX," control goes to step 147 and whether or not the variable i equals "XPOINTMAX" is determined. If the variable i does not equal "XPOINTMAX," then control goes to step 148 and the variable i is incremented. Control returns to step 143. The process starting at step 143 is repeated. If it is determined at step 147 that the variable i equals "XPOINTMAX," the process is terminated.

In the description of rules 1–4 of the position rules, the function point_data ({i, j}) is a system-defined function for returning a pointer for accessing coordinate data with coordinate ID {i, i j}. It can be used to reference the attribute values of coordinate data like p→position→angle, and assign them. The "XPOINTMAX" and "YPOINTMAX" are macros indicating the maximum values of X and Y values of placeable coordinates. In the embodiment, the values are both 4.

The function reset_reference ({i, j}) is a systemdefined function for setting the coordinate ID of coordinates used as a position setting reference point to {i, j} and expanding concatenation of measurement objects from the coordinates like a tree. As the measurement objects are changed, the distance and direction are set appropriately so that coordinate placement remains the same as that before the function is applied. The measurement object with coordinate ID {l, m} is set as follows:

1: When l<i and m=j, the measurement object has coordinate ID set to {l+1, m};

2: When l>i and m=j, the measurement object has coordinate ID set to {l−1, m};

3: When m>j, the measurement object has coordinate ID set to {l, m−1};

4: When m<j, the measurement object has coordinate ID set to {l, M+1}.

The system-defined functions and macros are defined in the coordinate data change section 10 described later.

[Position rule selection section 9]

This position rule selection section 9 accepts a user command, selects one from among rules concerning coordinate spacing setting in response to the user command, and sends an instruction for changing placeable coordinates in accordance with the selected rule. In this case, it specifies the values that can be varied in the selected rule, such as the value of the argument center_point of the rules described above.

The user uses the processing function of the position rule selection section 9 to enter a command for selecting one from among the rules stored in the position rule storage section 8. After the rule is selected, if the selected rule has a variable-value argument, the user sets the actual value of the argument. The position rule selection section 9 sends a coordinate change instruction to the coordinate data change section 10 discussed just below with the selected rule and the reference and setup values of the rule as arguments.

[Coordinate data change section 10]

Upon reception of an instruction from the position rule selection section 9, the coordinate data change section 10 changes the coordinate data of coordinate points (directions and distances) stored in the coordinate data storage section 7 by using the rule stored in the position rule storage section 8 in response to the selected rule and the arguments of the rule in the instruction. The coordinate data change section 10 stores macros and system-defined functions like "XPOINT-MAX" and function reset_reference ({i, j}) described above and uses them to interpret the rules.

The coordinate data change section 10 changes the coordinate data in accordance with the instruction sent from the position rule selection section 9, then sends a screen rewrite instruction to the screen display section 14 described later.

Figure 29:
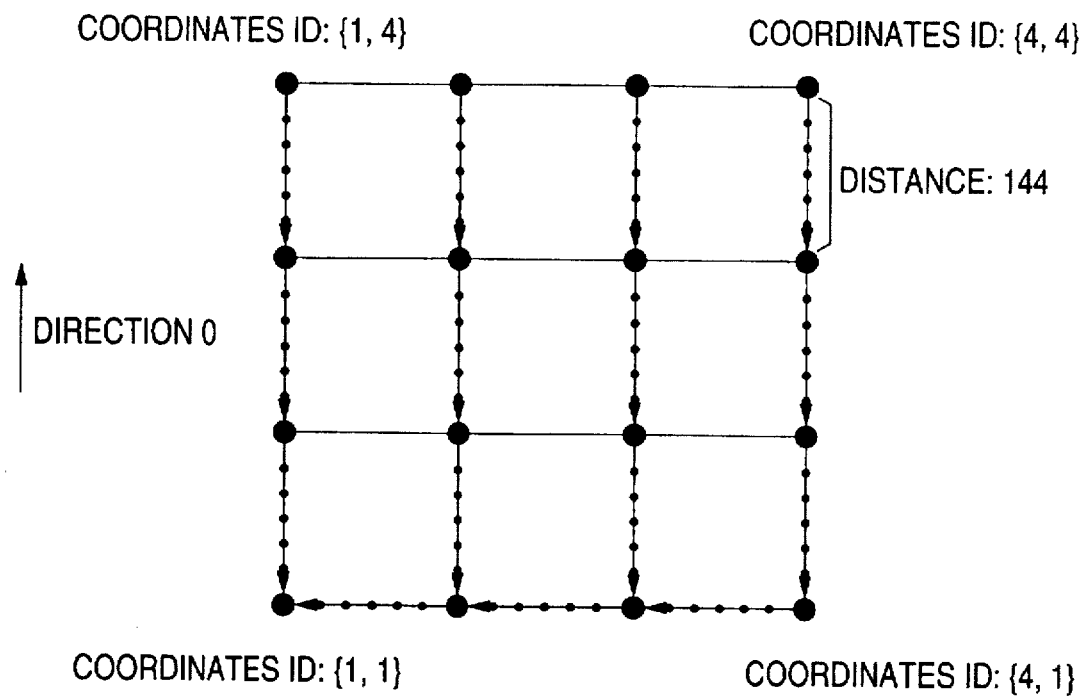
FIG. 29 is an illustration to explain an example of composition formation by applying rule 1 of position rules.

For example, if rule 1 of the position rule is selected and the value of argument dis_val is set to 144, the coordinate data change section 10 changes the coordinate data of the coordinate points (directions and distances) in the coordinate data storage section 7 in response to the conditions of the selected rule and setup argument, thereby forming a composition like a grid on the whole with 16 coordinate points (coordinate IDs) equally spaced from each other. In this case, the distance between the contiguous grid points in all coordinates is set to 144, as shown in FIG. 29.

Figure 30:
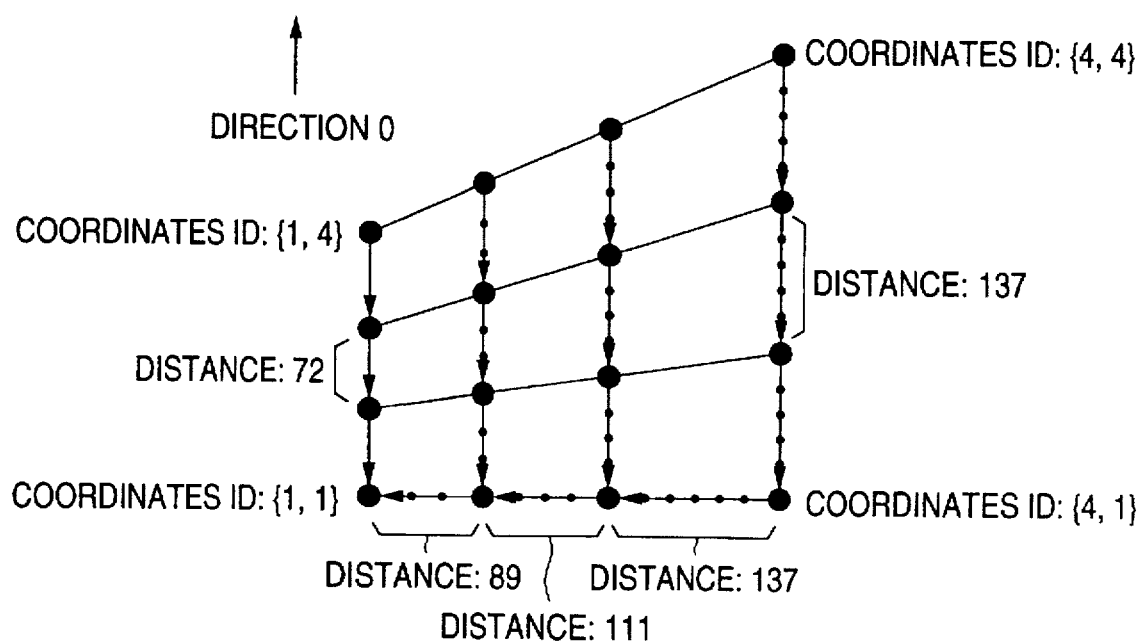
FIG. 30 is an illustration to explain an example of composition formation by applying rule 2 of position rules.

For example, if rule 2 is selected as the position rule, the value of argument dis_val is set to 72, and the value of argument ratio is set to 1.24, the coordinate data change section 10 changes the coordinate data of the coordinate points (directions and distances) in the coordinate data storage section 7 in response to the conditions of the selected rule and setup arguments as in the above, thereby forming a composition with placement of 16 coordinate points (coordinate IDs) geometrically widened and widening toward the end on the whole, as shown in FIG. 30. In this case, the initial value of space is set to 72, the value of the argument dis_val, and spacing of the grid points is set so as to widen in the ratio of 1.24, the value of the argument ratio.

Figure 31:
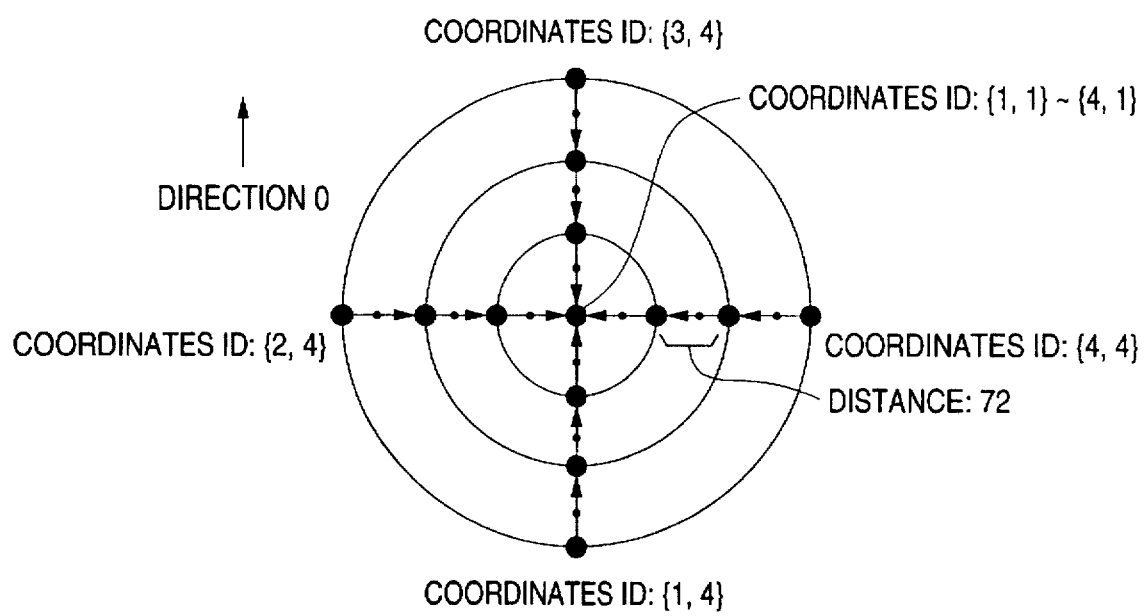
FIG. 31 is an illustration to explain an example of composition formation by applying rule 3 of position rules.

For example, if rule 3 is selected as the position rule, the coordinate point (coordinate ID) of argument center_point is set to coordinates {3, 1}, and the value of argument dis_val is set to 72, the coordinate data change section 10 changes the coordinate data of the coordinate points (directions and distances) in the coordinate data storage section 7 in response to the conditions of the selected rule and setup arguments as in the above, thereby arranging placement of 16 coordinate points like concentric circles so that the value of the argument dis_val, 72, becomes the radius difference (distance) with the coordinate point with the coordinate ID {3, 1} indicated by the value of the argument center_point as the center, as shown in FIG. 31. In this arrangement, four coordinate points with coordinate IDs {1, 1} to {4, 1} containing the coordinate point with the coordinate ID {3, 1} are positioned at the center point.

Figure 32:
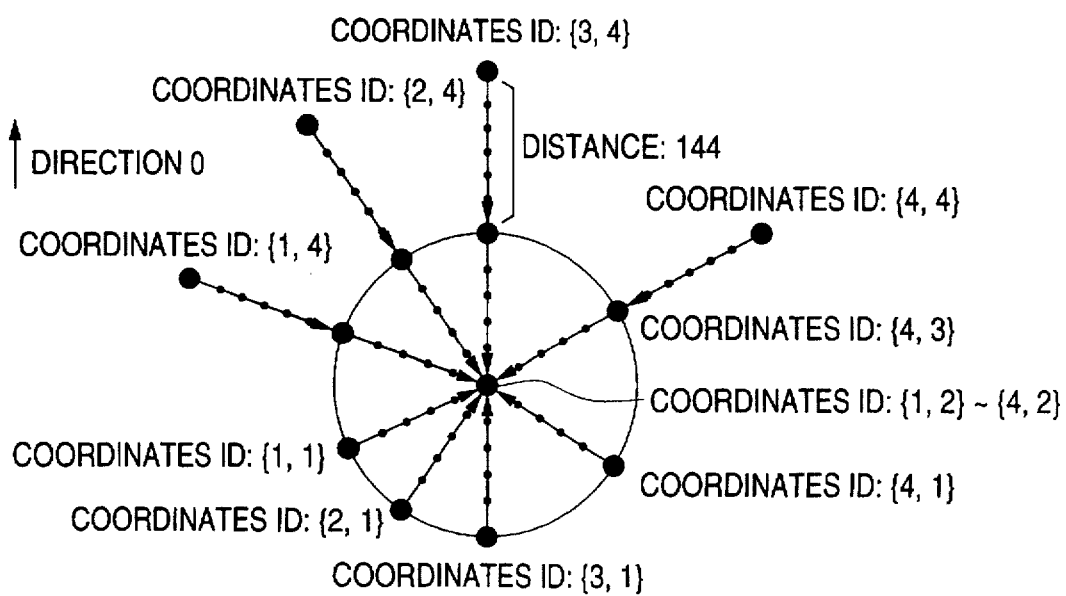
FIG. 32 is an illustration to explain another example of composition formation by applying rule 3 of position rules.

Likewise, if rule 3 is selected as the position rule, the coordinate point (coordinate ID) of argument center_point is set to coordinates {3, 2}, and the value of argument dis_val is set to 144, the coordinate data change section 10 arranges placement of 16 coordinate points like concentric circles so that the value of the argument dis_val, 144, becomes the radius difference with the coordinate point with the coordinate ID {3, 2} indicated by the value of the argument center_point as the center, as shown in FIG. 32. Therefore, in this arrangement, four coordinate points with coordinate IDs {1, 2} to {4, 2} containing the coordinate point with the coordinate ID {3, 2} are positioned at the center point and four coordinate points with coordinate IDs {1, 1} to {4, 1} are arranged in the lower half circle portion on the concentric circle. Four coordinate points with coordinate IDs {1, 3} to {4, 3} are arranged in the upper half circle portion on the concentric circle. Four coordinate points with coordinate IDs {1, 4} to {4, 4} are arranged in the portion on the concentric circle above the coordinate points with the coordinate IDs {1, 3} to {4, 3}. This means that the four coordinate points with the coordinate IDs {1, 4} to {4, 4} are arranged in the upper half circle portion on the outer concentric circle with the radius difference 144.

Figure 33:
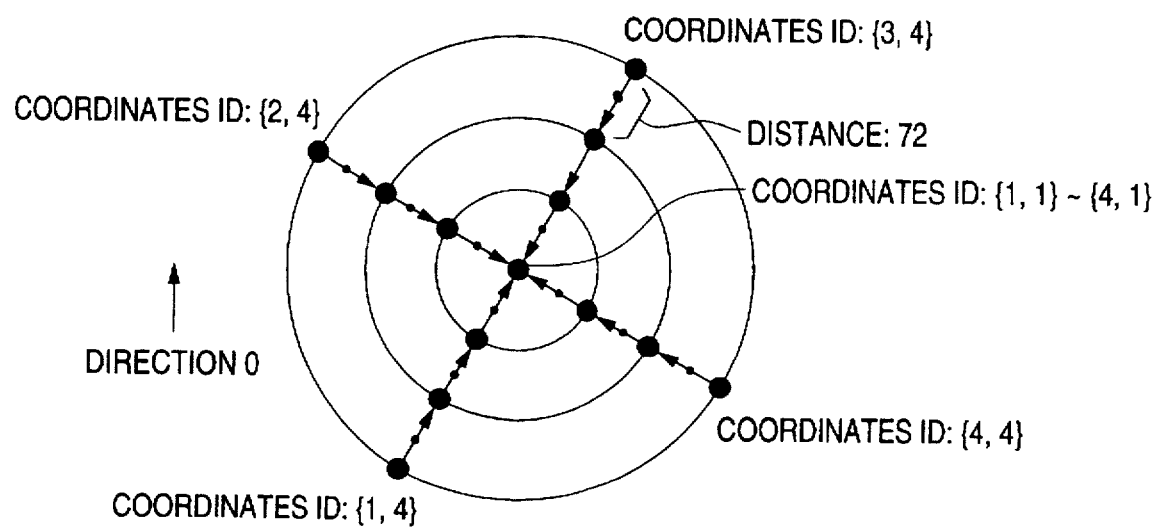
FIG. 33 is an illustration to explain an example of composition formation by applying rule 4 of position rules.

If rule 4 is selected as the position rule, the coordinate point of argument center_point is set to coordinates {3, 1}, and the value of argument plus_angle is set to 30 from the placement state as shown in FIG. 31, all coordinate points are rotated clockwise by the value of the argument plus_angle with the coordinate point (coordinate ID) indicated by the argument center_point as the rotation center. Thus, the placement of 16 coordinate points (coordinate IDs) rotates with the positional relationships among the coordinate points unchanged, as shown in FIG. 33.

[Color arrangement rule storage section 11]

Next, color arrangement rules will be discussed. The color arrangement rule storage section 11 stores rules for specifying what color an element placed at one coordinate point has. The rules are used for the element color arrangement change section 13 (described later) to change element colors. In the embodiment, two color arrangement rules are provided. Like the position rules discussed above, the color arrangement rules are described as sequential processing routines by a program having syntax like a C language.

Rule 11 of the color arrangement rules is a rule for increasing or decreasing step-wise the lightness of colors of placed elements conforming to the X values of coordinate IDs of coordinate points with the coordinate point indicated by argument center_point as the center. In this case, the magnitude of the lightness, namely, the ratio of light and dark is given by argument ratio (positive real value). In the color arrangement rule, if the argument ratio is less than 1, the elements placed at coordinate points whose coordinate ID has the X value smaller than that of the coordinate point indicated by the argument center_point are deepened and the elements placed at coordinate points whose coordinate ID has the X value greater than that of the coordinate point indicated by the argument center_point are lightened. If the argument ratio exceeds 1, the relationship between the coordinate IDs and element color light and dark becomes opposite to that applied when the argument ratio is less than 1. Hue, saturation, etc., may be changed in place of the lightness.

```
rule_11(center_point, ratio)
{
    for (i=1; XPOINTMAX; i++) {
        if (i = center_point[0])
            continue;
        if (i > center_point[0]) {
            power = 1.0;
            for (n=1; i - center_point[0] ; n++)
                power *= 1 / ratio;
        }
        else {
            power = 1.0;
            for (n=1; center_point[0] - i; n++)
                power *= ratio;
        }
        for (j=1; YPOINTMAX; j++)
            lighten({i,j}, power);
    }
}
```

The function lighten is a system-defined function for the element color arrangement change section 13 to use the element data change section 2 to change the value of attribute color of element data. When the function is executed, for the tables corresponding to drawing elements stored in the element data storage section 1 and having the position attribute value matching the first argument value of the function, (L* X power) is calculated from the color attribute value of the current value for element lightening color with the second argument value of the function as a magnification, and the calculation result is assigned to the color attribute value as L*.

Figure 34:
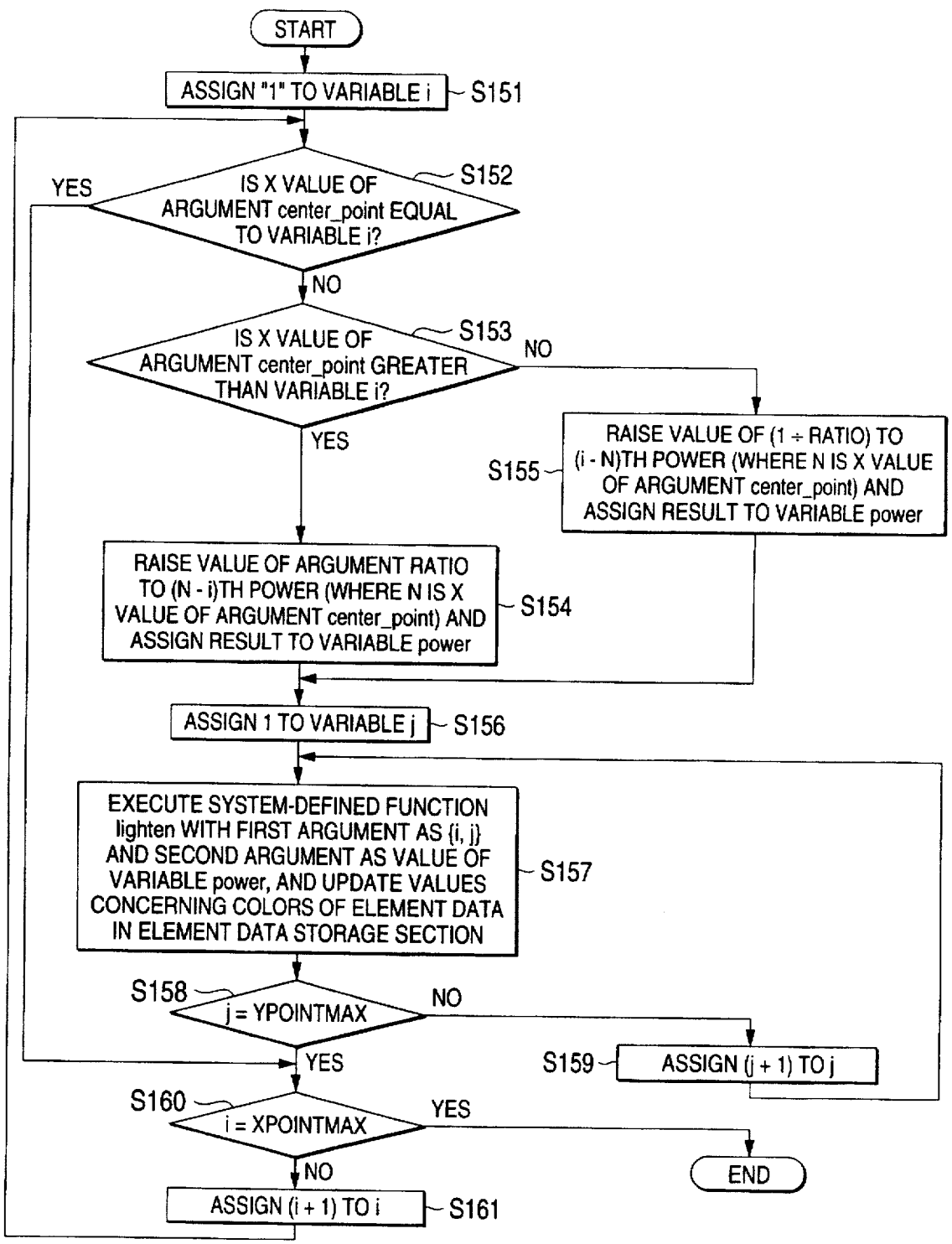
FIG. 34 is a flowchart to show a processing procedure according to rule 11 of color arrangement rules.

FIG. 34 is a flowchart to show a processing procedure of rule 11 of the color arrangement rules. Color arrangement processing for composition elements according to rule 11 will be discussed with reference to the flowchart in FIG. 34. First at step 151, one is assigned to variable i. Next, at step 152, whether or not the X value of argument center_point equals the variable i is determined. If the X value of argument center_point equals the variable i, control goes to step 160. If the X value of argument center_point does not equal the variable i, control goes to step 153 at which whether or not the X value of argument center_point is greater than the variable i is determined.

It is determined at step 153 that the X value of argument center_point is greater than the variable i, control goes to step 154 and the value of argument ratio is raised to the (N−i)th power (where N is the X value of the argument center_point) and the result is assigned to variable power. Then, control goes to step 156. On the other hand, it is determined at step 153 that the X value of the argument center_point is not greater than the variable i, control goes to step 155 and the reciprocal of the value of the argument ratio (1+ratio) is raised to the (i−N)th power (where N is the X value of the argument center_point) and the result is assigned to the variable power. Then, control goes to step 156.

At step 156, one is assigned to variable j. At step 157, the system-defined function lighten is executed with the first argument as {i, j} and the second argument as the value of the variable power, and the values concerning colors of element data in the element data storage section 1 are updated depending on the execution result of the function. At step 158, whether or not the value of the variable j is the same as "YPOINTMAX" is determined. If it is not determined that the value of the variable j is the same as "YPOINTMAX," control goes to step 159 at which the variable j is incremented. Then, control returns to step 157 and the process starting at step 157 is repeated.

If it is determined at step 158 that the value of the variable j is the same as "YPOINTMAX," control goes to step 160 at which the value of the variable i is the same as "XPOINTMAX" is determined. If it is not determined that the value of the variable i is the same as "XPOINTMAX," control goes to step 161 at which the variable i is incremented. Then, control returns to step 152 and the process starting at step 152 is repeated. If it is determined at step 160 that the value of the variable i is the same as "XPOINTMAX," the process is terminated.

Rule 12 of the color arrangement rules is a rule for changing the hue of the element placed at a grid point from the angle which the grid point and a grid point indicated by argument center_point form with a vertical line to the screen (straight line along direction 0 or 180). In rule 12, the hue of the element placed at the grid point indicated by the argument center_point is not changed. Saturation, lightness, etc., rather than the hue may be changed.

```
rule_12(center_point) {
    for (j=1; YPOINTMAX; j++) {
        for(i=1; XPOINTMAX; i++) {
            if (i != center_point[0] || j != center_point[1]) {
                angle = calc_angle({i,j}, {center_point[0] center_point[1]});
                hue({i, j}, angle);
            }
        }
    }
}
```

The function calc_angle is a system-defined function for calculating the angle which a vector directed from the first argument grid point to the second argument grid point forms with direction 0. The vector is calculated by a vector operation from the position attribute values of measurement object, direction, and distance that each coordinate point stored in the coordinate data storage section 7 has. The function hue is a system-defined function for the element color arrangement change section 13 to use the element data change section 2 to change the value of attribute color of element data. When the function is executed, for the tables corresponding to drawing elements stored in the element data storage section 1 and having the position attribute value matching the first argument value of the function, tan (angle) of a trigonometric function is calculated from the second argument value of the function and the calculation result is assigned to the color attribute value as b*/a*.

Figure 35:
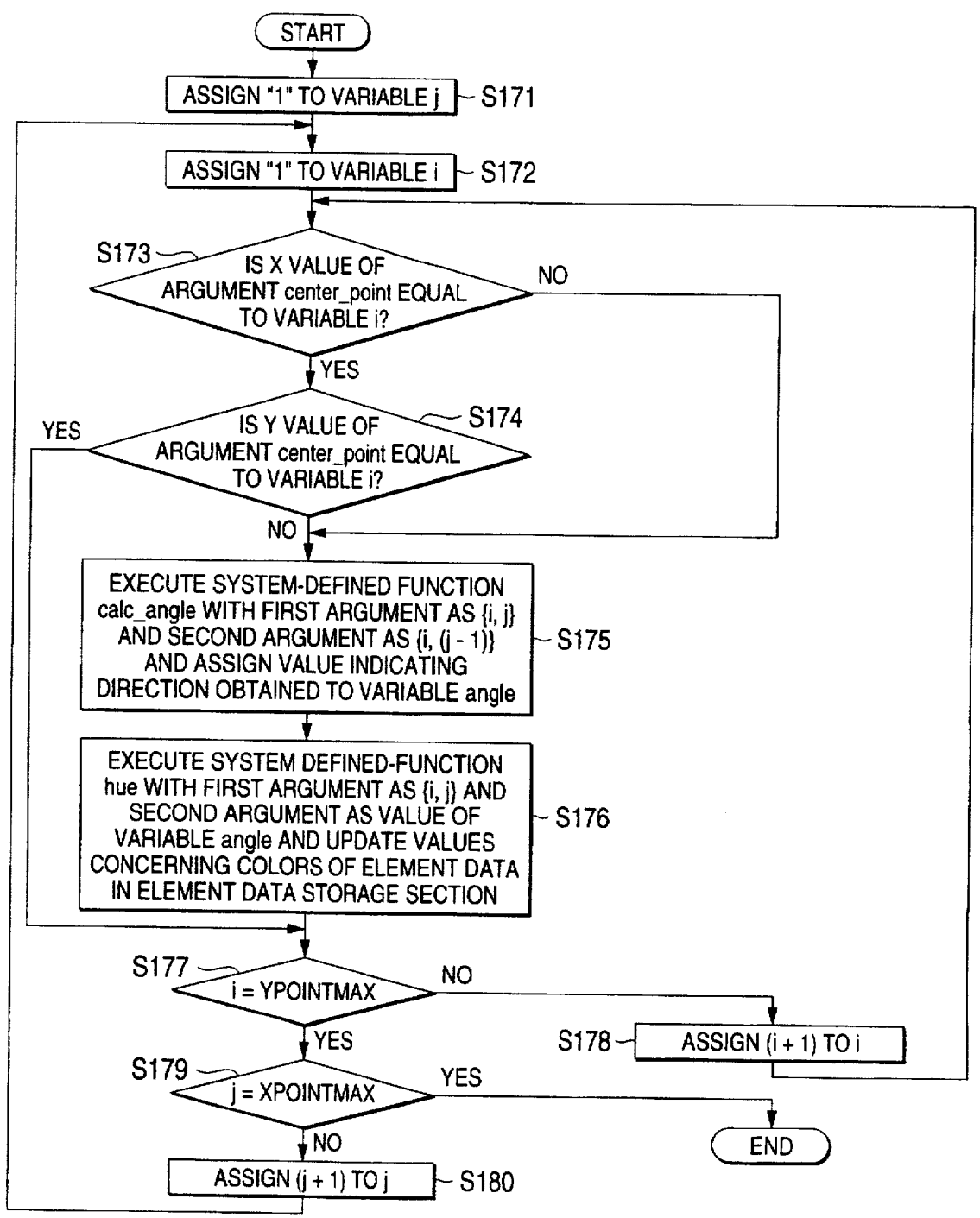
FIG. 35 is a flowchart to show a processing procedure according to rule 12 of color arrangement rules.

FIG. 35 is a flowchart to show a processing procedure of rule 12 of the color arrangement rules. Color arrangement processing for composition elements according to rule 12 will be discussed with reference to the flowchart in FIG. 35. First at step 171, one is assigned to variable j. Next, at step 172, one is assigned to variable i. Next, at step 173, whether or not the X value of argument center_point equals the variable i is determined. If the X value of argument center_point equals the variable i, control goes to step 174 at which the Y value of the argument center_point equals the variable j is determined. If it is determined that the Y value of the argument center_point equals the variable j, control goes to step 177.

If it is determined at step 173 that the X value of the argument center_point does not equal the variable i or if it is determined at step 174 that the Y value of the argument center_point does not equal the variable j, control goes to step 175 at which the system-defined function calc_angle is executed with the first argument as {i, j} and the second argument as {i, j−1}, and the value indicating the direction provided as the execution result of the function is assigned to variable angle. Next, at step 176, the system-defined function hue is executed with the first argument as {i, j} and the second argument as the value of the variable angle, and the values concerning the colors of element data in the element data storage section 1 are updated according to the data provided as the execution result of the function.

At step 177, whether or not the value of the variable i is the same as "XPOINTMAX" is determined. If it is not determined that the value of the variable i is the same as "XPOINTMAX," control goes to step 178 at which the variable i is incremented. Then, control returns to step 173 and the process starting at step 173 is repeated.

If it is determined at step 177 that the value of the variable i is the same as "XPOINTMAX," control goes to step 179 at which the value of the variable j is the same as "YPOINTMAX" is determined. If it is not determined that the value of the variable j is the same as "YPOINTMAX," control goes to step 180 n at which the variable j is incremented. Then, control returns to step 172 and the process starting at step 172 is repeated. If it is determined at step 179 that the value of the variable j is the same as "YPOINTMAX," the process is terminated.

[Color arrangement rule selection section 12]

This color arrangement rule selection section 12 is provided for the user to select any desired color arrangement rule from among the rules (rules 11 and 12) stored in the color arrangement rule storage section 11. In this case, if the selected rule involves argument specification, the user sets the value of the argument. If the user selects a desired rule and sets the argument thereof, the color arrangement rule selection 12 sends an element color change instruction to the element color arrangement change section 13 (described below) with the name of the selected color arrangement rule (for example, rule__11) and the value of the argument if the argument is present.

[Element color arrangement change section 13]

This element color arrangement change section 13 reads and interprets the corresponding color arrangement rule stored in the color arrangement rule storage section 11 from the rule name of the color arrangement rule and the argument passed from the color arrangement rule selection 12, and uses the element data in the element data change section 2 to change element colors so that the element colors conform to the color arrangement rule.

[Screen display section 14]

This screen display section 14 interprets coordinate point data stored in the coordinate data storage section 7 and element data stored in the element data storage section 1 in response to a screen rewrite instruction, converts the data into RGB raster image data, and displays the resultant RGB raster image data on a display. It also provides a graphic user interface function for displaying a cursor ganged with a pointing device on a screen for the user to directly select coordinate points and drawing elements in conjunction with the operation of a basic operating system processing section (not shown).

The screen display section 14 also has a function for storing information set by the user indicating where the coordinate point used as the reference point for setting direction and distance attributes among the coordinate points stored in the coordinate data storage section 7, namely, the coordinate point having nil as the value of measurement object of the position representing attribute is positioned on the display screen. The stored information is used to calculate the screen positions of drawing elements when the screen display section 14 draws the drawing elements. It is used together with the data stored in the coordinate data storage section 7 for calculating the screen positions of drawing elements and drawing the drawing elements. To draw the drawing elements, they are overwritten on each other in the ascending order of the values of the display order attribute. If one element has a value of the text attribute, first drawing is executed according to the color and form attributes, then the text is overwritten based on the value of the text attribute.

[Drawing print section 15]

This drawing print section 15 interprets coordinate point data stored in the coordinate data storage section 7 and element data stored in the element data storage section 1, converts the data into CMYK raster image data for a printer (not shown), and sends the resultant CMYK raster image data to the printer for printing on paper or an OHP sheet. The user sets information indicating where the coordinate point used as the reference point for setting direction and distance attributes among the coordinate points stored in the coordinate data storage section 7, namely, the coordinate point having nil as the value of measurement object of the position representing attribute is positioned on the paper or OHP sheet. The setup information is stored in the drawing print section 15. The stored information is used together with the data stored in the coordinate data storage section 7 to calculate the paper or OHP sheet positions of drawing elements when the drawing print section 15 draws the drawing elements.

To draw the drawing elements, they are overwritten on each other in the ascending order of the values of the display order attribute as with the operation of the screen display section 14. If one element has a value of the text attribute, first drawing is executed according to the color and form attributes, then the text is overwritten based on the value of the text attribute.

[Processing control section 16]

This processing control section 16 controls the functional processing sections throughout the processing flow of the system, as described above. It also accepts commands from the user and starts and terminates the entire system. In this case, the processing control section 16 assigns the command input acceptance time in sequence to the functional processing sections for accepting user commands. When a command is entered from the user for the functional section to which the time is assigned, the processing control section 16 interrupts time assignment to other functional processing sections until the processing started in response to the request is terminated.

Figure 36:
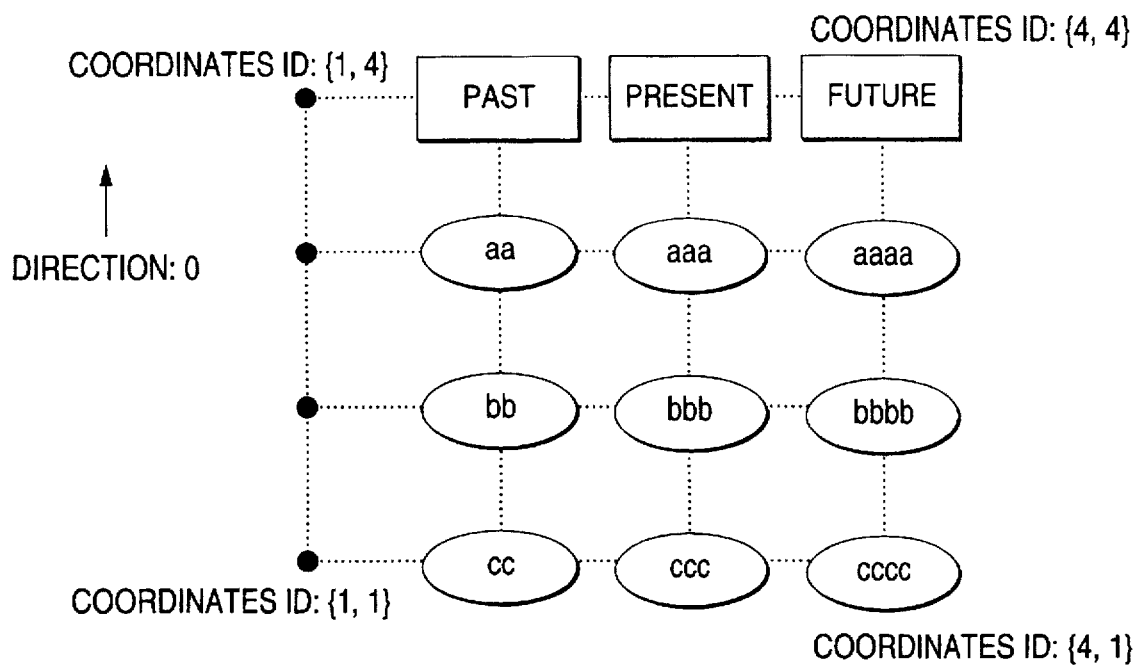
FIG. 36 is an illustration to show an example of a composition with drawing elements placed at positions of equally spaced grid points.
Figure 37:
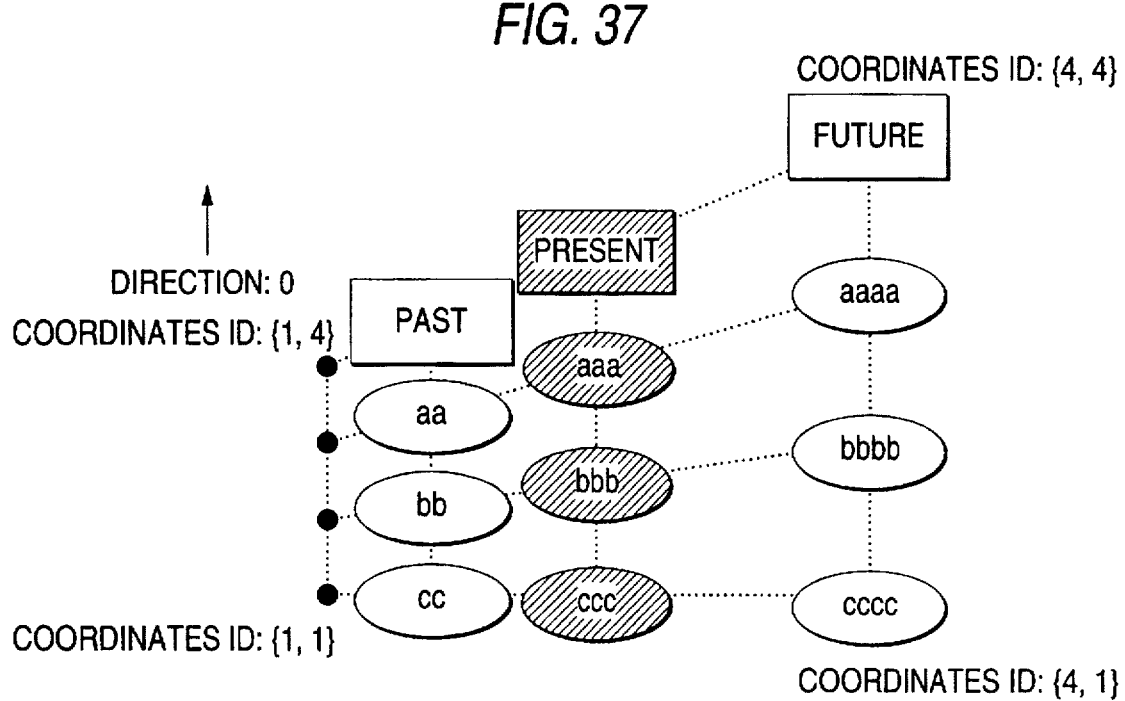
FIG. 37 is an illustration to show an example of changing the composition in FIG. 36 by applying rule 2 of the position rule and rule 11 of the color arrangement rule thereto.

Specific processing examples for forming compositions used for documents in the drawing system of the embodiment comprising the functional processing sections will be discussed. FIG. 36 is an illustration to show an example of a composition with drawing elements placed at positions of equally spaced grid points. FIG. 37 is an illustration to show an example of changing the composition in FIG. 36 by applying rule 2 of the position rule and rule 11 of the color arrangement rule thereto.

For example, if drawing elements are placed indicating the time passage on the horizontal axis and indicating the time passage contents on the vertical axis in a document, a normal composition would be made up of 16 drawing elements placed at equally spaced grid point positions as shown in FIG. 36. For example, if rule 2 is selected as the position rule, 89 is set as the value of argument dis__val, and 1.12 is set as the value of argument ratio from the composition state in FIG. 36, a composition is formed in such a manner that placement of the 16 drawing elements is widened geometrically and that the contents widen toward the end with the passage of time. In this case, if rule 11 is furthermore selected as the color arrangement rule, colors are arranged so that the colors of the drawing elements deepen with the passage of time. Resultantly, the placement and color arrangement as shown in FIG. 37 can be provided.

Thus, the user can give a color arrangement fitted to a composition to drawing elements, such as gradation for changing the lightness of elements conforming to widening toward the end or changing the hue for more visibility of a specific portion of the drawing, simply by selecting a position rule and a color arrangement rule.

Figure 38:
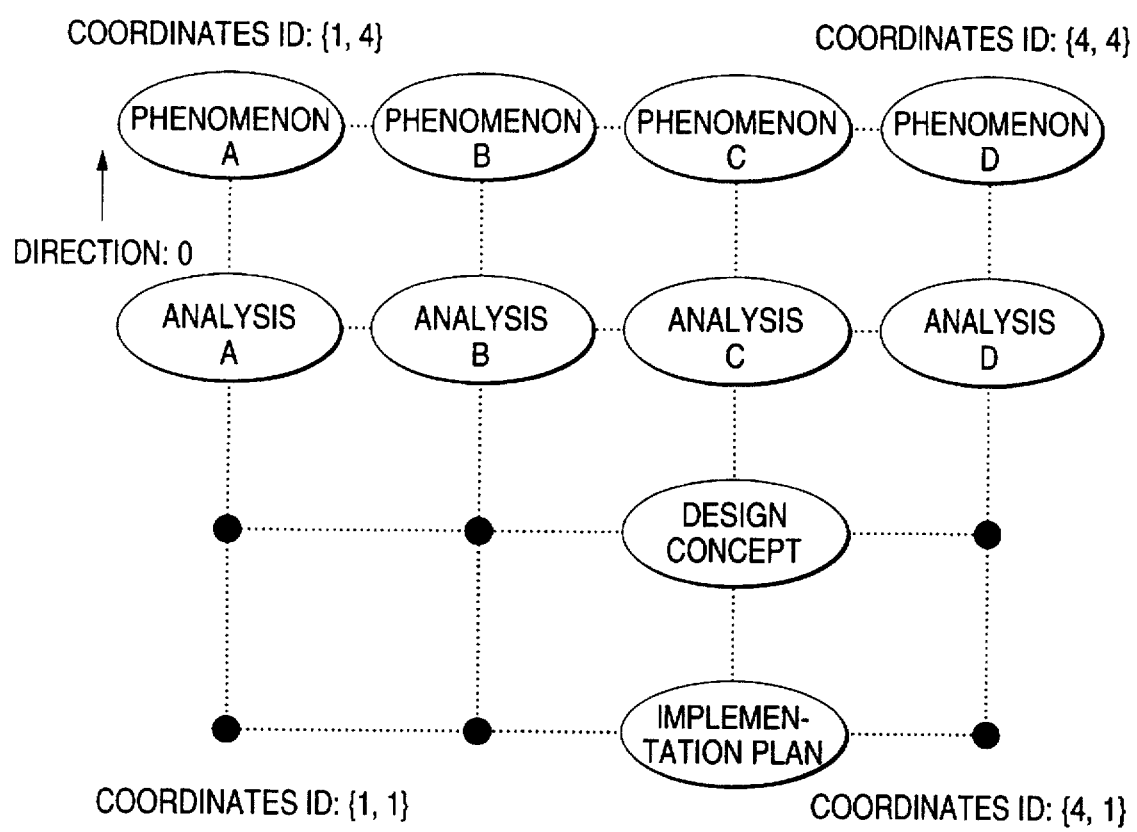
FIG. 38 is an illustration to show another example of a composition with drawing elements placed at positions of equally spaced grid points.
Figure 39:
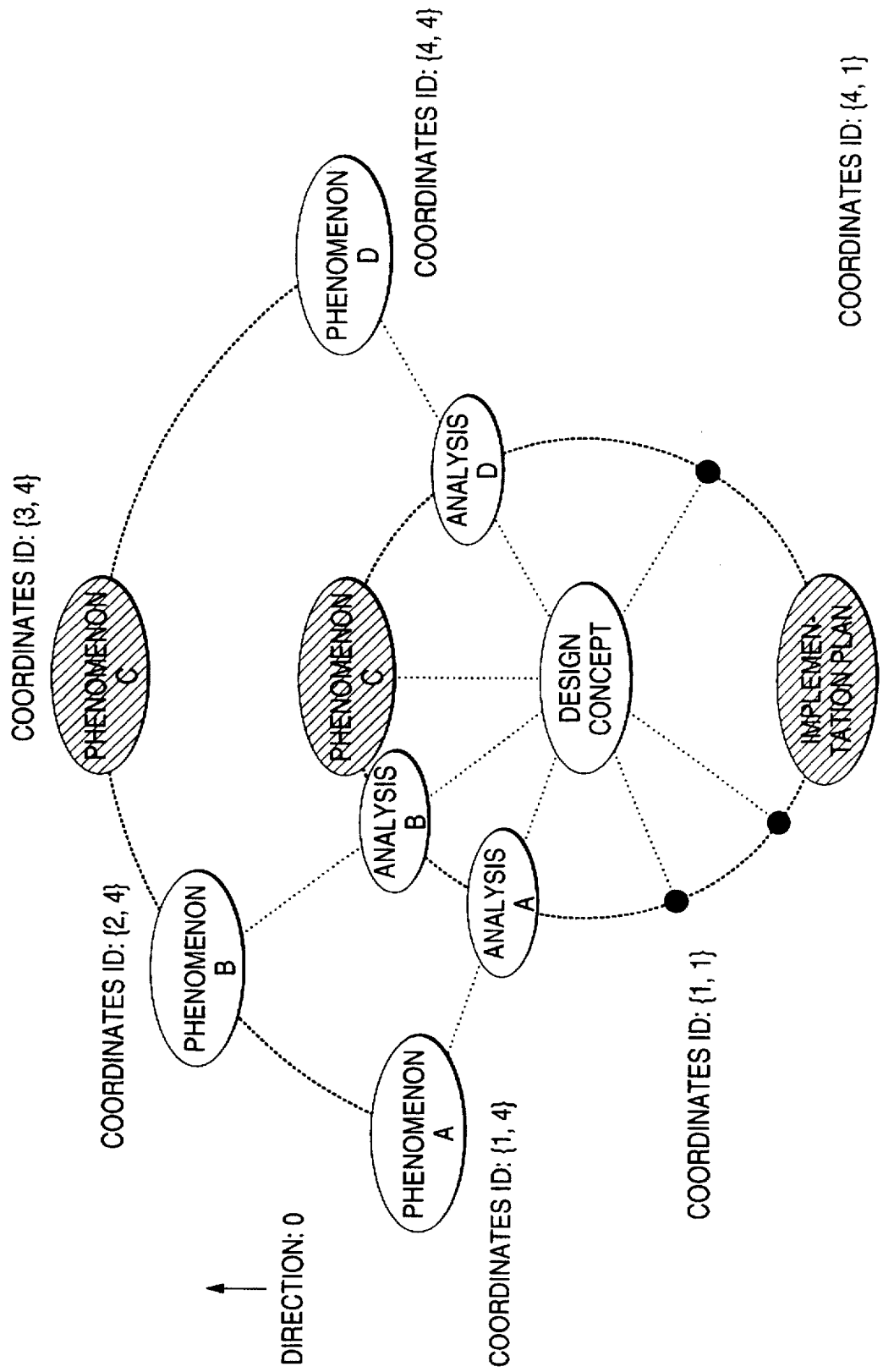
FIG. 39 is an illustration to show an example of changing the composition in FIG. 38 by applying rule 3 of the position rule and rule 12 of the color arrangement rule thereto.

FIG. 38 is an illustration to show another example of a composition with drawing elements placed at positions of equally spaced grid points. FIG. 39 is an illustration to show an example of changing the composition in FIG. 38 by applying rule 3 of the position rule and rule 12 of the color arrangement rule thereto.

For example, if rule 3 is selected as the position rule for positioning drawing elements, the coordinates of the coordinate point in argument center_point used with the rule are set to {3, 2}, the value of argument dis_val used with the rule is set to 144, rule 12 is selected as the color arrangement rule, and the coordinates of the coordinate point in argument center_point used with the rule are set to {3, 2} from the composition state of 16 drawing elements placed at equally spaced grid point positions as shown in FIG. 38, the placement and color arrangement wherein the drawing elements are placed on concentric circles with one element as the center can be provided as shown in FIG. 39.

If it is appropriate to thus place drawing elements concentrically conforming to the representation contents, namely, the concept in the composition, etc., the central concept can be represented by using rule 3 as the position rule. The user can give a color arrangement fitted to a composition to drawing elements, such as gradation for changing the lightness of elements conforming to the element positions, changing the hue, or more visibility of a specific portion of the drawing, simply by selecting position and color arrangement rules.

The drawing system of the embodiment adopts a method of providing a finite number of placeable coordinate points (coordinate IDs), identifying the coordinate points by two-dimensional coordinate IDs, setting positions on the two-dimensional plane according to rules, and determining positions of the drawing elements placed at the coordinate points on the two-dimensional plane. In this method, the contiguous relationships among the coordinate IDs of the coordinate points, such as {i, j} and {i+1, j}, and the coaxial relationships, such as {i, j} and {i, m}, can be used to set rules of the placement relationships and color arrangement relationships. For example, it is easily made possible to "place drawing elements with close IDs of placement coordinates nearby regardless of the composition."

In the embodiment, spacing setting is represented by relative description of the direction and distance with respect to other grid points. This facilitates geometric or arithmetic setting of an arrangement of coordinate points that can be placed by the method. If an alternative method such as absolute position specification or relative specification with only the distance is adopted as the method indicating positions of placeable coordinate on the two-dimensional plane, it is clear that a similar effect to that of the embodiment can be produced for changing placement of drawing elements conforming to the composition.

As we have discussed, the invention enables the user to easily prepare a drawing well balanced in a color arrangement simply by specifying a color arrangement rule. Particularly if color arrangement patterns responsive to the color arrangement rules are displayed together with drawing targets, etc., the user can prepare a drawing matching his or her purposes and involving no problems on a color arrangement without any special skills. If the user marks a monochrome or single-color image with color marks and specifies elements to which a color arrangement is to be applied and a color arrangement rule, a color drawing well balanced in a color arrangement can be easily prepared from the monochrome or single-color image.

The drawing system of the invention can provide a sophisticated composition with element colors appropriately changed in response to the drawing element placement relationship, and drastically reduce the composition setting or changing load for the user.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A drawing system for preparing a drawing having at least one drawing element placed on a two-dimensional plane, said system comprising:

means for storing information concerning a plurality of color arrangement rules for determining colors to be assigned to drawing elements in response to positional relationships among the drawing elements on the two-dimensional plane;

means for displaying color arrangement patterns responsive to the color arrangement rules;

means for specifying a color arrangement rule for the drawing to be prepared;

means for referencing said storage means based on the specified color arrangement rule and determining colors of drawing elements contained in the drawing to be prepared; and means for generating image information representing the prepared drawing colored in response to the colors determined for the drawing elements of the drawing.

2. The drawing system as claimed in claim 1 wherein said means for displaying color arrangement patterns responsive to the color arrangement rules displays drawing features corresponding to the color arrangement rules.

3. The drawing system as claimed in claim 1 wherein the drawing elements to which colors are assigned according to the color arrangement rule are predetermined types of elements, and wherein said storage means stores information conforming to the color arrangement rules for the predetermined types of elements and information concerning the color assigned to each type for elements of the types to which no color is assigned according to the color arrangement rule.

4. The drawing system as claimed in claim 1 wherein said storage means stores data defining correspondence between the color arrangement rules and forms of the elements.

5. A drawing system for preparing a drawing having at least one drawing element placed on a two-dimensional plane, said system comprising:

means for storing information concerning a plurality of color arrangement rules for determining colors to be assigned to drawing elements in response to positional relationships among the drawing elements on the two-dimensional plane;

means for specifying a color arrangement rule for the drawing to be prepared;

means for optically reading a monochrome or single-color original image used as an original of the drawing to be prepared and having a specific element marked with a color mark and generating original image information;

means for referencing said storage means based on the specified color arrangement rule and determining a color of the element of the original image marked with a color mark based on the original image information; and means for generating image information representing the prepared drawing colored in response to the colors determined for the drawing elements of the drawing and the original image information.

6. A drawing system for preparing a drawing having at least one drawing element placed on a two-dimensional plane, said system comprising:

placeable point storage means for storing two-dimensional coordinates as identifiers for uniquely identifying a plurality of placeable points on the two-dimensional place where drawing elements can be placed;

element placement means for relating the drawing elements contained in the drawing to be prepared to the placeable points;

means for determining colors of the drawing elements related to the placeable points by said element placement means based on the two-dimensional coordinates indicating the identifiers of the placeable points; and means for generating image information representing the prepared drawing colored in response to the colors determined by said means for determining colors of the drawing elements.

7. The drawing system as claimed in claim 6 wherein said means for determining colors of the drawing elements selects one color out of a predetermined color set based on the two-dimensional coordinates representing the identifier of a placeable point and determining a color of the drawing element placed at the placeable point.

8. The drawing system as claimed in claim 6 wherein said means for determining colors of the drawing elements selects one of the placeable points as a reference point, finds a two-dimensional coordinate difference between the reference point and a different placeable point at which a drawing element is placed, and determines a color of the drawing element placed at the different placeable point based on the found difference.

9. A drawing method for preparing a drawing having at least one drawing element placed on a two-dimensional plane, said method comprising the steps of:

previously storing information concerning a plurality of color arrangement rules for determining colors to be assigned to drawing elements in response to positional relationships among the drawing elements on the two-dimensional plane;

displaying color arrangement patterns responsive to the color arrangement rules;

specifying a color arrangement rule for the drawing to be prepared;

referencing the previously stored information concerning the color arrangement rules based on the specified color arrangement rule and determining colors of drawing elements contained in the drawing to be prepared; and generating image information representing the prepared drawing colored in response to the colors determined for the drawing elements contained in the prepared drawing.

10. A drawing method for preparing a drawing having at least one drawing element placed on a two-dimensional plane, said method comprising the steps of:

previously storing information concerning a plurality of color arrangement rules for determining colors to be assigned to drawing elements in response to positional relationships among the drawing elements;

specifying a color arrangement rule for the drawing to be prepared;

optically reading a monochrome or single-color original image used as an original of the drawing to be prepared and containing at least a drawing element marked with a color mark and generating original image information;

referencing the previously stored information concerning the color arrangement rules based on the specified color arrangement rule and determining a color of the drawing element marked with a color mark contained in the original image based on the original image information; and generating image information representing the prepared drawing colored in response to the colors determined for the drawing elements contained in the prepared drawing and the original image information.

11. A drawing system for preparing a drawing having at least one drawing element placed on a two-dimensional plane, said system comprising:

placeable point storage means for storing identifiers for uniquely identifying a plurality of placeable points for placing the drawing elements and positions of the placeable points on the two-dimensional plane in a one-to-one correspondence therebetween;

element storage means for storing the identifiers of the placeable points at which the drawing elements are placed and colors of the drawing elements;

means for storing at least one position rule for determining the positions of the placeable points on the two-dimensional plane;

means for selecting one of the position rules;

placeable point change means for determining positions of the placeable points on the two-dimensional plane stored in said placeable point storage means based on the position rule selected through said position rule selection means;

color arrangement change means for determining colors of the drawing elements placed at the placeable points based on the positions of the placeable points on the two-dimensional plane determined by said placeable point change means and storing the determined colors in said element storage means; and means for generating an image comprising the drawing elements having the element colors placed on the two-dimensional plane based on the identifiers of the placeable points and the element colors stored in said element storage means and the identifiers of the placeable points and the positions of the placeable points on the two-dimensional plane, the identifiers and the positions being related to each other by said placeable point storage means.

12. The drawing system as claimed in claim 11 wherein said color arrangement change means uses one of the placeable points as a reference, finds positional relationship between the placeable point as the reference and a different placeable point based on their positions on the two-dimensional plane, and determines the color of the drawing element placed at the different placeable point based on the positional relationship.

13. The drawing system as claimed in claim 12 wherein the positional relationship between the placeable point as the reference and a different placeable point is a direction.

14. A drawing system for preparing a drawing having at least one drawing element placed on a two-dimensional plane, said system comprising:
- placeable point storage means for storing two-dimensional coordinates as identifiers for uniquely identifying a plurality of placeable points for placing the drawing elements and positions of the placeable points on the two-dimensional plane in a one-to-one correspondence therebetween;
- element storage means for storing the two-dimensional coordinates indicating the identifiers of the placeable points at which the drawing elements are placed and colors of the drawing elements;
- means for storing at least one position rule for determining the positions of the placeable points on the two-dimensional plane;
- means for selecting one of the position rules;
- placeable point change means for determining positions of the placeable points on the two-dimensional plane stored in said placeable point storage means based on the position rule selected through said position rule selection means;
- means for storing a plurality of color arrangement rules which are color arrangement rules for determining colors of the drawing elements placed at the placeable points based on the two-dimensional coordinates indicating the identifiers of the placeable points or color arrangement rules for determining colors of the drawing elements placed at the placeable points based on the positions of the placeable points on the two-dimensional plane determined by said placeable point change means;
- means for selecting at least one of the color arrangement rules stored in said color arrangement rule storage means;
- color arrangement change means for determining colors of the drawing elements placed at the placeable points based on the color arrangement rule selected through said color arrangement rule selection means and storing the determined colors in said element storage means; and
- means for generating an image comprising the drawing elements having the element colors placed on the two-dimensional plane based on the identifiers of the placeable points and the element colors stored in said element storage means and the identifiers of the placeable points and the positions of the placeable points on the two-dimensional plane, the identifiers and the positions being related to each other by said placeable point storage means.

15. A drawing method for preparing a drawing having at least one drawing element placed on a two-dimensional plane, said method comprising the steps of:
- previously storing at least one position rule for determining positions of placeable points on the two-dimensional plane for placing the drawing elements in the drawing to be prepared;
- selecting a desired position rule from the at least one position rule previously stored;
- determining positions of the placeable points on the two-dimensional plane based on the selected position rule;
- relating one drawing element contained in the drawing to be prepared to one of the placeable points;
- determining colors of the drawing elements related to the placeable points based on the positions of the placeable points on the two-dimensional plane; and
- generating an image comprising the drawing elements having the determined colors placed on the two-dimensional plane based on the positions of the placeable points on the two-dimensional plane, the drawing elements related to the placeable points, and the determined colors for the drawing elements.

* * * * *